(12) United States Patent
Sato et al.

(10) Patent No.: US 8,736,968 B2
(45) Date of Patent: May 27, 2014

(54) ZOOM LENS, OPTICAL APPARATUS HAVING SAME, AND METHOD OF MANUFACTURING ZOOM LENS

(75) Inventors: Haruo Sato, Kawaguchi (JP); Takeshi Suzuki, Yokohama (JP); Satoshi Miwa, Yokohama (JP); Hiroshi Yamamoto, Kawasaki (JP)

(73) Assignee: Nikon Corporation, Tokyo (JP)

( * ) Notice: Subject to any disclaimer, the term of this patent is extended or adjusted under 35 U.S.C. 154(b) by 13 days.

(21) Appl. No.: 13/056,538

(22) PCT Filed: Jul. 27, 2009

(86) PCT No.: PCT/JP2009/003521
§ 371 (c)(1),
(2), (4) Date: Jan. 28, 2011

(87) PCT Pub. No.: WO2010/013435
PCT Pub. Date: Feb. 4, 2010

(65) Prior Publication Data
US 2011/0176224 A1    Jul. 21, 2011

(30) Foreign Application Priority Data

Jul. 28, 2008  (JP) ................................ 2008-193616
Jul. 28, 2008  (JP) ................................ 2008-193617
Jul. 28, 2008  (JP) ................................ 2008-193618

(51) Int. Cl.
*G02B 15/14*  (2006.01)
*G02B 27/64*  (2006.01)

(52) U.S. Cl.
USPC ............................ 359/683; 359/554; 359/557

(58) Field of Classification Search
USPC .................................. 359/676, 683, 554, 557
See application file for complete search history.

(56) References Cited

U.S. PATENT DOCUMENTS

| 4,749,266 A | 6/1988 | Takahashi et al. |
| 5,442,486 A | 8/1995 | Sato |
| 5,589,986 A | 12/1996 | Shibata |
| 6,025,962 A | 2/2000 | Suzuki |

(Continued)

FOREIGN PATENT DOCUMENTS

| CN | 101256271 A | 9/2008 |
| EP | 1 965 241 A1 | 9/2008 |

(Continued)

*Primary Examiner* — Scott J Sugarman
(74) *Attorney, Agent, or Firm* — Miles & Stockbridge P.C.

(57) ABSTRACT

The present invention relates to a zoom lens which can shift images using a movable optical system so as to have components orthogonal to the optical axis, and can correct hand motion blur, and minimizes the deterioration of performance while attempting higher variable power. This zoom lens has, in order from an object, a first lens group G1 having positive refractive power, a second lens group G2 having negative refractive power, a third lens group G3 having positive refractive power, a fourth lens group G4 having negative refractive power, and a fifth lens group G5 having positive refractive power, and at least a part of the fourth lens group G4 can move so as to have components orthogonal to the optical axis, and a distance between each lens group is changed upon zooming from a wide-angle end state to a telephoto end state, and the following conditional expression is satisfied, $0.01 < f5/ft < 0.30$, where f5 denotes a focal length of the fifth lens group, and ft denotes a focal length of the zoom lens upon focusing on infinity in the telephoto end state.

34 Claims, 34 Drawing Sheets

(EXAMPLE 1)

(56) References Cited

U.S. PATENT DOCUMENTS

| | | |
|---|---|---|
| 6,483,648 B1 | 11/2002 | Yamanashi |
| 2001/0030809 A1* | 10/2001 | Hayakawa et al. ........... 359/557 |
| 2001/0046383 A1 | 11/2001 | Hagimori et al. |
| 2005/0190447 A1 | 9/2005 | Misaka |
| 2005/0275735 A1 | 12/2005 | Nanjo |
| 2005/0275949 A1 | 12/2005 | Fujimoto et al. |
| 2006/0023317 A1 | 2/2006 | Fujimoto |
| 2006/0152816 A1 | 7/2006 | Kuroda et al. |
| 2006/0279850 A1 | 12/2006 | Horiuchi |
| 2007/0229966 A1* | 10/2007 | Nakatani et al. .............. 359/676 |
| 2007/0242365 A1* | 10/2007 | Kushida et al. ............... 359/676 |
| 2008/0151392 A1* | 6/2008 | Nishimura .................... 359/766 |
| 2008/0212206 A1 | 9/2008 | Hatada |
| 2008/0259454 A1 | 10/2008 | Nanba |
| 2009/0046374 A1* | 2/2009 | Ohtake .......................... 359/684 |
| 2010/0302640 A1* | 12/2010 | Take .............................. 359/557 |

FOREIGN PATENT DOCUMENTS

| | | |
|---|---|---|
| JP | 58-202416 A | 11/1983 |
| JP | 58-211118 A | 12/1983 |
| JP | 59-23314 A | 2/1984 |
| JP | 59-93411 A | 5/1984 |
| JP | 59-195214 A | 11/1984 |
| JP | 05-303035 A | 11/1993 |
| JP | 06-160712 A | 6/1994 |
| JP | 07-311341 A | 11/1995 |
| JP | 10-90601 A | 4/1998 |
| JP | 11-084239 A | 3/1999 |
| JP | 11-258506 A | 9/1999 |
| JP | 2000-147379 A | 5/2000 |
| JP | 2000-180722 A | 6/2000 |
| JP | 2000-231050 A | 8/2000 |
| JP | 2001-33703 A | 2/2001 |
| JP | 2001-228397 A | 8/2001 |
| JP | 2001-350093 A | 12/2001 |
| JP | 2003-241093 A | 8/2003 |
| JP | 2003-295060 A | 10/2003 |
| JP | 2004-117826 A | 4/2004 |
| JP | 2004-226644 A | 8/2004 |
| JP | 2004-233750 A | 8/2004 |
| JP | 2004-240398 A | 8/2004 |
| JP | 2005-242015 A | 9/2005 |
| JP | 2005-284097 A | 10/2005 |
| JP | 2005-352057 A | 12/2005 |
| JP | 2006-47348 A | 2/2006 |
| JP | 2006-85155 A | 3/2006 |
| JP | 2006-227526 A | 8/2006 |
| JP | 2006-234892 A | 9/2006 |
| JP | 2006-337745 A | 12/2006 |
| JP | 2007-47538 A | 2/2007 |
| JP | 2007-156251 A | 6/2007 |
| JP | 2008-015251 A | 1/2008 |
| JP | 2008-129076 A | 6/2008 |
| JP | 2008-216440 A | 9/2008 |
| JP | 2005-352348 A | 12/2008 |

* cited by examiner (EXAMPLE 1)

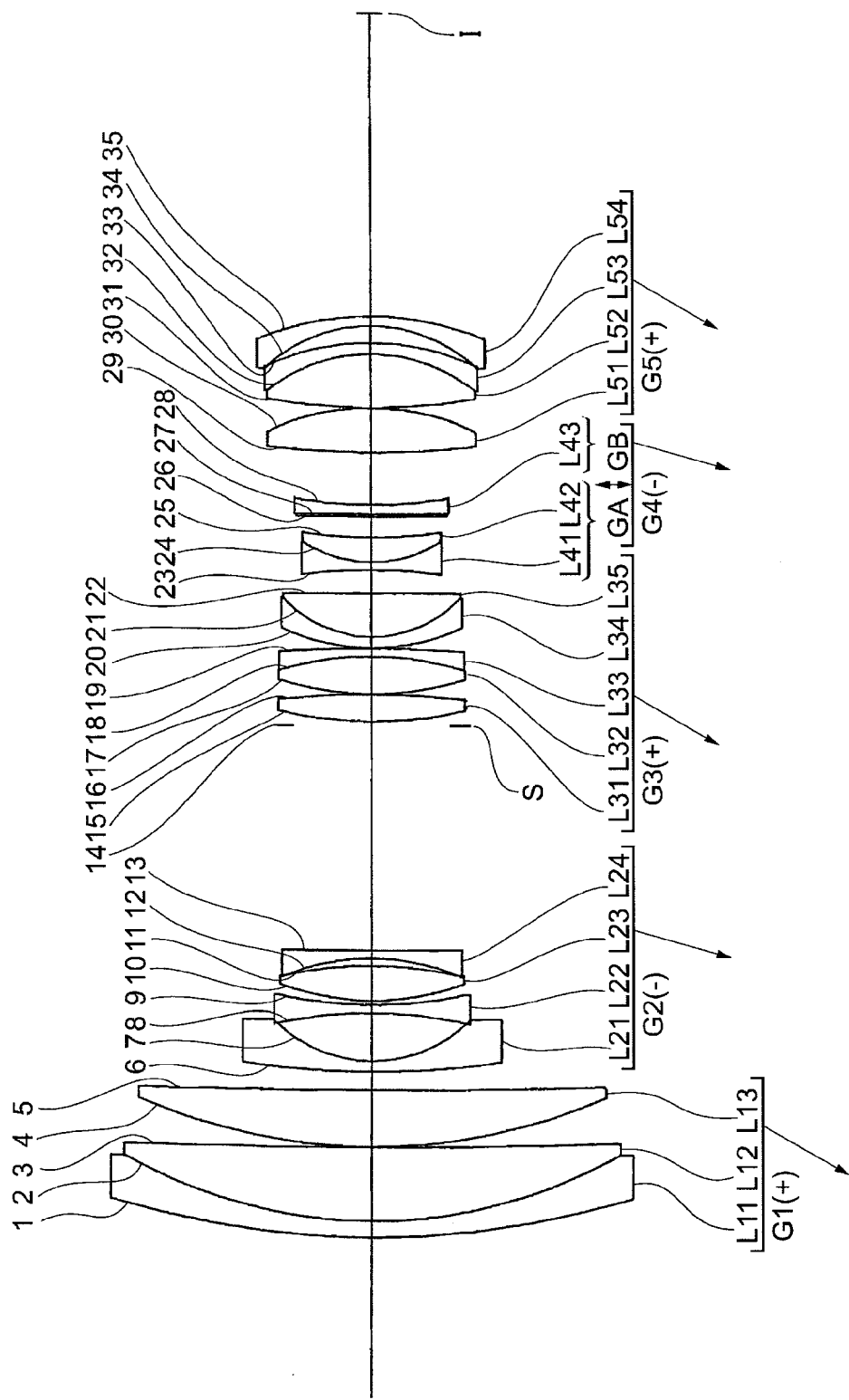
FIG.4 (EXAMPLE 2)

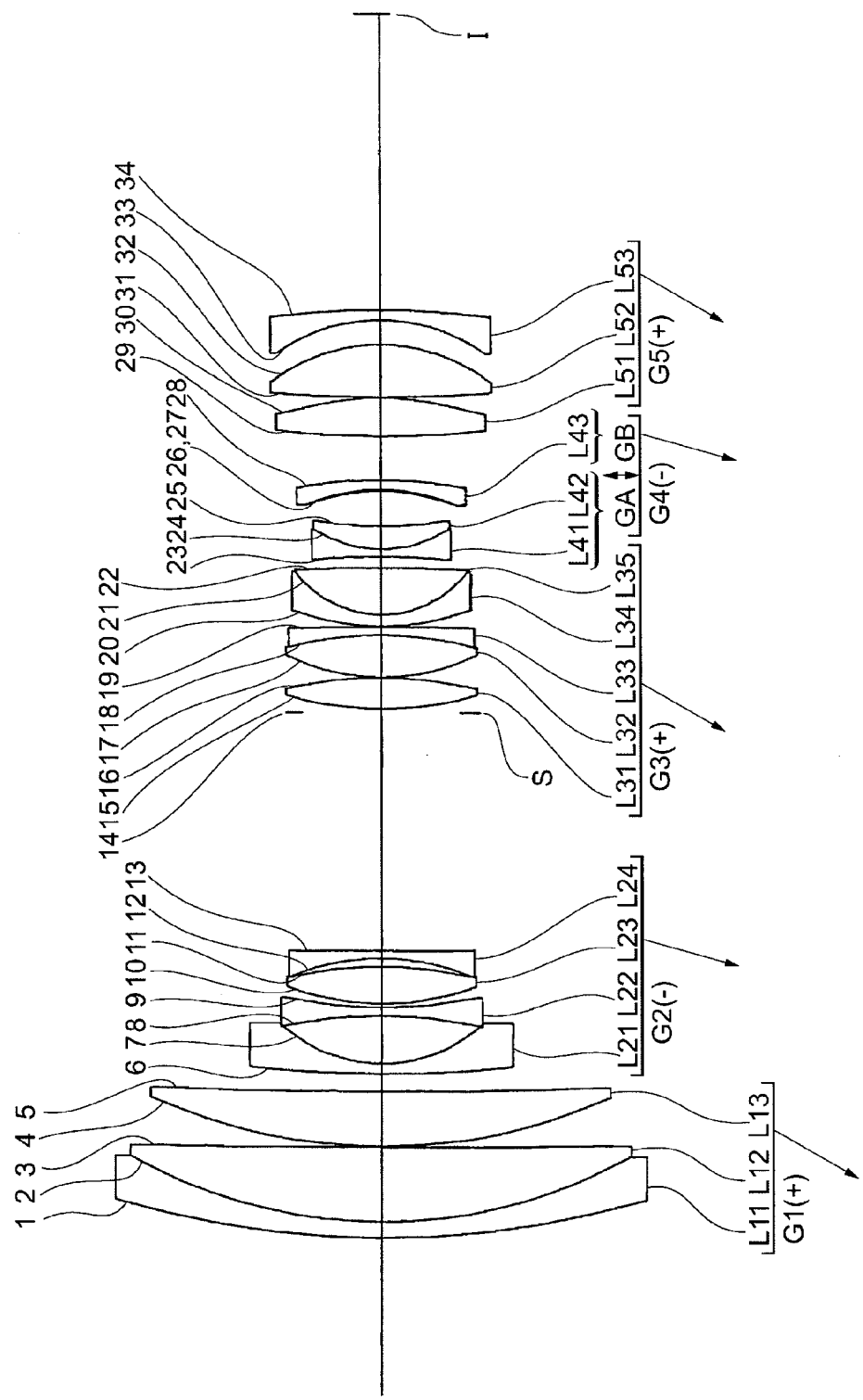

LATERAL ABERRATION

LATERAL
ABERRATION

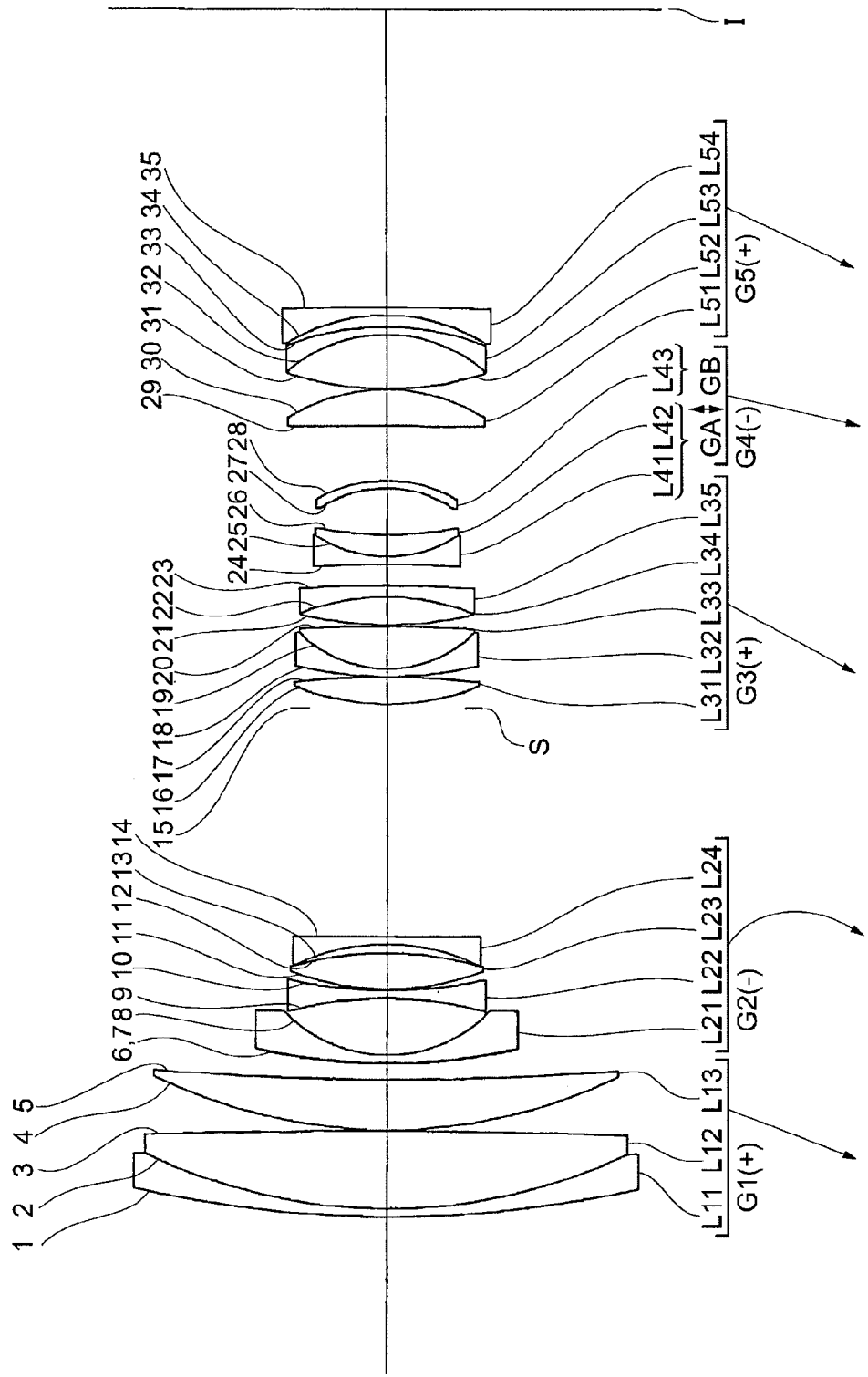

MERIDIONAL LATERAL
ABERRATION

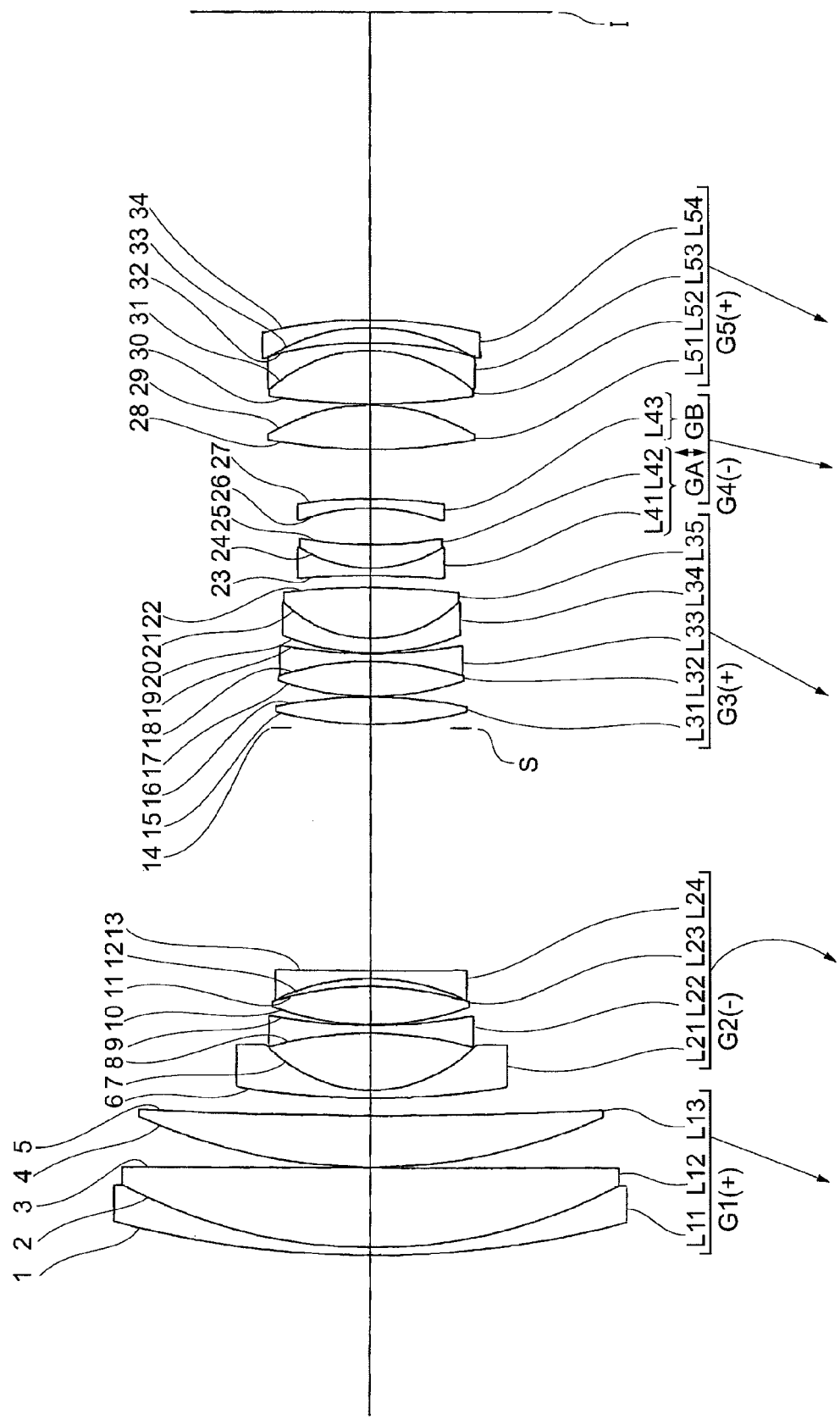

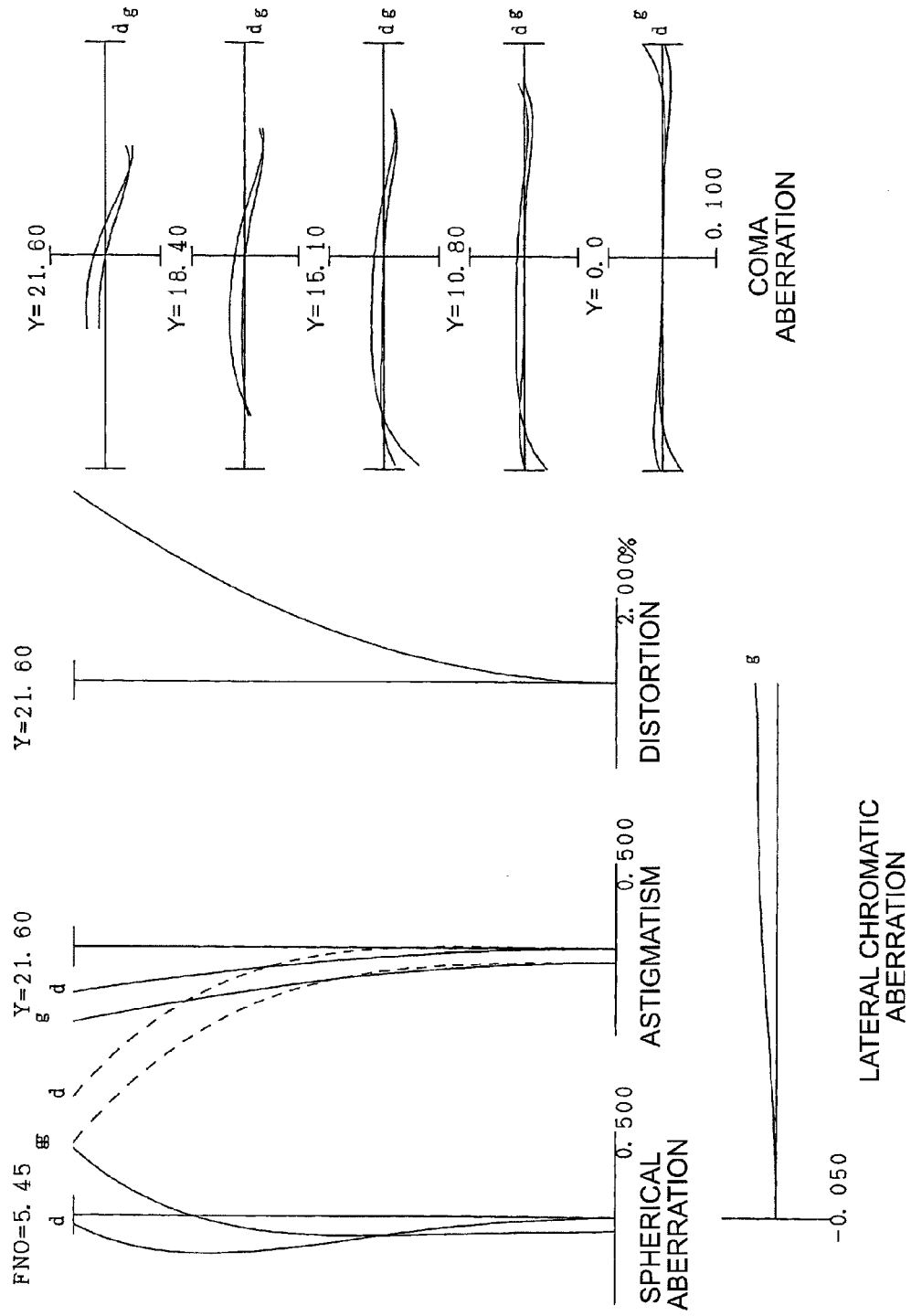

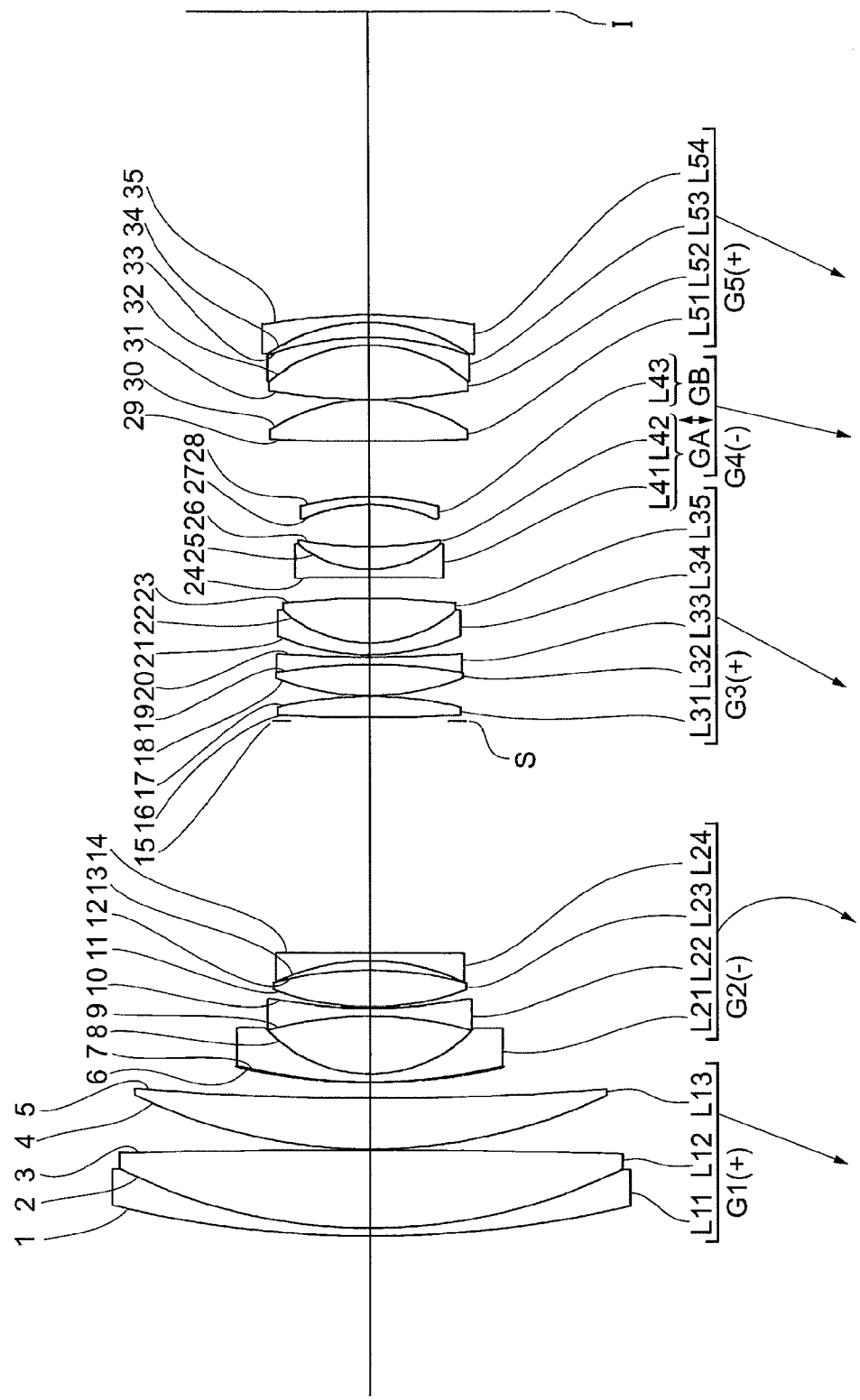
FIG.22 (EXAMPLE 7)

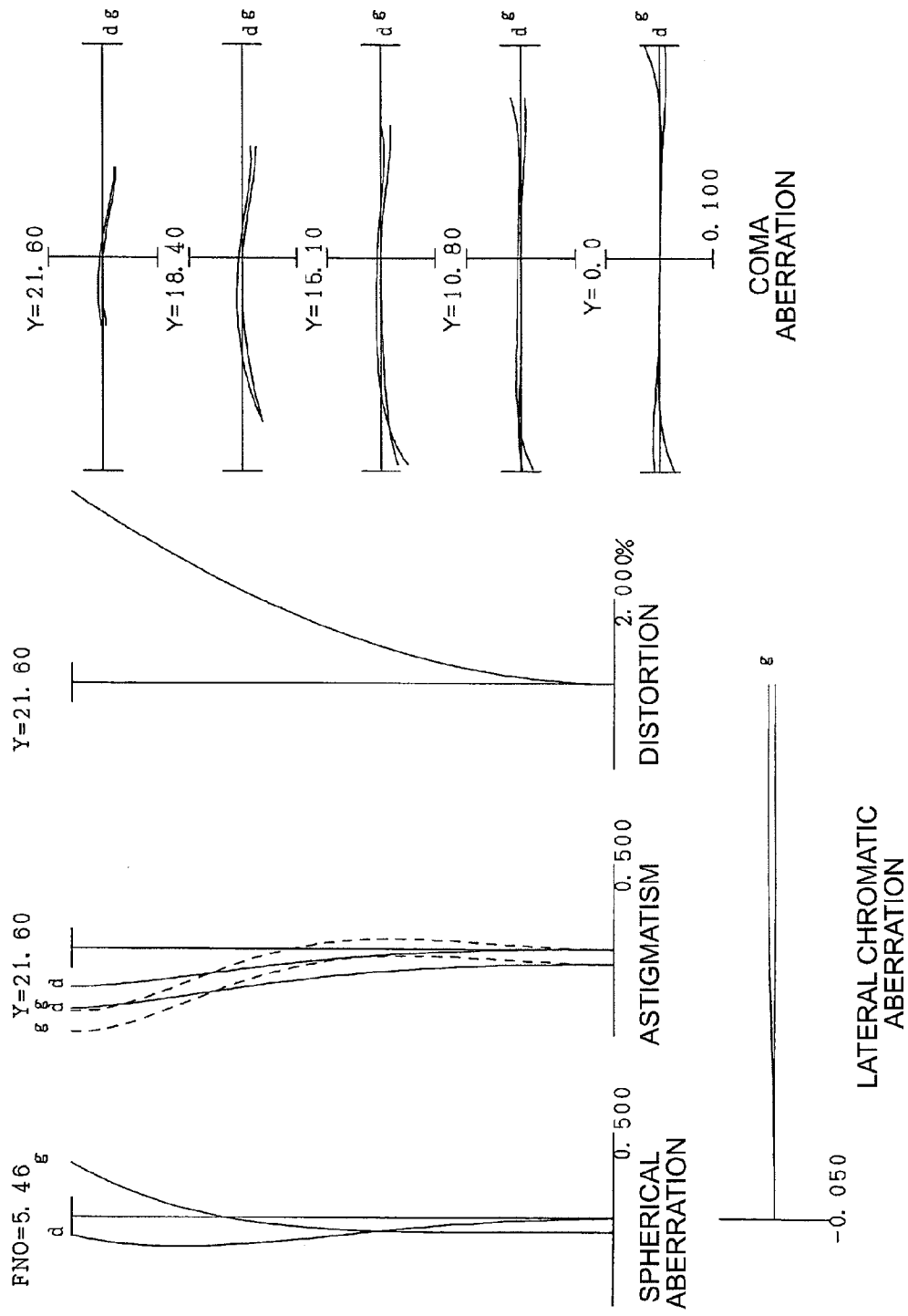

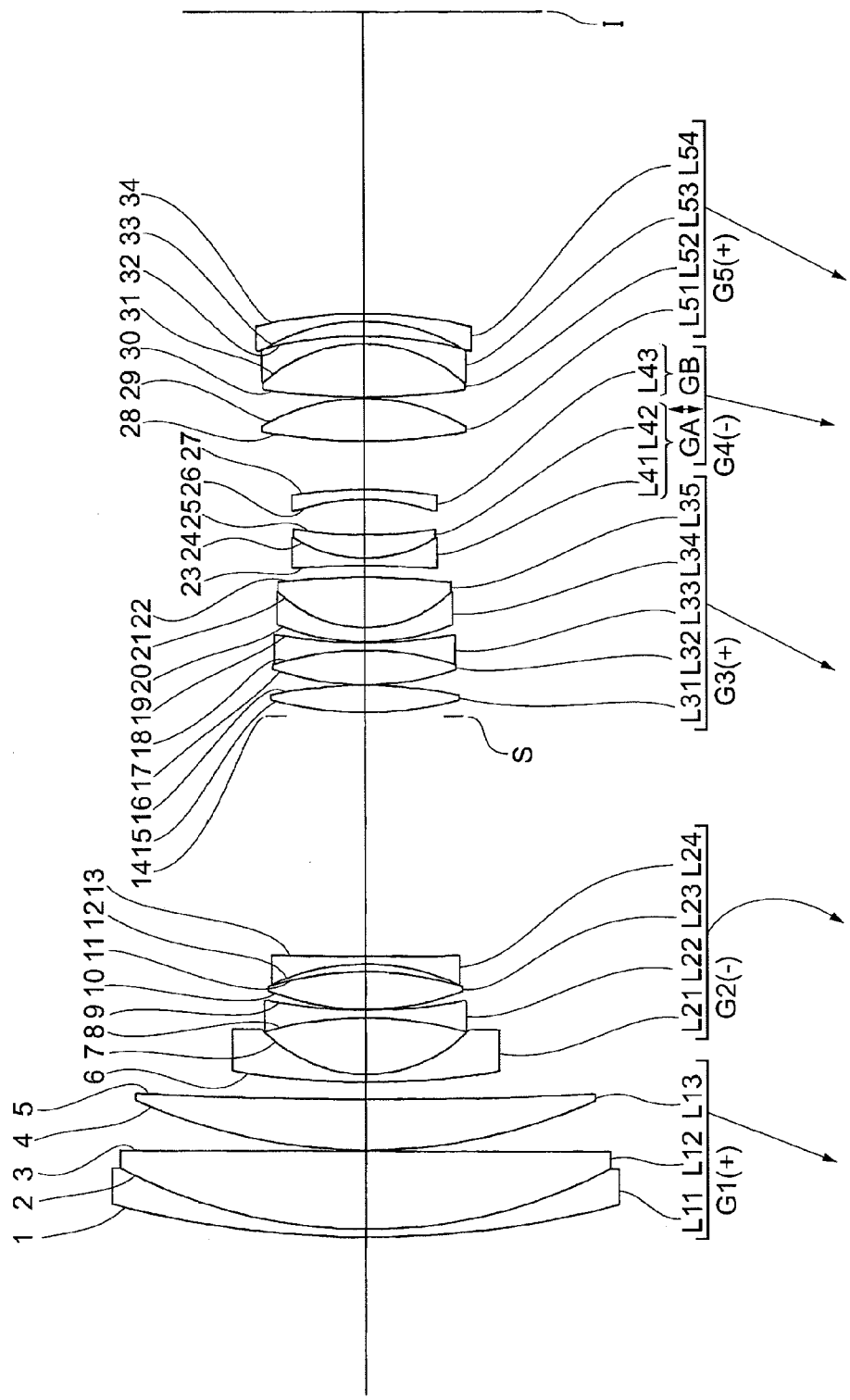
FIG.26 (EXAMPLE 8)

ZOOM LENS, OPTICAL APPARATUS HAVING SAME, AND METHOD OF MANUFACTURING ZOOM LENS

TECHNICAL FIELD

The present invention relates to a zoom lens, an optical apparatus having this zoom lens, and a method of manufacturing the zoom lens.

TECHNICAL BACKGROUND

Zoom lenses having a hand motion blur correction function, suitable for photograph cameras, electronic still cameras and video cameras, have been proposed (e.g. see Patent Document 1).

CITATION LIST

Patent Document

Patent Document 1: Japanese Laid-Open Patent Publication No. 2006-227526

SUMMARY OF INVENTION

Problems to be Solved by the Invention

However in the case of the conventional zoom lenses, a mechanism to correct motion blur must be built in to the lens barrel, and compactness tends to be diminished in terms of total length and outer diameter of the lens barrel. Another problem is that the optical performance of a zoom lens having a motion blur correction function deteriorates considerably if variable power is increased.

With the foregoing in view, it is an object of the present invention to provide: a zoom lens which can shift images using a movable optical system so as to have components orthogonal to the optical axis, and can correct hand motion blur, where an appropriate refractive power of each lens group is set so that the deterioration of performance is minimized while increasing variable power; an optical apparatus having this zoom lens; and a method of manufacturing the zoom lens.

Means to Solve the Problems

To achieve this object, a zoom lens according to a first aspect of the present invention includes, in order from an object, a first lens group having positive refractive power, a second lens group having negative refractive power, a third lens group having positive refractive power, a fourth lens group having negative refractive power, and a fifth lens group having positive refractive power, wherein at least a part of the fourth lens group can move so as to have components orthogonal to the optical axis, a distance between each lens group is changed upon zooming from a wide-angle end state to a telephoto end state, and the following conditional expression is satisfied:

$0.01 < f5/ft < 0.30$, where $f5$ denotes a focal length of the fifth lens group, and $ft$ denotes a focal length of the zoom lens upon focusing on infinity in the telephoto end state.

In the zoom lens, it is preferable that the following conditional expression is satisfied: $0.577 < (-f2)/(-f4) < 1.200$, where $f2$ denotes a focal length of the second lens group, and $f4$ denotes a focal length of the fourth lens group.

In the zoom lens, it is preferable that the following conditional expression is satisfied: $0.01 < (-f4)/ft < 0.25$, where $f4$ denotes a focal length of the fourth lens group, and $ft$ denotes a focal length of the zoom lens upon focusing on infinity in the telephoto end state.

In the zoom lens, it is preferable that the fourth lens comprises a lens group GA having negative refractive power, and a lens group GB which is disposed to adjoin an image side of the lens group GA and has negative refractive power.

In the zoom lens, it is preferable that the lens group GB includes at least one aspherical surface.

In the zoom lens, it is preferable that the following conditional expression is satisfied: $0.05 < (-fA)/ft < 0.40$, where $fA$ denotes a focal length of the lens group which moves so as to have components orthogonal to the optical axis, and $ft$ denotes a focal length of the zoom lens focusing on infinity in the telephoto end state.

In the zoom lens, it is preferable that the following conditional expression is satisfied: $1.10 < f5/(-f4) < 2.00$, where $f4$ denotes a focal length of the fourth lens group, and $f5$ denotes a focal length of the fifth lens group.

In the zoom lens, it is preferable that the following conditional expression is satisfied: $0.11 < f5/fw < 3.20$, where $f5$ denotes a focal length of the fifth lens group, and $fw$ denotes a focal length of the zoom lens upon focusing on infinity in the wide-angle end state.

In the zoom lens, it is preferable that the fourth lens group has a cemented lens.

In the zoom lens, it is preferable that, upon zooming from the wide-angle end state to the telephoto end state, the distance between the first lens group and the second lens group increases, the distance between the second lens group and the third lens group decreases, the distance between the third lens group and the fourth lens group increases, and the distance between the fourth lens group and the fifth lens group decreases.

In the zoom lens, it is preferable that, upon zooming from the wide-angle end state to the telephoto end state, the third lens group and the fifth lens group move together.

In the zoom lens, it is preferable that the third lens group has three lens groups having positive refractive power.

In the zoom lens, it is preferable that the third lens group includes at least two cemented lenses.

In the zoom lens, it is preferable that the fifth lens group has at least two lens groups having positive refractive power, and a lens group having negative refractive power.

In the zoom lens, it is preferable that the fifth lens group includes at least one cemented lens.

In the zoom lens, it is preferable that the second lens group has at least an aspherical surface.

In the zoom lens, it is preferable that the fourth lens group has at least one aspherical surface.

In the zoom lens, it is preferable that focusing from an object at infinity to an object at close distance is performed by moving at least a part of the second lens group in the optical axis direction.

An optical apparatus according to the present invention includes the zoom lens according to the first aspect of the invention.

A zoom lens according to a second aspect of the present invention includes, in order from an object, a first lens group having positive refractive power, a second lens group having negative refractive power, a third lens group having positive refractive power, a fourth lens group having negative refractive power, and a fifth lens group having positive refractive power, wherein at least a part of the fourth lens group can move so as to have components orthogonal to the optical axis, a distance between each lens group is changed upon zooming from a wide-angle end state to a telephoto end state, and the following conditional expression is satisfied:

$0.01<(-f4)/ft<0.20$, where f4 denotes a focal length of the fourth lens group, and ft denotes a focal length of the zoom lens in the telephoto end state.

In the zoom lens according to the second aspect of the invention, it is preferable that the following conditional expression is satisfied: $0.80<f5/(-f4)<3.50$, where f5 denotes a focal length of the fifth lens group, and f4 denotes a focal length of the fourth lens group.

In the zoom lens according to the second aspect of the invention, it is preferable that the following conditional expression is satisfied: $0.45<(-f2)/(-f4)<1.25$, where f2 denotes a focal length of the second lens group, and f4 denotes a focal length of the fourth lens group.

In the zoom lens according to the second aspect of the invention, it is preferable that the following conditional expression is satisfied: $3.45<f1/(-f4)<6.00$, where f1 denotes a focal length of the first lens group, and f4 denotes a focal length of the fourth lens group.

In the zoom lens according to the second aspect of the invention, it is preferable that the following conditional expression is satisfied: $0.05<f5/ft<0.35$, where f5 denotes a focal length of the fifth lens group, and ft denotes a focal length of the zoom lens in the telephoto end state.

In the zoom lens according to the second aspect of the invention, it is preferable that the following conditional expression is satisfied: $1.35<(Bft-Bfw)/f3<1.80$, where Bft denotes back focus in the telephoto end state, Bfw denotes back focus in the wide-angle end state, and f3 denotes a focal length of the third lens group.

An optical apparatus according to the present invention includes the zoom lens according to the second aspect of the invention.

A zoom lens according to a third aspect of the present invention includes, in order from an object, a first lens group having positive refractive power, a second lens group having negative refractive power, a third lens group having positive refractive power, a fourth lens group having negative refractive power, and a fifth lens group having positive refractive power, wherein at least a part of the fourth lens group can move so as to have components orthogonal to the optical axis, a distance between each lens group is changed upon zooming from a wide-angle end state to a telephoto end state, and the following conditional expression is satisfied: $3.45<f1/(-f4)<6.00$, where f1 denotes a focal length of the first lens group, and f4 denotes a focal length of the fourth lens group.

In the zoom lens according to the second aspect of the invention, it is preferable that the following conditional expression is satisfied: $3.50<f1/f3<4.60$, where f1 denotes a focal length of the first lens group, and f3 denotes a focal length of the third lens group.

A method of manufacturing a zoom lens according to an aspect of the present invention is a method of manufacturing a zoom lens having, in order from an object, a first lens group, a second lens group, a third lens group, a fourth lens group, and a fifth lens group, including the steps of: disposing each lens so that the first lens group has positive refractive power, the second lens group has negative refractive power, the third lens group has positive refractive power, the fourth lens group has negative refractive power, and the fifth lens group has positive refractive power; disposing at least a part of the fourth lens group to be movable so as to have components orthogonal to the optical axis; and disposing the first group to the fifth lens group so that a distance between each lens group is changed upon zooming from a wide-angle end state to a telephoto end state, and so that the following conditional expression is satisfied:

$0.01<f5/ft<0.30$, where f5 denotes a focal length of the fifth lens group, and ft denotes a focal length of the zoom lens upon focusing on infinity in the telephoto end state.

In the method of manufacturing the zoom lens according to an aspect of the present invention, it is preferable that the following conditional expression is satisfied: $0.577<(-f2)/(-f4)<1.200$, where f2 denotes a focal length of the second lens group, and f4 denotes a focal length of the fourth lens group.

In the method of manufacturing the zoom lens according to the aspect of the present invention, it is preferable that the following conditional expression is satisfied: $0.05<(-fA)/ft<0.40$, where fA denotes a focal length of the lens group which moves so as to have components orthogonal to the optical axis, and ft denotes a focal length of the zoom lens focusing on infinity in the telephoto end state.

A method of manufacturing a zoom lens according to a second aspect of the present invention is a method of manufacturing a zoom lens having, in order from an object, a first lens group, a second lens group, a third lens group, a fourth lens group, and a fifth lens group, including the steps of: disposing each lens so that the first lens group has positive refractive power, the second lens group has negative refractive power, the third lens group has positive refractive power, the fourth lens group has negative refractive power, and the fifth lens group has positive refractive power, at least a part of the fourth lens group being movable so as to have components orthogonal to the optical axis; and disposing the first group to the fifth lens group so that a distance between each lens group is changed upon zooming from a wide-angle end state to a telephoto end state, and so that the following conditional expression is satisfied:

$0.01<(-f4)/ft<0.20$, where f4 denotes a focal length of the fourth lens group, and ft denotes a focal length of the zoom lens in the telephoto end state.

In the method of manufacturing the zoom lens according to the second aspect of the present invention, it is preferable that the following conditional expression is satisfied: $0.80<f5/(-f4)<3.50$, where f5 denotes a focal length of the fifth lens group, and f4 denotes a focal length of the fourth lens group.

In the method of manufacturing the zoom lens according to the second aspect of the present invention, it is preferable that the following conditional expression is satisfied: $3.45<f1/(-f4)<6.00$, where f1 denotes a focal length of the first lens group, and f4 denotes a focal length of the fourth lens group.

Advantageous Effects of the Invention

According to the present invention, a zoom lens which can shift images using a movable optical system so as to have components orthogonal to the optical axis, and can correct hand motion blur, where an appropriate refractive power of each lens group is set so that deterioration of performance is minimized while increasing variable power, an optical apparatus having this zoom lens, and a method of manufacturing the zoom lens, can be provided.

BRIEF DESCRIPTION OF THE DRAWINGS

FIG. 4 is a diagram depicting a configuration and zoom locus of a zoom lens system according to Example 2;

FIG. 7 is a diagram depicting a configuration and zoom locus of a zoom lens system according to Example 3;

FIG. 10 is a diagram depicting a configuration and zoom locus of a zoom lens system according to Example 4;

FIG. 14 is a diagram depicting a configuration and zoom locus of a zoom lens system according to Example 5;

FIG. 16 are graphs showing various aberrations of the zoom lens according to Example 5 upon focusing on infinity in the intermediate focal length state;

FIG. 22 is a diagram depicting a configuration and zoom locus of a zoom lens system according to Example 7;

FIG. 24 are graphs showing various aberrations of the zoom lens according to Example 7 upon focusing on infinity in the intermediate focal length state;

FIG. 26 is a diagram depicting a configuration and zoom locus of a zoom lens system according to Example 8;

DESCRIPTION OF EMBODIMENTS

Preferred embodiments of the invention will now be described with reference to the drawings. In the following description, the preferred embodiments are separated into first to third embodiments corresponding to the above mentioned first to third aspects of the invention.

First Embodiment

Figure 1:
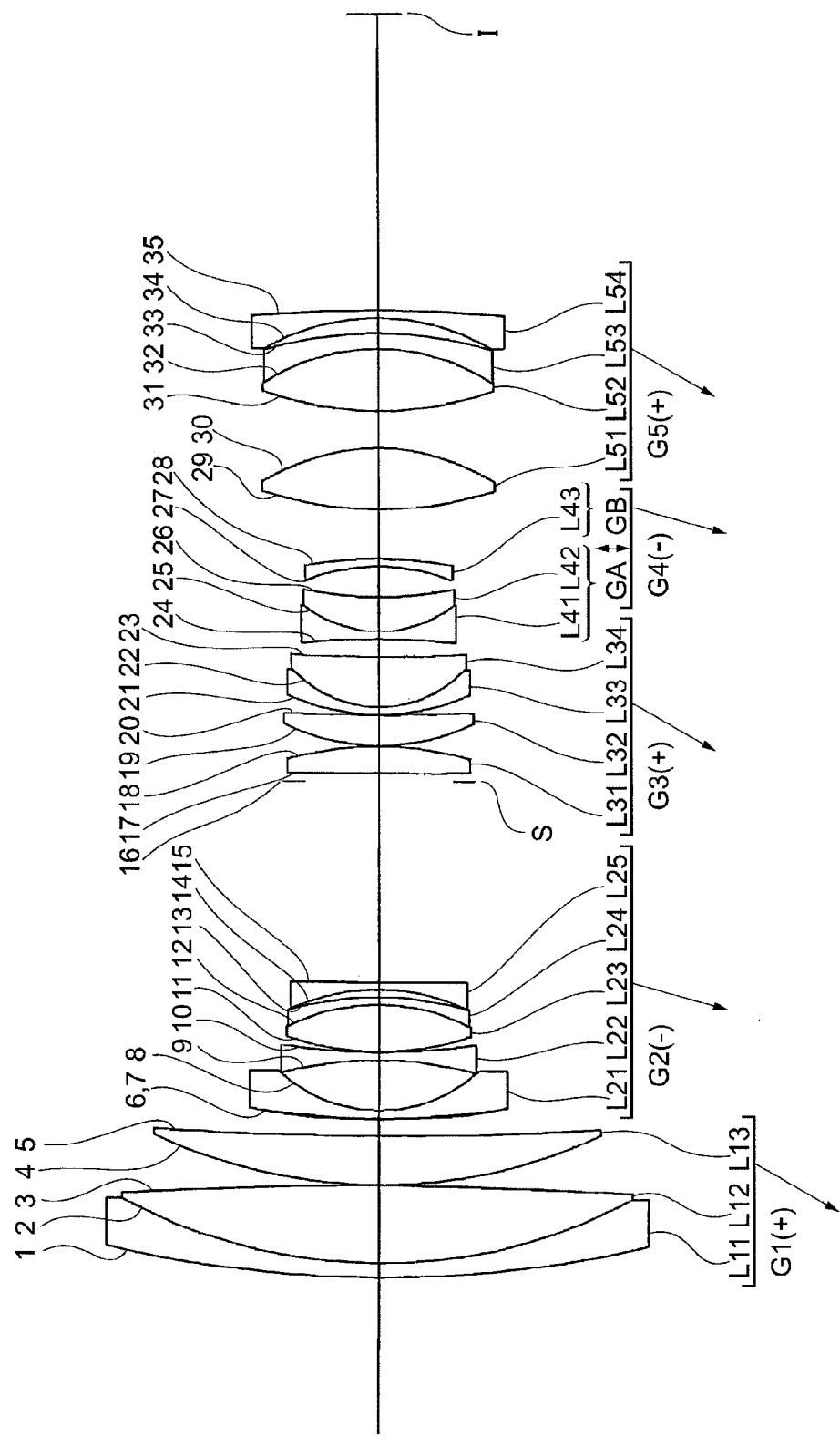
FIG. 1 is a diagram depicting a configuration and zoom locus of a zoom lens system according to Example 1.

As FIG. 1 shows, a zoom lens according to a first embodiment has, in order from an object, a first lens group G1 having positive refractive power, a second lens group G2 having negative refractive power, a third lens group G3 having positive refractive power, a fourth lens group G4 having negative refractive power, and a fifth lens group G5 having positive refractive power, and image plane is corrected upon generation of hand motion blur, by moving at least a part of the fourth lens group G4 so as to have components orthogonal to the optical axis.

In the present embodiment, the fourth lens group G4, which is constituted by less number of lenses than the other lens groups, and of which lens diameter can be decreased, is appropriate to enclose a vibration isolation mechanism. Because of this configuration, the size of the lens barrel can be decreased, and fluctuation of aberrations due to hand motion blur correction can be corrected well.

In the above configuration, it is preferable that the following conditional Expression (1) is satisfied, where f5 denotes a focal length of the fifth lens group G5, and ft denotes a focal length of the zoom lens upon focusing on infinity in the telephoto end state.

$$0.01 < f5/ft < 0.30 \tag{1}$$

Conditional Expression (1) specifies the focal length f5 of the fifth lens group G5 with respect to the focal length ft in the telephoto end state. By satisfying the conditional Expression (1), this zoom lens can decrease aberration and the burden of zooming on the lens groups other than the fifth lens group G5, and therefore can implement good optical performance and ensure a predetermined zoom ratio. If the condition exceeds the upper limit value of the conditional Expression (1), the refractive power of the fifth lens group G5 becomes too weak, and the refractive power of the other lens groups becomes strong in order to ensure the zoom ratio, which makes it difficult to correct the spherical aberration in the telephoto end state. If the condition is below the lower limit value of the conditional Expression (1), on the other hand, the refractive power of the fifth lens group G5 becomes too strong, which makes it difficult to correct coma aberrations in the wide-angle end state.

To ensure the effect of the present embodiment, it is preferable that the upper limit value of the conditional Expression (1) is 0.24. Then the focal length of the fifth lens group G5 can be set more appropriately, and the spherical aberration in the telephoto end state can be corrected better. To ensure the effect of the present embodiment, it is preferable that the lower limit value of the conditional Expression (1) is 0.05. Then the focal length of the fifth lens group G5 can be set more appropriately, and coma aberration in the wide-angle end state can be corrected better.

To further ensure the effect of the present embodiment, it is preferable that the upper limit value of the conditional Expression (1) is 0.175. To further ensure the effect of the present embodiment, it is preferable that the lower limit value of the conditional Expression (1) is 0.10.

In the present embodiment, it is preferable that the following conditional Expression (2) is satisfied, where f2 denotes a focal length of the second lens group G2, and f4 denotes a focal length of the fourth lens group G4.

$$0.577 < (-f2)/(-f4) < 1.200 \tag{2}$$

Conditional Expression (2) specifies the focal length f2 of the second lens group G2 with respect to the focal length f4 of the fourth lens group G4. By satisfying the conditional Expression (2), this zoom lens can implement good optical performance, and ensure a predetermined zoom ratio. If the condition exceeds the upper limit value of the conditional Expression (2), the refractive power of the second lens group G2 becomes too weak, which makes it difficult to ensure the peripheral light quantity in the wide-angle end state. If the refractive power of the other lens groups is increased to relax this influence, then it becomes difficult to correct spherical aberration in the telephoto end state. If the condition is below the lower limit value of the conditional Expression (2), on the other hand, refractive power of the second lens group G2 becomes too strong, and therefore curvature of field and astigmatism in the wide-angle end state deteriorate.

To ensure the effect of the present embodiment, it is preferable that the upper limit value of the conditional Expression (2) is 1.000. Then the focal lengths of the second lens group G2 and the fourth lens group G4 can be set more appropriately, and the spherical aberration in the telephoto end state can be corrected better. To ensure the effect of the present embodiment, it is preferable that the lower limit value of the conditional Expression (2) is 0.580. Then the focal length of the second length group G2 and the fourth lens group G4 can be set more appropriately, and curvature of field and astigmatism in the wide-angle end state can be corrected better.

To further ensure the effect of the present embodiment, it is preferable that the upper limit value of the conditional Expression (2) is 0.900. To further ensure the effect of the present embodiment, it is preferable that the lower limit value of the conditional Expression (2) is 0.590.

In the present embodiment, it is preferable that the following conditional Expression (3) is satisfied, where f4 denotes a focal length of the fourth lens group G4, and ft denotes a focal length of the zoom lens upon focusing on infinity in the telephoto end state.

$$0.01 < (-f4)/ft < 0.25 \tag{3}$$

The conditional Expression (3) specifies the focal length f4 of the fourth lens group G4 with respect to the focal length ft in the telephoto end state. By satisfying the conditional Expression (3), this zoom lens can implement good optical performance and ensure a predetermined zoom ratio. If the condition exceeds the upper limit value of the conditional Expression (3), the refractive power of the fourth lens group G4 becomes too weak, and shift amount of the fourth lens group G4 for correcting hand motion blur increases. And correcting fluctuation of astigmatism upon correcting hand motion blur is also difficult. If the condition is below the lower limit value of the conditional Expression (3), on the other hand, the refractive power of the fourth lens group G4 becomes strong, which makes it difficult to correct spherical aberration in the telephoto end state.

To ensure the effect of the present embodiment, it is preferable that the upper limit value of the conditional Expression (3) is 0.18. Then the focal length of the fourth lens group G4 can be set more appropriately, and fluctuation of astigmatism upon correcting hand motion blur can be controlled better. To ensure the effect of the present embodiment, it is preferable that the lower limit value of the conditional Expression (3) is 0.02. Then the focal length of the fourth lens group G4 can be set more appropriately, and spherical aberration in the telephoto end state can be corrected better.

To further ensure the effect of the present embodiment, it is preferable that the upper limit value of the conditional Expression (3) is 0.135. To further ensure the effect of the present embodiment, it is preferable that the lower limit value of the conditional Expression (3) is 0.05.

In the present embodiment, it is preferable that the fourth lens group G4 has the lens group GA having negative refractive power, and a lens group GB having negative refractive power, which adjoins the image side of the lens group GA. It is preferable that the lens group GB includes at least one aspherical surface. Then fluctuation of curvature of field upon correcting hand motion blur in the telephoto end state and fluctuation of decentration coma aberration can be corrected simultaneously.

In the present embodiment, it is preferable that the conditional Expression (4) is satisfied, where fA denotes a focal length of the lens group which is a vibration isolation lens group which moves so as to have components orthogonal to the optical axis, and ft denotes a focal length of the zoom lens upon focusing on infinity in the telephoto end state.

$$0.05<(-fA)/ft<0.40 \quad (4)$$

Conditional Expression (4) specifies the focal length fA of the vibration isolating lens group with respect to the focal length ft in the telephoto end state. By satisfying the conditional Expression (4), this zoom lens can ensure optical performance upon correcting hand motion blur, and relax optical performance deterioration due to manufacturing errors. If the condition exceeds the upper limit value of the conditional Expression (4), the refractive power of the vibration isolating lens group decreases, and the shift amount of this lens group increases, which makes it difficult to correct fluctuation of astigmatism upon correcting hand motion blur. If the condition is below the lower limit value of the conditional Expression (4), on the other hand, the refractive power of the vibration isolating lens group becomes strong, and manufacturing errors become a sensitive issue, and correction of spherical aberration in the telephoto end state becomes difficult.

To ensure the effect of the present embodiment, it is preferable that the lower limit value of the conditional Expression (4) is 0.08. Then the focal length fA of the vibration isolating lens group can be set more appropriately, and spherical aberration in the telephoto end state can be corrected better. To ensure the effect of the present embodiment, it is preferable that the upper limit value of the conditional Expression (4) is 0.30. Then the focal length fA of the vibration isolating lens group can be set more appropriately, and fluctuation of astigmatism upon correcting hand motion blur can be corrected better.

To further ensure the effect of the present embodiment, it is preferable that the lower limit value of the conditional Expression (4) is 0.10. To further ensure the effect of the present embodiment, it is preferable that the upper limit value of the conditional Expression (4) is 0.25.

In the present embodiment, it is preferable that the following conditional Expression (5) is satisfied, where f4 denotes a focal length of the fourth lens group G4, and f5 denotes a focal length of the fifth lens group G5.

$$1.10<f5/(-f4)<2.00 \quad (5)$$

Conditional Expression (5) specifies the focal length f5 of the fifth lens group G5 with respect to the focal length f4 of the fourth lens group G4. By satisfying the conditional Expression (5), this zoom lens can implement good optical performance and ensure a predetermined zoom ratio. If the condition exceeds the upper limit value of the conditional Expression (5), the refractive power of the fourth lens group G4 becomes too strong, and decentration coma aberration upon correcting hand motion blur increases, and fluctuation of curvature of field increases. If the condition is below the lower limit value of the conditional Expression (5), the refractive power of the fifth lens group G5 becomes too strong, and coma aberration, curvature of field and distortion increase.

To ensure the effect of the present embodiment, it is preferable that the upper limit value of the conditional Expression (5) is 1.80. Then the focal length f4 of the fourth lens group G4 and the focal length f5 of the fifth lens group G5 can be set more appropriately, and decentration coma aberration upon correcting hand motion blur can be decreased, and fluctuation of curvature of field can be decreased. To ensure the effect of the present embodiment, it is preferable that the lower limit value of the conditional Expression (5) is 1.20. Then the focal length f4 of the fourth lens group G4 and the focal length f5 of the fifth lens group G5 can be set more appropriately, and coma aberration, curvature of field and distortion can be corrected well.

In the present embodiment, it is preferable that the following conditional Expression (6) is satisfied, where f5 denotes a focal length of the fifth lens group G5, and fw denotes a focal length of the zoom lens upon focusing on infinity in the wide-angle end state.

$$0.11<f5/fw<3.20 \quad (6)$$

The conditional Expression (6) specifies the focal length f5 of the fifth lens group G5 with respect to the focal length fw of the zoom lens in the wide-angle end state. By satisfying the conditional Expression (6), this zoom lens can implement good optical performance and ensure a predetermined zoom ratio. If the condition exceeds the upper limit value of the conditional Expression (6), the refractive power of the fifth lens group G5 becomes too weak, and refractive power of the other lens groups becomes strong in order to ensure the zoom ratio, which makes it difficult to correct spherical aberration in the telephoto end state. If the condition is below the lower limit value of the conditional Expression (6), the refractive power of the fifth lens group G5 becomes too strong, which makes it difficult to correct coma aberration in the wide-angle end state.

To ensure the effect of the present embodiment, it is preferable that the upper limit value of the conditional Expression (6) is 2.60. Then the focal length f5 of the fifth lens group G5 with respect to the focal length fw of the zoom lens in the wide-angle end state can be set more appropriately, and spherical aberration in the telephoto end state can be corrected well. To ensure the effect of the present embodiment, it is preferable that the lower limit value of the conditional Expression (6) is 0.50. Then the focal length f5 of the fifth lens group G5 with respect to the focal length fw of the zoom lens in the wide-angle end state can be set more appropriately, and coma aberration in the wide-angle end state can be corrected better.

In the present embodiment, it is preferable that the fourth lens group G4 has a cemented lens. Because of this configuration, both the longitudinal chromatic aberration and lateral chromatic aberration can be corrected well.

In the present embodiment, it is preferable that, upon zooming from the wide-angle end state to the telephoto end state, the distance between the first lens group G1 and the second lens group G2 increases, the distance between the second lens group G2 and the third lens group G3 decreases, the distance between the third lens group G3 and the fourth lens group G4 increases, and the distance between the fourth lens group G4 and the fifth lens group G5 decreases. Then a predetermined zoom ratio can be ensured while effectively correcting the fluctuation of spherical aberration and curvature of field.

In the present embodiment, it is preferable that the third lens group G3 and the fifth lens group G5 move together upon zooming from the wide-angle end state to the telephoto end state. Then deterioration of performance due to decentration of the fifth lens group G5 during manufacturing can be decreased while ensuring a predetermined zoom ratio.

In the present embodiment, it is preferable that the third lens group G3 has three lens groups having positive refractive power, and these three lens groups include at least two cemented lenses. Then curvature of field in the wide-angle end state and spherical aberration in the telephoto end state can be simultaneously corrected.

In the present embodiment, it is preferable that focusing from an object in infinity to an object at close distance is performed by moving at least a part of the second lens group G2 in the optical axis direction. Then fluctuation of spherical aberration and curvature of field upon focusing on an object at close distance can be decreased. By using this small sized lens group as the focusing lens group, focusing can be performed quickly.

Second Embodiment

As FIG. 10 shows, a zoom lens according to a second embodiment has, in order from an object, a first lens group G1 having positive refractive power, a second lens group G2 having negative refractive power, a third lens group G3 having positive refractive power, a fourth lens group G4 having negative refractive power, and a fifth lens group G5 having positive refractive power, and an image plane is corrected upon generation of hand motion blur, by moving at least a part of the fourth lens group G4 so as to have components orthogonal to the optical axis.

In the present embodiment, the fourth lens group G4, which is constituted by less number of lenses than the other lens groups, and of which lens diameter can be decreased, is appropriate to enclose a motion blur correction mechanism. Because of this configuration, the size of the lens barrel can be decreased, and fluctuation of aberrations due to hand motion blur correction can be corrected well.

In the above configuration, it is preferable that the following conditional Expression (7) is satisfied, where f4 denotes a focal length of the fourth lens group G4, and ft denotes a focal length of the zoom lens in the telephoto end state.

$$0.01 < (-f4)/ft < 0.20 \qquad (7)$$

Conditional Expression (7) specifies the focal length ft in the telephoto end state with respect to the focal length f4 of the fourth lens group G4. By satisfying this conditional Expression (7), this zoom lens can implement good optical performance and ensure a predetermined zoom ratio. If the condition is below the lower limit value of the conditional Expression (7), the refractive power of the fourth lens group G4 becomes strong, which makes it difficult to correct the spherical aberration in the telephoto end state. If the condition exceeds the upper limit value of the conditional Expression (7), the refractive power of the fourth lens group G4 becomes weak, and the shift amount of the fourth lens group G4 increases, which makes it difficult to correct fluctuation of astigmatism upon correcting hand motion blur.

To ensure the effect of the present embodiment, it is preferable that the lower limit value of the conditional Expression (7) is 0.07. To ensure the effect of the present embodiment, it is preferable that the upper limit value of the conditional Expression (7) is 0.13.

In the present embodiment, it is preferable that the following conditional Expression (8) is satisfied, where f5 denotes a focal length of the fifth lens group G5, and f4 denotes a focal length of the fourth lens group G4.

$$0.80 < f5/(-f4) < 3.50 \qquad (8)$$

Conditional Expression (8) specifies the focal length f4 of the fourth lens group G4 with respect to the focal length f5 of the fifth lens group G5. By satisfying the conditional Expression (8), this zoom lens can implement good optical performance and ensure a predetermined zoom ratio. If the condition exceeds the upper limit value of the conditional Expression (8), the refractive power of the fourth lens group G4 becomes strong, which makes it difficult to correct spherical aberration in the telephoto end state. If the condition is below the lower limit value of the conditional Expression (8), on the other hand, the refractive power of the fifth lens group G5 becomes strong, which makes it difficult to correct coma aberration in the wide-angle end state.

To ensure the effect of the present embodiment, it is preferable that the lower limit value of the conditional Expression (8) is 1.10. To ensure the effect of the present embodiment, it is preferable that the upper limit value of the conditional Expression (8) is 2.90.

To further ensure the effect of the present embodiment, it is preferable that the lower limit value of the conditional Expression (8) is 1.40. To further ensure the effect of the present embodiment, it is preferable that the upper limit value of the conditional Expression (8) is 1.70.

In the present embodiment, it is preferable that the following conditional Expression (9) is satisfied, where f2 denotes a focal length of the second lens group G2, and f4 denotes a focal length of the fourth lens group G4.

$$0.45 < (-f2)/(-f4) < 1.25 \qquad (9)$$

Conditional Expression (9) specifies the focal length f4 of the fourth lens group G4 with respect to the focal length f2 of the second lens group G2. By satisfying the conditional Expression (9), this zoom lens can implement good optical performance. If the condition exceeds the upper limit value of the conditional Expression (9), the refractive power of the fourth lens group G4 becomes too strong, which makes it difficult to simultaneously correct the fluctuation of curvature of field and fluctuation of decentration coma aberration upon correcting hand motion blur. If the condition is below the lower limit value of the conditional Expression (9), on the other hand, the refractive power of the second lens group G2 becomes strong, which makes it difficult to correct abaxial aberration, particularly field of curvature and astigmatism, in the wide-angle end state.

To ensure the effect of the present embodiment, it is preferable that the lower limit value of the conditional Expression (9) is 0.53. To ensure the effect of the present embodiment, it is preferable that the upper limit value of the conditional Expression (9) is 1.00.

In the present embodiment, it is preferable that the following conditional Expression (10) is satisfied, where f1 denotes a focal length of the first lens group G1, and f4 denotes a focal length of the fourth lens group G4.

$$3.45 < f1/(-f4) < 6.00 \qquad (10)$$

Conditional Expression (10) specifies the focal length f4 of the fourth lens group G4 with respect to the focal length f1 of the first lens group G1. By satisfying the conditional Expression (10), this zoom lens can ensure a predetermined zoom ratio while ensuring optical performance upon correcting hand motion blur. If the condition exceeds the upper limit value of the conditional Expression (10), the refractive power of the fourth lens group G4 becomes strong, which makes it difficult to simultaneously correct fluctuation of curvature of field and fluctuation of decentration coma aberration upon correcting hand motion blur. If the condition is below the lower limit value of the conditional Expression (10), the refractive power of the first lens group G1 becomes strong, which makes it difficult to correct spherical aberration in the telephoto end state. Deterioration of lateral chromatic aberration in the wide-angle end state also becomes obvious, which is not desirable.

To ensure the effect of the present embodiment, it is preferable that the lower limit value of the conditional Expression (10) is 3.55. To ensure the effect of the present embodiment, it is preferable that the upper limit value of the conditional Expression (7) is 5.54.

In the present embodiment, it is preferable that the fourth lens group G4 has, in order from the object, a lens group GA having negative refractive power and a lens group GB having negative refractive power. It is preferable that the lens group GB (which is disposed adjoining the image side of the lens group GA) has at least one aspherical surface. Then the fluctuation of curvature of field and fluctuation of the decentration coma aberration upon correcting hand motion blur in the telephoto end state can be simultaneously corrected.

In the present embodiment, it is preferable that the fourth lens group G4 has a cemented lens. Because of this configuration, both the longitudinal chromatic aberration and lateral chromatic aberration can be corrected well.

In the present embodiment, it is preferable that, upon zooming from the wide-angle end state to the telephoto end state, the distance between the first lens group G1 and the second lens group G2 increases, the distance between the second lens group G2 and the third lens group G3 decreases, the distance between the third lens group G3 and the fourth lens group G4 increases, and the distance between the fourth lens group G4 and the fifth lens group G5 decreases. Then a predetermined zoom ratio can be ensured while effectively correcting the fluctuation of spherical aberration and curvature of field.

In the present embodiment, it is preferable that the third lens group G3 and the fifth lens group G5 move together upon zooming from the wide-angle end state to the telephoto end state. Then deterioration of performance due to decentration of the fifth lens group G5 during manufacturing can be decreased while ensuring a predetermined zoom ratio.

In the present embodiment, it is preferable that the following conditional Expression (11) is satisfied, where f5 denotes a focal length of the fifth lens group G5, and ft denotes a focal length of the zoom lens in the telephoto end state.

$$0.05 < f5/ft < 0.35 \quad (11)$$

Conditional Expression (11) specifies the focal length ft in the telephoto end state with respect to the focal length f5 of the fifth lens group G5. By satisfying the conditional Expression (11), this zoom lens can implement good optical performance and ensure a predetermined zoom ratio. If the condition exceeds the upper limit value of the conditional Expression (11), the refraction power of the fifth lens group G5 becomes weak, and the refractive power of the third lens group G3 becomes strong in order to ensure the zoom ratio, which makes it difficult to correct spherical aberration in the telephoto end state. If the condition is below the lower limit value of the conditional Expression (11), on the other hand, the refractive power of the fifth lens group G5 becomes strong, which makes it difficult to correct coma aberration in the wide-angle end state.

To ensure the effect of the present embodiment, it is preferable that the lower limit value of the conditional Expression (11) is 0.10. To ensure the effect of the present embodiment, it is preferable that the upper limit value of the conditional Expression (11) is 0.21.

In the present embodiment, it is preferable that the fifth lens group G5 has at least two lens groups having positive refractive power, and a lens group having negative refractive power. The fifth lens group G5 includes at least one cemented lens. Then curvature of field in the wide-angle end state and fluctuation of aberration due to decentration during manufacturing can be simultaneously corrected.

In the present embodiment, it is preferable that the following conditional Expression (12) is satisfied, where Bft denotes a back focus in the telephoto end state, Bfw denotes a back focus in the wide-angle end state, and f3 denotes a focal length of the zoom lens in the telephoto end state.

$$1.35 < (Bft-Bfw)/f3 < 1.80 \quad (12)$$

Conditional Expression (12) specifies the focal length f3 of the third lens group G3 with respect to the difference between the back focus Bft in the telephoto end state and the back focus Bfw in the wide-angle end state. By satisfying the conditional Expression (12), this zoom lens can implement good optical performance and ensure a predetermined zoom ratio. If the condition exceeds the upper limit value of the conditional Expression (12), the refractive power of the third lens group G3 becomes strong, which makes it difficult to correct the spherical aberration in the telephoto end state. If the condition is below the lower limit value of the conditional Expression (12), on the other hand, refractive power of the first lens group G1 and the second lens group G2 become strong, which makes it difficult to correct fluctuation of high order coma aberration generated upon zooming from the wide-angle end state to the telephoto end state.

To ensure the effect of the present embodiment, it is preferable that the lower limit value of the conditional Expression (12) is 1.40. To ensure the effect of the present embodiment, it is preferable that the upper limit value of the conditional Expression (12) is 1.65.

In the present embodiment, it is preferable that the third lens group G3 includes at least three lens groups having positive refractive power. It is further preferable that the third lens group G3 includes at least one cemented lens. Then the curvature of field in the wide-angle end state and spherical aberration in the telephoto end state can be simultaneously corrected.

In the present embodiment, it is preferable that the second lens group G2 has at least one aspherical surface. Then the curvature of field and distortion in the wide-angle end state can be corrected well.

Third Embodiment

As FIG. 22 shows, a zoom lens according to a third embodiment has, in order from an object, a first lens group G1 having positive refractive power, a second lens group G2 having negative refractive power, a third lens group G3 having positive refractive power, a fourth lens group G4 having negative refractive power, and a fifth lens group G5 having positive refractive power, and an image plane is corrected upon generation of hand motion blur by moving at least a part of the fourth lens group G4 so as to have components orthogonal to the optical axis.

The fourth lens group G4, which is constituted by less number of lenses than the other lens groups, and of which lens diameter can be decreased, is appropriate to enclose a motion blur correction mechanism. Because of this configuration, the size of the lens barrel can be decreased, and fluctuation of aberrations due to hand motion blur correction can be corrected well.

In the above configuration, it is preferable that the following conditional Expression (13) is satisfied, where f1 denotes a focal length of the first lens group G1, and f4 denotes a focal length of the fourth lens group G4.

$$3.45 < f1/(-f4) < 6.00 \quad (13)$$

Conditional Expression (13) specifies the focal length f4 of the fourth lens group G4 with respect to the focal length f1 of the first lens group G1. By satisfying this conditional Expression (13), this zoom lens can ensure a predetermined zoom ratio while ensuring the optical performance upon correcting hand motion blur. If the condition exceeds the upper limit value of the conditional Expression (13), the refractive power of the fourth lens group G4 becomes strong, which makes it difficult to simultaneously correct the fluctuation of the curvature of field and fluctuation of decentration coma aberration upon correcting hand motion blur. If the condition is below the lower limit value of the conditional Expression (13), on the other hand, the refractive power of the first lens group G1 becomes strong, which makes it difficult to correct the spherical aberration in the telephoto end state. Deterioration of lateral chromatic aberration in the wide-angle end sate also becomes obvious, which is not desirable.

To ensure the effect of the present embodiment, it is preferable that the lower limit value of the conditional Expression (13) is 3.55. To ensure the effect of the present embodiment, it is preferable that the upper limit value of the conditional Expression (13) is 5.54.

In the present embodiment, it is preferable that the following conditional Expression (14) is satisfied, where f4 denotes a focal length of the fourth lens group G4, and ft denotes a focal length of the zoom lens in the telephoto end state.

$$0.01<(-f4)/ft<0.20 \quad (14)$$

Conditional Expression (14) specifies the focal length f4 of the fourth lens group G4 with respect to the focal length ft in the telephoto end state. By satisfying the conditional Expression (14), this zoom lens can implement good optical performance, and ensure a predetermined zoom ratio. If the condition exceeds the upper limit value of the conditional Expression (14), the refractive power of the fourth lens group G4 becomes weak, and the shift amount of the fourth lens group G4 increases, which makes it difficult to correct astigmatism upon correcting hand motion blur. If the condition is below the lower limit value of conditional Expression (14), on the other hand, the refractive power of the fourth lens group G4 becomes strong, which makes it difficult to correct spherical aberration in the telephoto end state.

To ensure the effect of the present embodiment, it is preferable that the lower limit value of the conditional Expression (14) is 0.05. To ensure the effect of the present embodiment, it is preferable that the upper limit value of the conditional Expression (14) is 0.13.

In the present embodiment, it is preferable that, upon zooming from the wide-angle end state to the telephoto end state, the distance between the first lens group G1 and the second lens group G2 increases, the distance between the second lens group G2 and the third lens group G3 decreases, the distance between the third lens group G3 and the fourth lens group G4 increases, and the distance between the fourth lens group G4 and the fifth lens group G5 decreases. Then a predetermined zoom ratio can be ensured while effectively correcting the fluctuation of spherical aberration and curvature of field.

In the present embodiment, it is preferable that the fourth lens group G4 has, in order from the object, a lens group GA having negative refractive power and a lens group GB having negative refractive power. Then the fluctuation of the curvature of field and fluctuation of decentration coma aberration upon correcting hand motion blur in the telephoto end state can be simultaneously corrected.

In the present embodiment, it is preferable that the fourth lens group G4 has at least one aspherical surface. The fluctuation of curvature of field and fluctuation of decentration coma aberration upon correcting hand motion blur in the telephoto end state can be simultaneously corrected.

In the present embodiment, it is preferable that the fourth lens group G4 has a cemented lens. Because of this configuration, the longitudinal and lateral chromatic aberration can be corrected well.

In the present embodiment, it is preferable that the following conditional Expression (15) is satisfied, where f2 denotes a focal length of the second lens group G2, and f4 denotes a focal length of the fourth lens group G4.

$$0.45<(-f2)/(-f4)<1.25 \quad (15)$$

Conditional Expression (15) specifies the focal length f4 of the fourth lens group G4 with respect to the focal length f2 of the second lens group G2. By satisfying the conditional Expression (15), this zoom lens can implement good optical performance. If the condition exceeds the upper limit value of the conditional Expression (15), the refractive power of the fourth lens group G4 becomes strong, which makes it difficult to simultaneously correct fluctuation of curvature of field and fluctuation of decentration coma aberration upon correcting hand motion blur. If the condition is below the lower limit value of the conditional Expression (15), the refractive power of the second lens group G2 becomes strong, which makes it difficult to correct abaxial aberration, particularly curvature of field and astigmatism, in the wide-angle end state.

To ensure the effect of the present embodiment, it is preferable that the lower limit value of the conditional Expression (15) is 0.53. To ensure the effect of the present embodiment, it is preferable that the upper limit value of the conditional Expression (15) is 1.00.

In the present embodiment, it is preferable that the following conditional Expression (16) is satisfied, where Bft denotes a back focus in the telephoto end state, Bfw denotes a back focus in the wide-angle end state, and f3 denotes a focal length of the third lens group G3.

$$1.35<(Bft-Bfw)/f3<1.80 \quad (16)$$

Conditional Expression (16) specifies the focal length f3 of the third lens group G3 with respect to the difference between the back focus Bft in the telephoto end state, and the back focus Bfw in the wide-angle end state. By satisfying this conditional Expression (16), this zoom lens can implement good optical performance, and ensure a predetermined zoom ratio. If the condition exceeds the upper limit value of the conditional Expression (16), the refractive power of the third lens group G3 becomes strong, which makes it difficult to correct the spherical aberration in the telephoto end state. If the condition is below the lower limit value of the conditional Expression (16), on the other hand, refractive power of the first lens group G1 and the second lens group G2 become strong, which makes it difficult to correct fluctuation of high order coma aberration generated upon zooming from the wide-angle end state to the telephoto end state.

To ensure the effect of the present embodiment, it is preferable that the lower limit value of the conditional Expression (16) is 1.40. To ensure the effect of the present embodiment, it is preferable that the upper limit value of the conditional Expression (16) is 1.65.

In the present embodiment, it is preferable that the following conditional Expression (17) is satisfied, where f5 denotes a focal length of the fifth lens group G5, and ft denotes a focal length of the zoom lens in the telephoto end state.

$$0.05<f5/ft<0.35 \quad (17)$$

Conditional Expression (17) specifies the focal length ft in the telephoto end state with respect to the focal length f5 of the fifth lens group G5. By satisfying the conditional Expression (17), this zoom lens can implement good optical performance, and ensure a predetermined zoom ratio. If the condition exceeds the upper limit value of the conditional Expression (17), the refractive power of the fifth lens group G5 becomes weak, and the refractive power of the third lens group G3 becomes strong in order to ensure the zoom ratio, which makes it difficult to correct spherical aberration in the telephoto end state. If the condition is below the lower limit value of the conditional Expression (17), on the other hand, the refractive power of the fifth lens group G5 becomes strong, which makes it difficult to correct coma aberration in the wide-angle end state.

To ensure the effect of the present embodiment, it is preferable that the lower limit value of the conditional Expression (17) is 0.10. To ensure the effect of the present embodiment, it is preferable that the upper limit value of the conditional Expression (17) is 0.21.

In the present embodiment, it is preferable that the following conditional Expression (18) is satisfied, where f1 denotes a focal length of the first lens group G1, and f3 denotes a focal length of the third lens group G3.

$$3.50 < f1/f3 < 4.60 \quad (18)$$

Conditional Expression (18) specifies the focal length f3 of the third lens group G3 with respect to the focal length f1 of the first lens group G1. By satisfying the conditional Expression (18), this zoom lens can implement good optical performance and effectively perform color correction. If the condition exceeds the upper limit value of the conditional Expression (18), the refractive power of the third lens group G3 becomes strong, which makes it difficult to correct coma aberration in the wide-end state, and correct spherical aberration in the telephoto end state. Deterioration of image forming performance due to manufacturing errors also becomes obvious. If the condition is below the lower limit value of the conditional Expression (18), on the other hand, the refractive power of the first lens group G1 become strong, which makes it difficult to correct lateral chromatic aberration.

To ensure the effect of the present embodiment, it is preferable that the lower limit value of the conditional Expression (18) is 4.00. To ensure the effect of the present embodiment, it is preferable that the upper limit value of the conditional Expression (18) is 4.40.

In the present embodiment, it is preferable that, upon zooming from the wide-angle end state to the telephoto end state, the third lens group G3 and the fifth lens group G5 move together. Then deterioration of performance of the fifth lens group G5 due to decentration during manufacturing can be minimized while ensuring a predetermined zoom ratio.

In the present embodiment, it is preferable that the second lens group G2 has an aspherical surface. Then the curvature of field and distortion in the wide-angle end state can be corrected well.

In the present embodiment, it is preferable that the third lens group G3 includes at least three positive lenses. Then the curvature of field in the wide-angle end state and spherical aberration in the telephoto end state can be simultaneously corrected.

Figure 34:
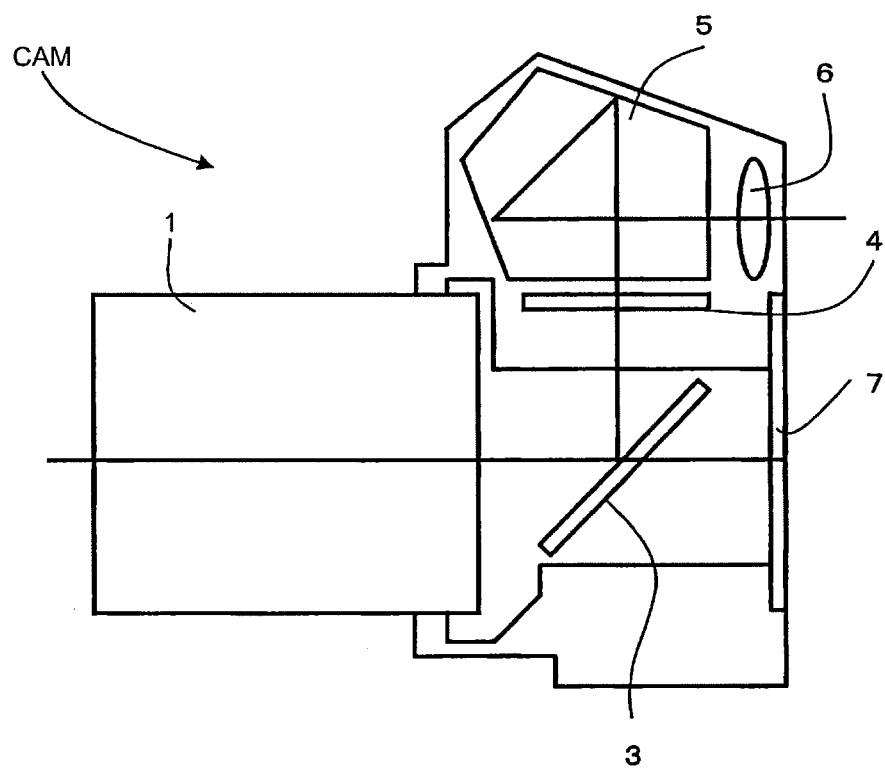
FIG. 34 is a cross-sectional view of a digital single lens reflex camera CAM (optical apparatus) having the zoom lens with the above configuration as an image-capturing lens.

FIG. 34 shows a cross-sectional view of a digital single lens reflex camera CAM (optical apparatus) having a zoom lens with the above mentioned configuration as an image-capturing lens 1. In the digital single lens reflex camera CAM shown in FIG. 34, lights from an object (subject), which is not illustrated, are collected by the image-capturing lens 1, and form an image on a focal plane plate 4 via a quick return mirror 3. The lights which formed an image on the focal plane plate 4 are reflected a plurality of times in a penta prism 5, and are guided to an eye piece 6. Thereby the user can observe the object (subject) image as an upright image via the eye piece 6.

If the user presses a release button, which is not illustrated, the quick return mirror 3 is retracted from the optical path, and the lights of the object (subject), which is not illustrated, collected by the image-capturing lens 1, form an object image on a picture element 7. Thus the lights from the object (subject) are captured by the picture element 7, and are recorded in a memory, which is not illustrated, as an object (subject) image. In this way, the user can capture an image of an object (subject) using this camera CAM. The camera CAM in FIG. 34 may removably hold the image-capturing lens 1, or may be integrated with the image-capturing lens 1. The camera CAM may be a single lens reflex camera, or a compact camera which has no quick return mirror.

EXAMPLES

Concrete examples will now be described with reference to the drawings. Table 1 to Table 9 shown below are tables listing each data according to Example 1 to Example 9.

In [General Data], f is a focal length of the zoom lens, FNO is an F number, ω is a half angle of view, Y is an image height, TL is a total length of the zoom lens, and Bf is back focus.

In [Lens Data], the surface number is a sequence of the lens surface counted from the object side along the light traveling direction, r is a radius of curvature of each lens surface, d is a distance from each optical surface to the next optical surface (or image plane) on the optical axis, νd is an Abbe number at d-line (wavelength: 587.6 nm), and nd is a refractive index at d-line. "*" attached at the surface number indicates that this lens surface is aspherical, and the column of the radius of curvature r shows a paraxial radius of curvature. "0.0000" and "∞" in the radius of curvature indicates a plane or an aperture. The refractive index of air "1.00000" is omitted.

In [Aspherical Data], the shape of the aspherical surface shown in [Lens Data] is given by the following Expression (a). In the following Expression (a), y denotes the height in the direction perpendicular to the optical axis, S(y) denotes a distance (sag) from a tangential plane at a vertex of the aspherical surface to a position on the aspherical surface at height y along the optical axis, r denotes a radius of curvature (paraxial radius of curvature) of a reference spherical surface, κ denotes a conical coefficient, and An denotes an aspherical coefficient in degree n. In each example, the aspherical coefficient A2 of degree 2 is "0", which is omitted here. En means ×10$^n$. For example 1.234E−05=1.234×10$^{-5}$.

$$S(y) = (y^2/r)/\{1 + (1 - \kappa \cdot y^2/r^2)^{1/2}\} + A3 \times |y^3| + \quad (a)$$
$$A4 \times y^4 + A6 \times y^6 + A8 \times y^8 + A10 \times y^{10} + A12 \times y^{12}$$

In [Variable Surface Distance Data] shown in Table 1 to 3, f is a focal length of the zoom lens, β is an image formation magnification between an object and an image, Di (i is an integer) is a variable distance of the i-th surface to the next lens surface, and Bf is back focus. 1-POS shows a case of focusing on infinity in the wide-angle end state, 2-POS shows a case of focusing on infinity in the first intermediate focal length state, 3-POS shows a case of focusing on infinity in the second intermediate focal length state, 4-POS shows a case of focusing on infinity in the telephoto end state, 5-POS shows a case of focusing with β=−0.03333 in the wide-angle end state, 6-POS shows a case of focusing with β=−0.03333 in the first intermediate focal length state, 7-POS shows a case of focusing with β=−0.03333 in the second intermediate focal length state, 8-POS shows a case of focusing with β=−0.03333 in the telephoto end state, 9-POS shows a case of focusing on close distance in the wide-angle end state, 10-POS shows a case of focusing on close distance in the first intermediate focal length state, 11-POS shows a case of focusing on close distance in the second intermediate focal length state, and 12-POS shows a case of focusing on close distance in the telephoto end state.

In [Variable Distance Data] shown in Table 4 to Table 9, f is a focal length of the zoom lens, and Di (i is an integer) is a variable distance of the i-th surface to the next surface.

In [Lens Group Data], a first surface and focal length of each lens group are shown.

In [Conditional Expression Correspondence Value], values corresponding to the above conditional Expressions (1) to (18) are shown.

In tables, "mm" is normally used for the unit of focal length f, radius of curvature r and surface distance d, and other lengths. However the unit is not limited to "mm" and another appropriate unit may be used instead, since an equivalent optical performance is obtained even if an optical system is proportionally expanded or proportionally reduced.

The description on tables is the same for other examples, where description thereof is omitted. In Example 1 to Example 9 shown below, Example 1 to Example 3 correspond to the first embodiment, Example 4 to Example 6 correspond to the second embodiment, and Example 7 to Example 9 correspond to the third embodiment.

The lens groups constituting the zoom lens according to each example are denoted as, in order from the object, a first lens group G1, a second lens group G2, . . . , and lenses constituting each lens group are denoted as L11, L12, . . . , in the first lens group, and L21, L22, . . . , in the second lens group, and serial numbers are assigned to the lens faces of all of these lenses in order from the object.

Example 1

Example 1 will now be described with reference to FIG. 1 to FIG. 3 and Table 1. FIG. 1 is a diagram depicting a configuration and zoom locus of a lens according to Example 1. As shown in FIG. 1, the zoom lens according to Example 1 has, in order from the object, a first lens group G1 having positive refractive power, a second lens group G2 having negative refractive power, a third lens group G3 having positive refractive power, a fourth lens group G4 having negative refractive power, and a fifth lens group G5 having positive refractive power.

The first lens group G1 has, in order from the object, a cemented positive lens of a negative meniscus lens L11 having a convex surface facing the object and a biconvex lens L12, and a positive meniscus lens L13 having a convex surface facing the object.

The second lens group G2 has, in order from the object, a negative meniscus lens L21 which has a convex surface facing the object and of which object side surface is aspherical, a biconcave lens L22, a cemented lens of a biconvex lens L23 and a negative meniscus lens L24 having a concave surface facing the object, and a negative meniscus lens L25 having a concave surface facing the object. The negative meniscus lens L21 is a compound aspherical lens having a portion which is formed by a resin material and has an aspherical surface, and a portion which is formed by glass material.

The third lens group G3 has, in order from the object, a biconvex lens L31, a positive meniscus lens L32 having a convex surface facing the object, and a cemented positive lens of a negative meniscus lens L33 having a convex surface facing the object and a positive meniscus lens L34 having a convex surface facing the object.

The fourth lens group G4 has, in order from the object, a lens group GA having negative refractive power which corrects hand motion blur by moving so as to have components orthogonal to the optical axis, and a lens group GB having negative refractive power. The lens group GA has a cemented negative lens of, in order from the object, a biconcave lens L41 and an aspherical positive lens L42 which has an aspherical surface facing the image and has a convex surface facing the object. The lens group GB has a negative meniscus lens L43 having a concave surface facing the object.

The fifth lens group G5 has, in order from the object, an aspherical biconvex lens L51 having an aspherical surface facing the image, a cemented positive lens of a biconvex lens L52 and a negative meniscus lens L53 having a concave surface facing the object, and a negative meniscus lens L54 having a concave surface facing the object.

In the zoom lens according to this example which has the above configuration, upon zooming from a wide-angle end state to a telephoto end state, the distance between the first lens group G1 and the second lens group G2 increases, the distance between the second lens group G2 and the third lens group G3 decreases, the distance between the third lens group G3 and the fourth lens group G4 increases, and the distance between the fourth lens group G4 and the fifth lens group G5 decreases. At this time, the third lens group G3 and the fifth lens group G5 move together.

In the zoom lens according to this example, focusing from infinity to a close object is performed by moving the second lens group G2 in a direction toward the object.

An aperture stop S is disposed between the second lens group G2 and the third lens group G3, and moves together with the third lens group G3 upon zooming from the wide-angle end state to the telephoto end state.

Table 1 shows each data value of the zoom lens according to Example 1. The surface numbers 1 to 35 in Table 1 correspond to the surfaces 1 to 35 in FIG. 1.

TABLE 1

[General Data]

f = 29.1~292
FNO = 3.6~5.9
2ω = 75.92°~8.22°
Y = 21.6
TL = 163.77~239.01
Bf = 38.30~79.07

[Lens Data]

| Surface number | r | d | vd | nd |
|---|---|---|---|---|
| 1 | 151.1527 | 1.8000 | 32.35 | 1.850260 |
| 2 | 68.0198 | 10.0255 | 82.52 | 1.497820 |
| 3 | −538.6972 | 0.1000 | | |
| 4 | 66.3072 | 6.3291 | 63.38 | 1.618000 |
| 5 | 472.1276 | D5 | | |
| *6 | 107.6136 | 0.2000 | 38.09 | 1.553890 |
| 7 | 107.6136 | 1.0000 | 52.29 | 1.755000 |
| 8 | 18.4339 | 6.5000 | | |
| 9 | −48.3041 | 1.0000 | 40.77 | 1.883000 |
| 10 | 75.1044 | 0.1000 | | |
| 11 | 35.4941 | 6.0000 | 25.43 | 1.805180 |
| 12 | −25.1321 | 1.0000 | 46.63 | 1.816000 |
| 13 | −39.5271 | 1.0000 | | |
| 14 | −25.8306 | 1.0000 | 46.63 | 1.816000 |
| 15 | −6376.7789 | D15 | | |

TABLE 1-continued

| 16 | aperture stop S | 1.0000 | | |
|---|---|---|---|---|
| 17 | 1255.1135 | 3.5000 | 69.89 | 1.518600 |
| 18 | −42.5806 | 0.1000 | | |
| 19 | 26.2857 | 4.0000 | 82.56 | 1.497820 |
| 20 | 245.0143 | 0.1000 | | |
| 21 | 27.9820 | 1.0000 | 25.43 | 1.805180 |
| 22 | 14.7422 | 6.5000 | 58.89 | 1.518230 |
| 23 | 190.7576 | D23 | | |
| 24 | −90.8993 | 1.0000 | 49.61 | 1.772500 |
| 25 | 15.3080 | 4.5000 | 32.35 | 1.850260 |
| *26 | 47.3128 | 4.0000 | | |
| 27 | −24.6747 | 1.0000 | 42.72 | 1.834810 |
| 28 | −50.9926 | D28 | | |
| 29 | 47.8109 | 8.0000 | 69.89 | 1.518600 |
| *30 | −24.7604 | 4.8012 | | |
| 31 | 43.6539 | 8.0000 | 52.32 | 1.517420 |
| 32 | −25.7562 | 2.0000 | 40.77 | 1.883000 |
| 33 | −49.5366 | 2.0000 | | |
| 34 | −28.1887 | 1.0000 | 46.63 | 1.816000 |
| 35 | −184.7070 | Bf | | |

[Aspherical Data]

Sixth surface $\kappa = 15.3921, A3 = -0.59282E-05, A4 = 1.30620E-06,$
$A6 = 9.36650E-09,$
$A8 = -1.11260E-10, A10 = 4.97080E-13, A12 = -0.56752E-15,$
$A14 = 0.00000$ Twenty sixth surface $\kappa = -25.8788, A3 = 0.00000, A4 = 3.09780E-05, A6 = -1.24430E-07,$
$A8 = 3.16720E-10, A10 = 0.00000, A12 = 0.00000, A14 = 0.00000$ Thirtieth surface $\kappa = 0.0568, A3 = 0.35585E-06, A4 = 4.96950E-09, A6 = 5.91140E-09,$
$A8 = -4.14490E-11, A10 = 1.10780E-13, A12 = 0.00000,$
$A14 = 0.00000$

[Variable Surface Distance Data]

| | 1-POS | 2-POS | 3-POS | 4-POS |
|---|---|---|---|---|
| f, β | 29.09101 | 48.2400 | 100.6506 | 291.819 |
| D0 | 0.0000 | 0.0000 | 0.0000 | 0.0000 |
| D5 | 2.12367 | 17.46296 | 38.43018 | 62.16137 |
| D15 | 26.06867 | 19.06022 | 11.97558 | 0.49737 |
| D23 | 2.32242 | 3.99110 | 5.71830 | 6.85273 |
| D28 | 6.40577 | 4.73716 | 3.00987 | 1.87544 |
| Bf | 38.29617 | 48.53884 | 64.87857 | 79.06793 |

| | 5-POS | 6-POS | 7-POS | 8-POS |
|---|---|---|---|---|
| β | −0.03333 | −0.03333 | −0.03333 | −0.03333 |
| D0 | 821.2069 | 1353.4997 | 2798.6977 | 6780.5062 |
| D5 | 1.47269 | 16.83833 | 37.68497 | 58.30009 |
| D15 | 26.71965 | 19.68485 | 12.72079 | 4.35865 |
| D23 | 2.32242 | 3.99110 | 5.71830 | 6.85273 |
| D28 | 6.40577 | 4.73716 | 3.00987 | 1.87544 |
| Bf | 38.29617 | 48.53884 | 64.87857 | 79.06794 |

| | 9-POS | 10-POS | 11-POS | 12-POS |
|---|---|---|---|---|
| β | −0.07534 | −0.11871 | −0.21005 | −0.31900 |
| D0 | 336.2274 | 317.6538 | 287.4316 | 260.5686 |
| D5 | 0.66800 | 15.29562 | 34.15968 | 48.72149 |
| D15 | 27.52434 | 21.22756 | 16.24608 | 13.93725 |
| D23 | 2.32242 | 3.99110 | 5.71830 | 6.85273 |
| D28 | 6.40577 | 4.73716 | 3.00987 | 1.87544 |
| Bf | 38.29617 | 48.53885 | 64.87856 | 79.06793 |

[Lens Group Data]

| Group number | First surface of group | Focal length of group |
|---|---|---|
| G1 | 1 | 106.56812 |
| G2 | 6 | −17.08486 |
| G3 | 16 | 27.20141 |
| G4 | 24 | −24.83040 |
| G5 | 29 | 33.33177 |

[Conditional Expression Correspondence Value]

Conditional Expression (1) f5/ft = 0.114
Conditional Expression (2) (−f2)/(−f4) = 0.688
Conditional Expression (3) (−f4)/ft = 0.085
Conditional Expression (4) (−fA)/ft = 0.159
Conditional Expression (5) f5/(−f4) = 1.342
Conditional Expression (6) f5/fw = 1.145

As shown in the data table in Table 1, the zoom lens according to Example 1 satisfies all the conditional Expressions (1) to (6).

Figure 2A:
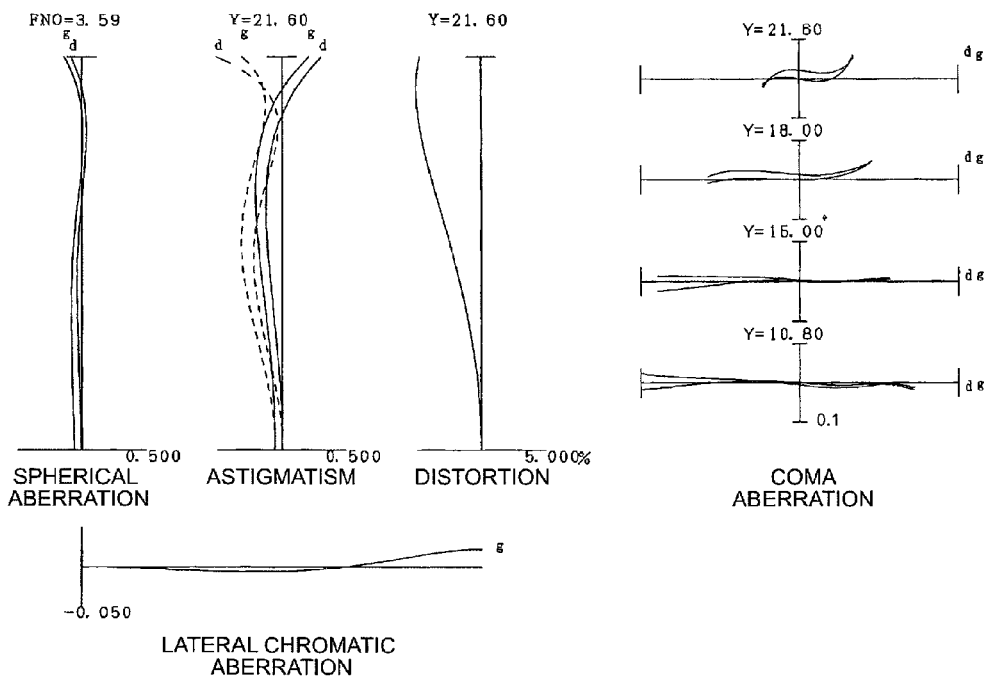
FIG. 2A are graphs showing various aberrations of the zoom lens according to Example 1 upon focusing on infinity in the wide-angle end state, and FIG. 2B are graphs showing lateral aberrations after image blur is corrected.
Figure 2B:
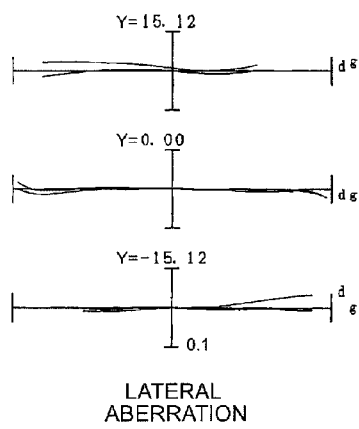
Figure 3A:
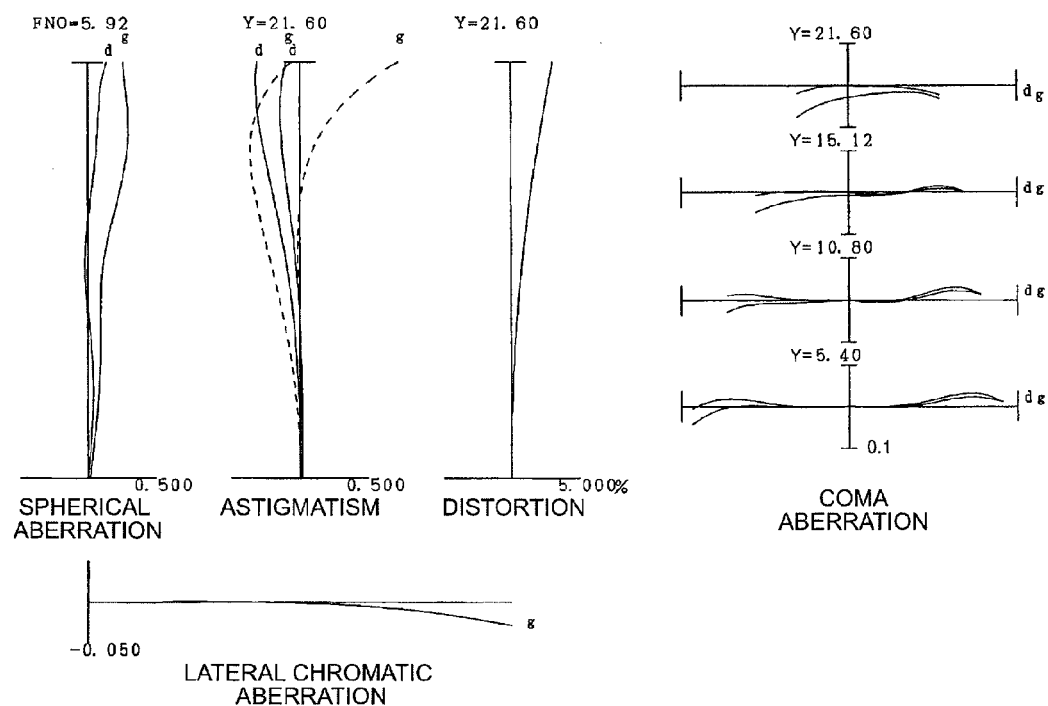
FIG. 3A are graphs showing various aberrations of the zoom lens according to Example 1 upon focusing on infinity in the telephoto end state, and FIG. 3B are graphs showing lateral aberrations after image blur is corrected.
Figure 3B:
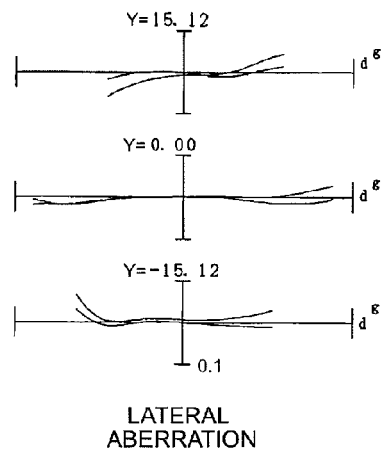

FIG. 2A and FIG. 2B are graphs showing various aberrations of the zoom lens according to Example 1 upon focusing on infinity in the wide-angle end state, and graphs showing lateral aberrations when image blur is corrected (shift amount of vibration isolating lens group GA=0.27). FIG. 3A and FIG. 3B are graphs showing various aberrations of the zoom lens according to Example 1 upon focusing on infinity in the telephoto end state, and graphs showing lateral aberrations when image blur is corrected (shift amount of vibration isolating lens group GA=0.50).

In each graph showing aberration, FNO is an F number, and Y is an image height (unit: mm). In the graphs showing spherical aberration, a value of the F number corresponding to the maximum aperture is shown, in the graphs showing astigmatism and graphs showing distortion, a maximum value of the image height is shown respectively, and in graphs showing coma aberration, a value of each image height is shown. d indicates various aberrations at d-line (wavelength: 587.6 nm), and g indicates various aberrations at g-line (wavelength: 435.8 nm), and no indication indicates various aberrations at d-line. In graphs showing astigmatism, the solid line indicates the sagittal image surface, and the broken line indicates the meridional image surface. The description on the graphs showing aberrations is the same for other examples.

As each graph showing aberrations clarifies, the zoom lens according to Example 1 has an excellent image forming performance that corrects various aberrations well in each focal length state, from the wide-angle end state to the telephoto end state.

Example 2

Example 2 will now be described with reference to FIG. 4 to FIG. 6 and Table 2. FIG. 4 is a diagram depicting a configuration and zoom locus of a lens according to Example 2. As shown in FIG. 4, the zoom lens according to Example 2 has, in order from the object, a first lens group G1 having positive refractive power, a second lens group G2 having negative refractive power, a third lens group G3 having positive refractive power, a fourth lens group G4 having negative refractive power, and a fifth lens group G5 having positive refractive power.

The first lens group G1 has, in order from the object, a cemented positive lens of a negative meniscus lens L11 having a convex surface facing the object and a positive meniscus lens L12 having a convex surface facing the object, and a positive meniscus lens L13 having a convex surface facing the object.

The second lens group G2 has, in order from the object, an aspherical negative meniscus lens L21 which has a convex surface facing the object and of which object side surface is aspherical, a biconcave lens L22, a biconvex lens L23, and a plano concave lens L24 having a concave surface facing the object.

The third lens group G3 has, in order from the object, a biconvex lens L31, a cemented positive lens of a biconvex lens L32 and a negative meniscus lens L33 having a concave surface facing the object, and a cemented positive lens of a negative meniscus lens L34 having a convex surface facing the object and a biconvex lens L35.

The fourth lens group G4 has, in order from the object, a lens group GA having a negative refractive power which corrects hand motion blur by moving so as to have components roughly orthogonal to the optical axis, and a lens group GB having negative refractive power. The lens group GA has, a cemented negative lens of, in order from the object, a biconcave lens L41 and a positive meniscus lens having a convex surface facing the object. The lens group GB has a negative meniscus lens L43 having a concave surface facing the image. The negative meniscus lens L43 is a compound aspherical lens having a portion which is formed by a resin material and has an aspherical surface, and a portion which is formed by glass material.

The fifth lens group G5 has, in order from the object, an aspherical biconvex lens L51 of which image side surface is aspherical, a cemented positive lens of a biconvex lens L52 and a negative meniscus lens L53 having a concave surface facing the object, and a negative meniscus lens L54 having a concave surface facing the object.

In the zoom lens according to this example which has the above configuration, upon zooming from a wide-angle end state to a telephoto end state, the distance between the first lens group G1 and the second lens group G2 increases, the distance between the second lens group G2 and the third lens group G3 decreases, the distance between the third lens group G3 and the fourth lens group G4 increases, and the distance between the fourth lens group G4 and the fifth lens group G5 decreases. At this time, the third lens group G3 and the fifth lens group G5 move together.

In the zoom lens according to this example, focusing from infinity to a close object is performed by moving the second lens group G2 in a direction toward the object.

An aperture stop S is disposed between the second lens group G2 and the third lens group G3, and moves together with the third lens group G3 upon zooming from the wide-angle end state to the telephoto end state.

Table 2 shows each data value of the zoom lens according to Example 2. The surface numbers 1 to 35 in Table 2 correspond to the surfaces 1 to 35 in FIG. 4.

TABLE 2

[General Data]

f = 28.8~292
FNO = 3.6~5.9
2ω = 76.62°~8.18°
Y = 21.6
TL = 154.81~230.36
Bf = 38.26~78.33

[Lens Data]

| Surface number | r | d | vd | nd |
|---|---|---|---|---|
| 1 | 110.7015 | 2.0000 | 32.34 | 1.850260 |
| 2 | 61.1227 | 9.3000 | 82.56 | 1.497820 |
| 3 | 831.5286 | 0.1000 | | |
| 4 | 71.2987 | 7.1000 | 67.87 | 1.593189 |
| 5 | 1005.3945 | D5 | | |

TABLE 2-continued

| | | | | |
|---|---|---|---|---|
| *6 | 127.2929 | 1.3500 | 46.82 | 1.766840 |
| 7 | 17.2677 | 6.0759 | | |
| 8 | −54.3521 | 1.0000 | 46.58 | 1.804000 |
| 9 | 55.9968 | 0.5000 | | |
| 10 | 32.6904 | 4.4000 | 22.79 | 1.808090 |
| 11 | −48.8263 | 0.9415 | | |
| 12 | −28.5862 | 1.0000 | 46.58 | 1.804000 |
| 13 | ∞ | D13 | | |
| 14 | aperture stop S | 0.5000 | | |
| 15 | 50.7881 | 3.4000 | 54.66 | 1.729160 |
| 16 | −102.1535 | 0.1000 | | |
| 17 | 41.2071 | 4.7000 | 82.56 | 1.497820 |
| 18 | −39.6235 | 1.0000 | 32.35 | 1.850260 |
| 19 | −152.2422 | 0.1000 | | |
| 20 | 26.8457 | 1.4000 | 32.35 | 1.850260 |
| 21 | 14.8725 | 5.6000 | 69.89 | 1.518600 |
| 22 | −558.6358 | D22 | | |
| 23 | −74.8002 | 1.0000 | 49.61 | 1.772500 |
| 24 | 15.4519 | 3.1425 | 32.34 | 1.850260 |
| 25 | 54.7491 | 2.6536 | | |
| *26 | 1622.7936 | 0.3000 | 38.09 | 1.553890 |
| 27 | 1622.7936 | 1.2000 | 54.66 | 1.729160 |
| 28 | 57.4462 | D28 | | |
| 29 | 113.9864 | 5.6000 | 61.18 | 1.589130 |
| *30 | −33.2537 | 0.1000 | | |
| 31 | 84.5332 | 6.7000 | 58.89 | 1.518230 |
| 32 | −20.6076 | 1.4000 | 40.76 | 1.883000 |
| 33 | −31.0038 | 2.2000 | | |
| 34 | −18.9228 | 1.2000 | 40.77 | 1.883000 |
| 35 | −35.7750 | Bf | | |

[Aspherical Data]

Sixth surface

κ = 6.0978, A3 = 0.00000, A4 = 1.20280E−06, A6 = 1.30920E−08,
A8 = −1.37530E−10, A10 = 5.64160E−13, A12 = −0.74954E−15,
A14 = 0.000

Twenty sixth surface

κ = 100.0000, A3 = 0.00000, A4 = 8.03660E−06, A6 = −9.88790E−08,
A8 = 1.39310E−09, A10 = −6.55480E−12, A12 = 0.00000,
A14 = 0.00000

Thirtieth surface

κ = 1.9575, A3 = 0.00000, A4 = −3.55160E−06, A6 = −5.40150E−08,
A8 = 1.61410E−10, A10 = −6.70370E−13, A12 = −0.18148E−15,
A14 = −0.10467E−17

[Variable Surface Distance Data]

| | 1-POS | 2-POS | 3-POS | 4-POS |
|---|---|---|---|---|
| F, β | 28.80002 | 50.00000 | 100.00005 | 292.00014 |
| D0 | 0.0000 | 0.0000 | 0.0000 | 0.0000 |
| D5 | 2.33995 | 17.99752 | 37.84134 | 64.87735 |
| D13 | 28.56163 | 19.59632 | 12.37520 | 1.50817 |
| D22 | 2.90075 | 4.91772 | 7.01855 | 8.31016 |
| D28 | 6.68309 | 4.66612 | 2.56529 | 1.27369 |
| Bf | 38.26493 | 50.16229 | 66.37665 | 78.33071 |

| | 5-POS | 6-POS | 7-POS | 8-POS |
|---|---|---|---|---|
| F, β | −0.03333 | −0.03333 | −0.03333 | −0.03333 |
| D0 | 813.3836 | 1407.7910 | 2802.5923 | 7194.7515 |
| D5 | 1.70387 | 17.42468 | 37.21607 | 62.05719 |
| D13 | 29.19771 | 20.16916 | 13.00047 | 4.32833 |
| D22 | 2.90075 | 4.91772 | 7.01855 | 8.31016 |
| D28 | 6.68309 | 4.66612 | 2.56529 | 1.27369 |
| Bf | 38.26493 | 50.16228 | 66.37664 | 78.33067 |

| | 9-POS | 10-POS | 11-POS | 12-POS |
|---|---|---|---|---|
| β | −0.07303 | −0.12069 | −0.21096 | −0.32000 |
| D0 | 345.1860 | 326.5964 | 297.7593 | 274.0088 |
| D5 | 0.95928 | 15.97061 | 34.15946 | 52.81222 |
| D13 | 29.94230 | 21.62323 | 16.05708 | 13.57330 |
| D22 | 2.90075 | 4.91772 | 7.01855 | 8.31016 |

TABLE 2-continued

| D28 | 6.68309 | 4.66612 | 2.56529 | 1.27369 |
|---|---|---|---|---|
| Bf | 38.26493 | 50.16228 | 66.37664 | 78.33067 |

[Lens Group Data]

| Group number | First surface of group | Focal length of group |
|---|---|---|
| G1 | 1 | 111.46551 |
| G2 | 6 | −16.92695 |
| G3 | 16 | 25.25179 |
| G4 | 23 | −29.10021 |
| G5 | 29 | 48.25475 |

[Conditional Expression Correspondence Value]

Conditional Expression (1) f5/ft = 0.165
Conditional Expression (2) (−f2)/(−f4) = 0.582
Conditional Expression (3) (−f4)/ft = 0.100
Conditional Expression (4) (−fA)/ft = 0.163
Conditional Expression (5) f5/(−f4) = 1.658
Conditional Expression (6) f5/fw = 1.676

As shown in the data table in Table 2, the zoom lens according to Example 2 satisfies all the conditional Expressions (1) to (6).

Figure 5A:
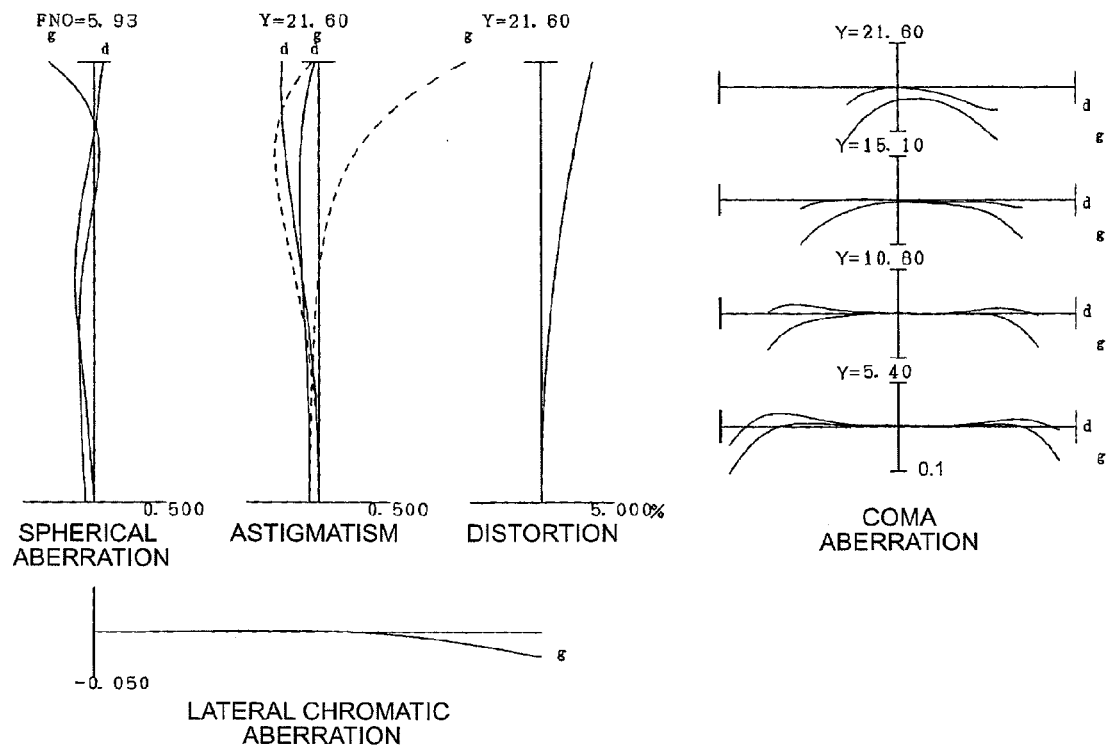
FIG. 5A are graphs showing various aberrations of the zoom lens according to Example 2 upon focusing on infinity in the wide-angle end state, and FIG. 5B are graphs showing lateral aberrations after image blur is corrected.
Figure 5B:
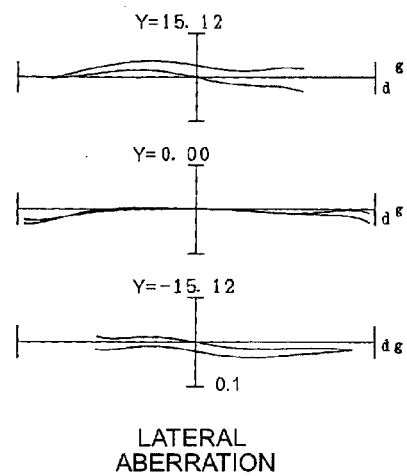
Figure 6A:
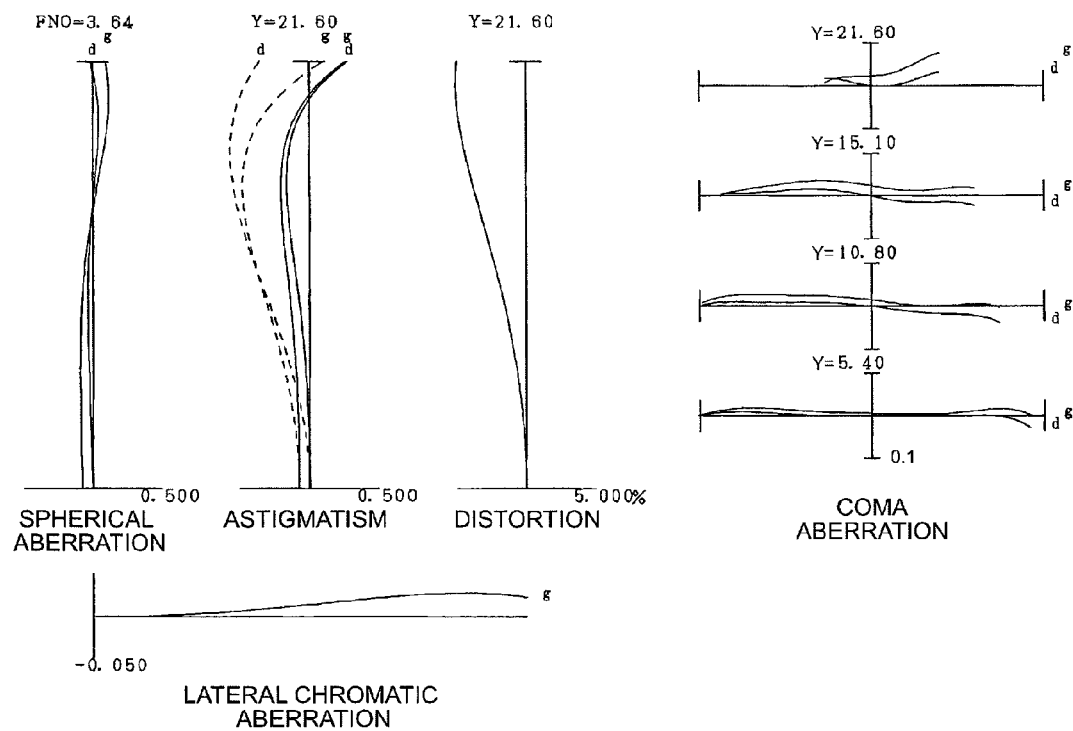
FIG. 6A are graphs showing various aberrations of the zoom lens according to Example 2 upon focusing on infinity in the telephoto end state, and FIG. 6B are graphs showing lateral aberrations after image blur is corrected.
Figure 6B:
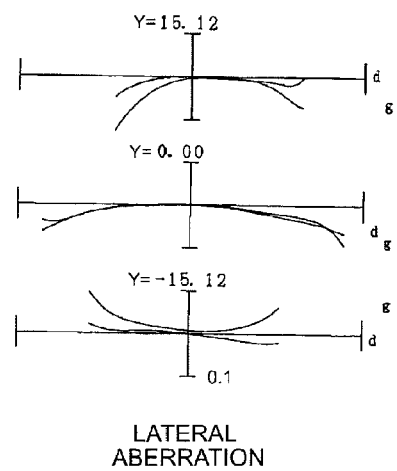

FIG. 5A and FIG. 5B are graphs showing various aberrations of the zoom lens according to Example 2 upon focusing on infinity in the wide-angle end state, and graphs showing lateral aberrations when image blur is corrected (shift amount of vibration isolating lens group GA=0.27). FIG. 6A and FIG. 6B are graphs showing various aberrations of the zoom lens according to Example 2 upon focusing on infinity in the telephoto end state, and graphs showing lateral aberrations when image blur is corrected (shift amount of vibration isolating lens group GA=0.50).

As each graph showing aberrations clarifies, the zoom lens according to Example 2 has an excellent image forming performance that corrects various aberrations well in each focal length state, from the wide-angle end state to the telephoto end state.

Example 3

Example 3 will now be described with reference to FIG. 7 to FIG. 9 and Table 3. FIG. 7 is a diagram depicting a configuration and zoom locus of a lens according to Example 3. As shown in FIG. 7, the zoom lens according to Example 3 has, in order from the object, a first lens group G1 having positive refractive power, a second lens group G2 having negative refractive power, a third lens group G3 having positive refractive power, a fourth lens group G4 having negative refractive power, and a fifth lens group G5 having positive refractive power.

The first lens group G1 has, in order from the object, a cemented positive lens of a negative meniscus lens L11 having a convex surface facing the object and a positive meniscus lens L12 having a convex surface facing the object, and a positive meniscus lens L13 having a convex surface facing the object.

The second lens group G2 has, in order from the object, an aspherical negative meniscus lens L21 which has a convex surface facing the object and of which object side surface is aspherical, a biconcave lens L22, a biconvex lens L23, and a plano concave lens L24 having a concave surface facing the object.

The third lens group G3 has, in order from the object, a biconvex lens L31, a cemented positive lens of a biconvex lens L32 and a negative meniscus lens L33 having a concave surface facing the object, and a cemented positive lens of a negative meniscus lens L34 having a convex surface facing the object and a biconvex lens L35.

The fourth lens group G4 has, in order from the object, a lens group GA having a negative refractive power which corrects hand motion blur by moving so as to have components roughly orthogonal to the optical axis, and a lens group GB having negative refractive power. The lens group GA has, a cemented negative lens of, in order from the object, a biconcave lens L41 and a positive meniscus lens L42 having a convex surface facing the object. The lens group GB has a negative meniscus lens L43 having a concave surface facing the image. The negative meniscus lens L43 is a compound aspherical lens having a portion which is formed by a resin material and has an aspherical surface, and a portion which is formed by glass material.

The fifth lens group G5 has, in order from the object, an aspherical biconvex lens L51 of which image side surface is aspherical, a biconvex lens L52 and a negative meniscus lens L53 having a concave surface facing the object.

In the zoom lens according to this example which has the above configuration, upon zooming from a wide-angle end state to a telephoto end state, the distance between each lens group changes, so that the distance between the first lens group G1 and the second lens group G2 increases, the distance between the second lens group G2 and the third lens group G3 decreases, the distance between the third lens group G3 and the fourth lens group G4 increases, and the distance between the fourth lens group G4 and the fifth lens group G5 decreases. At this time, the third lens group G3 and the fifth lens group G5 move together.

In the zoom lens according to this example, focusing from infinity to a close object is performed by moving the second lens group G2 in a direction toward the object.

An aperture stop S is disposed between the second lens group G2 and the third lens group G3, and moves together with the third lens group G3 upon zooming from the wide-angle end state to the telephoto end state.

Table 3 shows each data value of the zoom lens according to Example 3. The surface numbers 1 to 34 in Table 3 correspond to the surfaces 1 to 34 in FIG. 7.

TABLE 3

[General Data]

f = 28.8~292
FNO = 3.6~5.9
2ω = 76.78°~8.14°
Y = 21.6
TL = 157.37~230.34
Bf = 38.02~78.21

[Lens Data]

| Surface number | r | d | νd | nd |
|---|---|---|---|---|
| 1 | 117.2951 | 2.0000 | 32.34 | 1.850260 |
| 2 | 63.4102 | 9.6000 | 82.56 | 1.497820 |
| 3 | 1973.1119 | 0.1000 | | |
| 4 | 70.5086 | 7.0000 | 67.87 | 1.593189 |
| 5 | 816.0257 | D5 | | |
| *6 | 166.4533 | 1.3500 | 46.82 | 1.766840 |
| 7 | 18.7190 | 6.1000 | | |
| 8 | −58.8089 | 1.0000 | 46.58 | 1.804000 |
| 9 | 55.5875 | 0.5000 | | |
| 10 | 33.5848 | 4.7000 | 22.79 | 1.808090 |
| 11 | −54.2907 | 1.1000 | | |
| 12 | −29.9194 | 1.0000 | 46.58 | 1.804000 |
| 13 | ∞ | D13 | | |
| 14 | aperture stop S | 0.5000 | | |
| 15 | 42.4257 | 4.0000 | 64.12 | 1.516800 |

TABLE 3-continued

| | | | | |
|---|---|---|---|---|
| 16 | −52.8020 | 0.1000 | | |
| 17 | 26.4500 | 5.5000 | 82.56 | 1.497820 |
| 18 | −42.7941 | 1.0000 | 32.35 | 1.850260 |
| 19 | −465.6905 | 0.1000 | | |
| 20 | 31.4200 | 1.5000 | 42.72 | 1.834810 |
| 21 | 13.5952 | 6.0000 | 69.89 | 1.518600 |
| 22 | −255.9214 | D22 | | |
| 23 | −94.4144 | 1.0000 | 49.61 | 1.772500 |
| 24 | 15.3153 | 2.9928 | 32.34 | 1.850260 |
| 25 | 47.6604 | 4.5449 | | |
| *26 | −23.6399 | 0.2000 | 38.09 | 1.553890 |
| 27 | −23.6399 | 1.2000 | 54.66 | 1.729160 |
| 28 | −58.9473 | D28 | | |
| 29 | 112.3256 | 5.0000 | 61.18 | 1.589130 |
| *30 | −31.9459 | 0.1000 | | |
| 31 | 191.3590 | 6.6657 | 82.56 | 1.497820 |
| 32 | −22.5309 | 3.1289 | | |
| 33 | −22.6718 | 1.3000 | 46.63 | 1.816000 |
| 34 | −99.6640 | Bf | | |

[Aspherical Data]

Sixth surface

κ = 1.0000, A3 = 0.00000, A4 = 7.00430E−07, A6 = 9.58940E−09, A8 = −9.46680E−11, A10 = 4.00920E−13, A12 = −0.66807E−15, A14 = 0.31353E−18
Twenty sixth surface κ = 1.4228, A3 = 0.00000, A4 = 1.68800E−05, A6 = 5.21330E−08, A8 = 1.71590E−10, A10 = 0.00000, A12 = 0.00000, A14 = 0.00000
Thirtieth surface κ = 1.0000, A3 = 0.00000, A4 = 1.80100E−05, A6 = 3.10700E−08, A8 = −1.34120E−10, A10 = 9.05530E−13, A12 = 0.85085E−15, A14 = −0.11437E−16

[Variable Surface Distance Data]

| | 1-POS | 2-POS | 3-POS | 4-POS |
|---|---|---|---|---|
| F, β | 28.80000 | 50.00000 | 100.00000 | 291.99996 |
| D0 | 0.0000 | 0.0000 | 0.0000 | 0.0000 |
| D5 | 2.29069 | 15.44974 | 36.89931 | 63.76637 |
| D13 | 30.69148 | 20.78037 | 13.67932 | 1.99142 |
| D22 | 1.45891 | 3.45176 | 5.01843 | 5.79638 |
| D28 | 5.62778 | 3.63493 | 2.06826 | 1.29031 |
| Bf | 38.01698 | 50.94008 | 66.10148 | 78.20934 |

| | 5-POS | 6-POS | 7-POS | 8-POS |
|---|---|---|---|---|
| F, β | −0.03333 | −0.03333 | −0.03333 | −0.03333 |
| D0 | 811.3735 | 1412.4237 | 2798.6550 | 6931.8537 |
| D5 | 1.59706 | 14.86615 | 36.21775 | 60.20067 |
| D13 | 31.38511 | 21.36396 | 14.36088 | 5.55712 |
| D22 | 1.45891 | 3.45176 | 5.01843 | 5.79638 |
| D28 | 5.62778 | 3.63493 | 2.06826 | 1.29031 |
| Bf | 38.01698 | 50.94008 | 66.10149 | 78.20935 |

| | 9-POS | 10-POS | 11-POS | 12-POS |
|---|---|---|---|---|
| β | −0.07317 | −0.12008 | −0.21059 | −0.31600 |
| D0 | 342.6319 | 326.4609 | 296.9509 | 268.8877 |
| D5 | 0.78400 | 13.36202 | 32.92279 | 50.47276 |
| D13 | 32.19817 | 22.86809 | 17.65584 | 15.28503 |
| D22 | 1.45891 | 3.45176 | 5.01843 | 5.79638 |
| D28 | 5.62778 | 3.63493 | 2.06826 | 1.29031 |
| Bf | 38.01698 | 50.94008 | 66.10150 | 78.20938 |

[Lens Group Data]

| Group number | First surface of group | Focal length of group |
|---|---|---|
| G1 | 1 | 110.40923 |
| G2 | 6 | −17.47291 |
| G3 | 16 | 25.33835 |
| G4 | 23 | −24.38340 |
| G5 | 29 | 40.32144 |

[Conditional Expression Correspondence Value]

Conditional Expression (1) f5/ft = 0.138
Conditional Expression (2) (−f2)/(−f4) = 0.717
Conditional Expression (3) (−f4)/ft = 0.0835
Conditional Expression (4) (−fA)/ft = 0.162
Conditional Expression (5) f5/(−f4) = 1.654
Conditional Expression (6) f5/fw = 1.400

As shown in the data table in Table 3, the zoom lens according to Example 3 satisfies all the conditional Expressions (1) to (6).

Figure 8A:
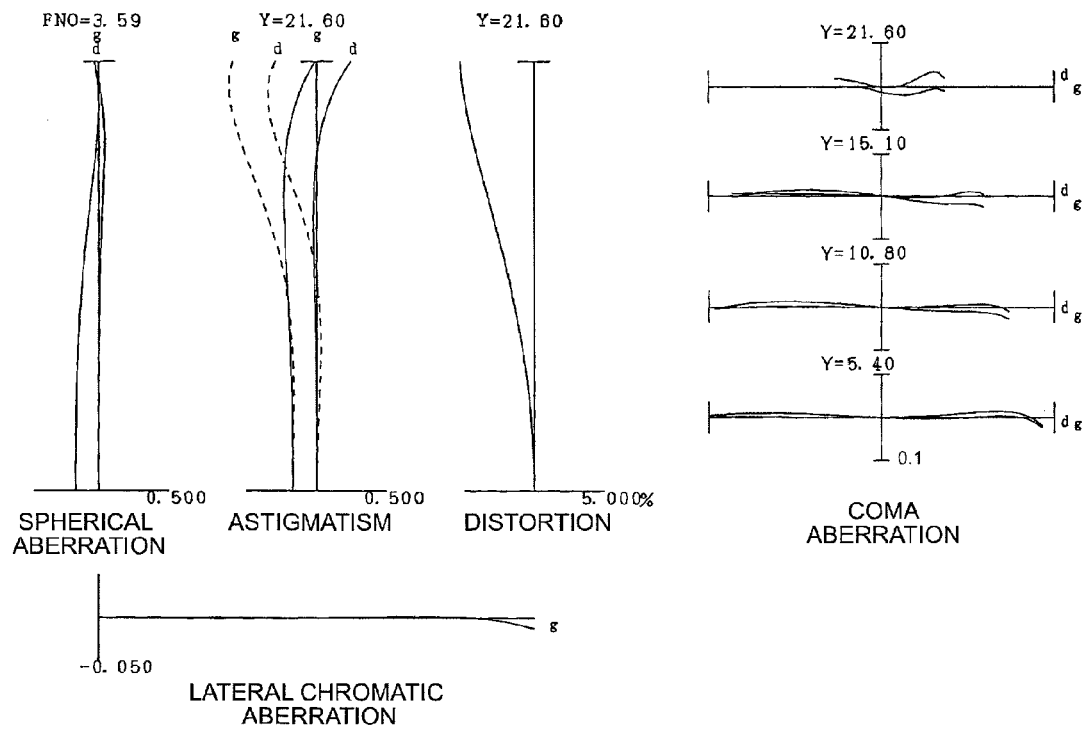
FIG. 8A are graphs showing various aberrations of the zoom lens according to Example 3 upon focusing on infinity in the wide-angle end state, and FIG. 8B are graphs showing lateral aberrations after image blur is corrected.
Figure 8B:
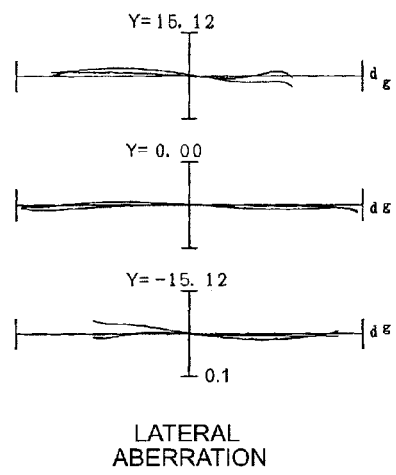
Figure 9A:
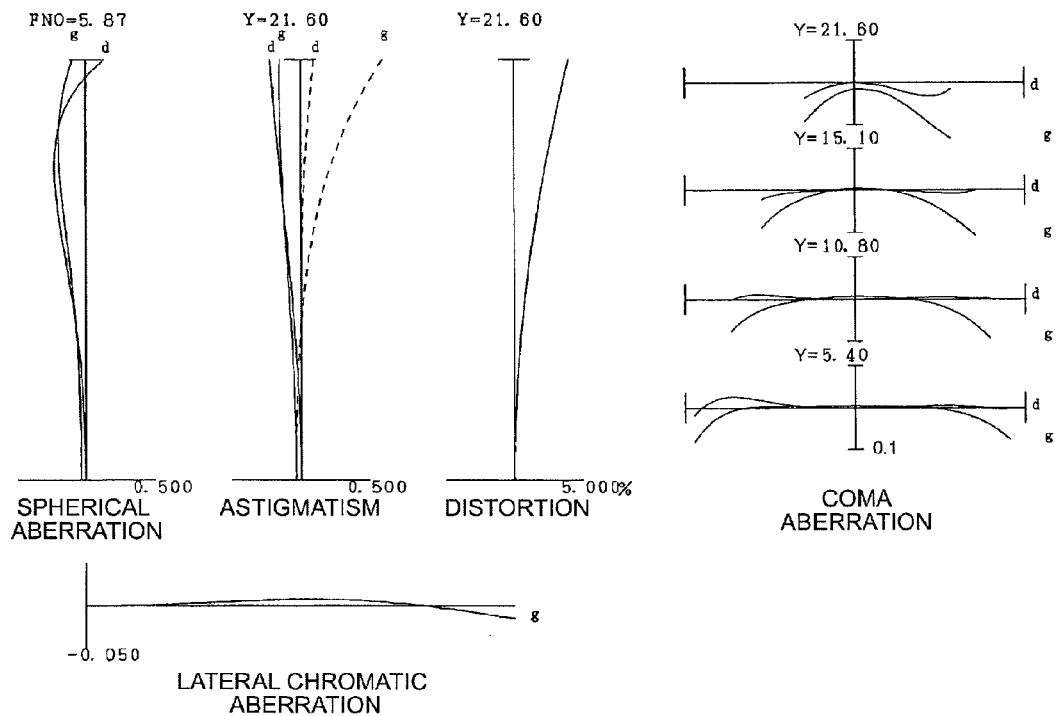
FIG. 9A are graphs showing various aberrations of the zoom lens according to Example 3 upon focusing on infinity in the telephoto end state, and FIG. 9B are graphs showing lateral aberrations after image blur is corrected.
Figure 9B:
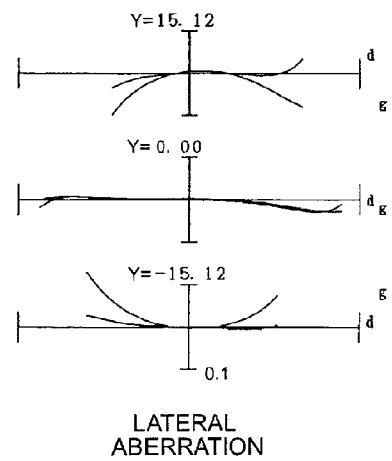

FIG. 8A and FIG. 8B are graphs showing various aberrations of the zoom lens according to Example 3 upon focusing on infinity in the wide-angle end state, and graphs showing lateral aberrations when image blur is corrected (shift amount of vibration isolating lens group GA=0.27). FIG. 9A and FIG. 9B are graphs showing various aberrations of the zoom lens according to Example 3 upon focusing on infinity in the telephoto end state, and graphs showing lateral aberrations when image blur is corrected (shift amount of vibration isolating lens group GA=0.50).

As each graph showing aberrations clarifies, the zoom lens according to Example 3 has an excellent image forming performance that corrects various aberrations well in each focal length state, from the wide-angle end state to the telephoto end state.

In the above embodiment, the following content can be adopted within a range where the optical performance is not diminished.

In the above examples, a zoom lens comprised of five lens groups was shown, but the present invention can also be applied to a configuration having a different number of lens groups, such as six or seven lens groups. A configuration where a lens or a lens group is added to the side closest to the object, or a configuration where a lens or a lens group is added to the side closest to the image, may be used. A lens group refers to a portion having at least one lens, separated by an air space which changes upon zooming.

A single or plurality of lens group(s) or a partial lens group may be designed to be a focusing lens group, which performs focusing from an object at infinity to an object at close distance by moving in the optical axis direction. The focusing lens group can be applied to auto focus, and is also suitable for driving a motor for auto focusing (e.g. driving using an ultrasonic motor). It is particularly preferable that at least a part of the second lens group G2 is designed to be the focusing lens group.

A lens group or a partial lens group may be designed to be a vibration-isolating lens group, which corrects image blurs generated by hand motion by moving the lens group or a partial lens group so as to have components orthogonal to the optical axis, or rotary moving (oscillating) the lens group or the partial lens group in an in-plane direction, including the optical axis. It is particularly preferable that at least a part of the fourth lens group G4 is designed to be the vibration-isolating lens group. For the movement, rotary movement (oscillation) around a certain point on the optical axis as a center of rotation may be used.

The lens surface may be formed to be a spherical surface or plane, or an aspherical surface. If the lens surface is a spherical surface or plane, then lens processing, assembly and adjustment are easy, and deterioration of optical performance, due to an error in processing, assembly and adjustment, can be prevented. Even if the image plane is shifted, the drawing performance is not affected very much, which is desirable. If the lens surface is an aspherical surface, the aspherical surface can be any aspherical surface, out of an aspherical surface generated by grinding, a glass molded aspherical surface generated by forming glass in an aspherical shape using a die, and a composite aspherical surface generated by forming a resin on the surface of the glass to be an aspherical shape. The lens surface may be a diffraction surface, and the lens may be a refractive index distributed lens (GRIN lens) or plastic lens.

It is preferable that the aperture stop S is disposed near the third lens group G3 or the fourth lens group G4, but the role of the aperture stop may be substituted by the frame of the lens, without disposing a separate element as the aperture stop. It is particularly preferable that the aperture stop S is disposed at the object side of the third lens group G3.

Each lens surface may be coated by an anti-reflection film which has high transmittance in a wide wavelength region, in order to decrease flares and ghosts, and implement a high optical performance with high contrast.

The zoom ratio of the zoom lens (zooming optical system) of the present embodiment is ×5 to ×18, and more preferably ×8 to ×12.

In the zoom lens (zooming optical system) of the present embodiment, it is preferable that the first lens group G1 has two positive lenses and one negative lens. In the first lens group G1, it is preferable that lenses are disposed, in order from the object, to be in the sequence of negative, positive and positive.

In the zoom lens (zooming optical system) of the present embodiment, it is preferable that the second lens group G2 has one positive lens and three negative lenses. In the second lens group G2, it is preferable that the lens components are disposed, in order from the object, to be in the sequence of negative, negative, positive and negative, with air distance there between.

In the zoom lens (zooming optical system) of the present embodiment, it is preferable that the third lens group G3 has three positive lenses and one negative lens. In the third lens group G3, it is preferable that the lens components are disposed, in order from the object, to be in the sequence of positive, positive and positive, with air distance there between.

In the zoom lens (zooming optical system) of the present embodiment, it is preferable that the fourth lens group G4 has one positive lens and two negative lenses. In the fourth lens group G4, it is preferable that the lens components are disposed, in order from the object, to be in the sequence of negative and negative, with air distance there between.

In the zoom lens (zooming optical system) of the present embodiment, it is preferable that the fifth lens group G5 has two positive lenses and one negative lens. In the fifth lens group G5, it is preferable that the lens components are disposed, in order from the object, to be in the sequence of positive, positive and negative, with air distance there between.

Example 4

Example 4 will now be described with reference to FIG. 10 to FIG. 13 and Table 4. FIG. 10 is a diagram depicting a configuration and zoom locus of a lens according to Example 4. As shown in FIG. 10, the zoom lens according to Example 4 has, in order from the object, a first lens group G1 having positive refractive power, a second lens group G2 having negative refractive power, a third lens group G3 having positive refractive power, a fourth lens group G4 having negative refractive power, and a fifth lens group G5 having positive refractive power.

The first lens group G1 has, in order from the object, a cemented lens of a negative meniscus lens L11 having a convex surface facing the object and a biconvex positive lens L12, and a positive meniscus lens L13 having a convex surface facing the object.

The second lens group G2 has, in order from the object, a negative meniscus lens L21 having a convex surface facing the object, a biconcave negative lens L22, a biconvex positive lens L23, and a negative meniscus lens L24 having a concave surface facing the object. The negative meniscus lens L21 disposed closest to the object in the second lens group G2 is an aspherical lens of which glass lens surface facing the object (sixth surface counted from the object in FIG. 10) is aspherical.

The third lens group G3 has, in order from the object, a biconvex positive lens L31, a cemented lens of a negative meniscus lens L32 having a convex surface facing the object and a biconvex positive lens L33, and a cemented lens of a biconvex positive lens L34 and a negative meniscus lens L35 having a concave surface facing the object.

The fourth lens group G4 has, in order from the object, a 4A lens group GA which is a cemented lens of a biconcave negative lens L41 and a positive meniscus lens L42 having a convex surface facing the object, and a 4B lens group GB which is a negative meniscus lens L43 having a concave surface facing the object. The negative meniscus lens L43 disposed closest to the image in the fourth lens group G4 is an aspherical lens of which glass lens surface facing the object (twenty seventh surface counted from the object in FIG. 10) is aspherical.

The fifth lens group G5 has, in order from the object, a biconvex positive lens L51, a cemented lens of a biconvex positive lens L52 and a negative meniscus lens L53 having a concave surface facing the object, and a negative meniscus lens L54 having a concave surface facing the object. The negative meniscus lens L54 disposed closest to the image in the fifth lens group G5 is an aspherical lens of which glass lens surface facing the object (thirty fourth surface counted from the object in FIG. 10) is aspherical.

In the zoom lens according to this example which has the above configuration, upon zooming from a wide-angle end state to a telephoto end state, the distance between each lens group changes, so that the distance between the first lens group G1 and the second lens group G2 increases, the distance between the second lens group G2 and the third lens group G3 decreases, the distance between the third lens group G3 and the fourth lens group G4 increases, and the distance between the fourth lens group G4 and the fifth lens group G5 decreases. At this time, the third lens group G3 and the fifth lens group G5 move together.

An aperture stop S is disposed between the second lens group G2 and the third lens group G3, and moves together with the third lens group G3 upon zooming from the wide-angle end state to the telephoto end state.

In the zoom lens according to this example, focusing from long distance to close distance is performed by moving the second lens group G2 in a direction toward the object.

Hand motion blur correction (vibration-isolation) is performed by moving the cemented lens of the 4A lens group GA so as to have components orthogonal to the optical axis.

In Example 4, in order to correct angle θ of rotation blur in a lens of which focal length of the zoom lens is f and the ratio of the image moving amount on the image forming surface with respect to the moving amount of the moving lens group during blur correction, that is vibration-isolation coefficient, is K, the moving lens group for blur correction is moved for (f·tan θ)/K, so as to have components orthogonal to the optical axis. In the wide-angle end state in Example 4, the vibration-isolation coefficient is 1.012 and the focal length is 28.80 (mm), so the moving amount of the fourth lens group G4 for correcting a 0.58° rotation blur is 0.30 (mm). In the telephoto end state in Example 4, the vibration-isolation coefficient is 1.700 and the focal length is 292.00 (mm), so the moving amount of the fourth lens group G4 for correcting a 0.18° rotation blur is 0.57 (mm).

Table 4 shows each data value of the zoom lens according to Example 4. The surface numbers 1 to 35 in Table 4 correspond to the surfaces 1 to 35 in FIG. 10.

TABLE 4

[General Data]

| | f | 28.7 | 96.6 | 291.9 |
|---|---|---|---|---|
| | Fno | 3.6 | 5.5 | 5.9 |
| | 2ω | 6.5 | 24.1 | 8.2 |
| | Y | 21.6 | 21.6 | 21.6 |
| | TL | 162.728 | 207.565 | 235.927 |
| | BF | 38.462 | 63.688 | 76.6097 |

[Lens Data]

| Surface number | r | d | nd | νd |
|---|---|---|---|---|
| 1 | 141.1761 | 1.0000 | 1.8503 | 32.3500 |
| 2 | 69.4853 | 10.0765 | 1.4978 | 82.5200 |
| 3 | −889.6155 | 0.1000 | 1.0000 | |
| 4 | 66.6674 | 6.5001 | 1.6030 | 65.4700 |
| 5 | 381.0871 | D5 | 1.0000 | |
| *6 | 79.9451 | 0.1006 | 1.5539 | 38.0900 |
| 7 | 74.7011 | 1.0028 | 1.8040 | 46.5800 |
| 8 | 17.8520 | 7.3031 | 1.0000 | |
| 9 | −48.6373 | 1.0000 | 1.8160 | 46.6300 |
| 10 | 58.7199 | 0.1492 | 1.0000 | |
| 11 | 33.7080 | 4.5990 | 1.8467 | 23.7700 |
| 12 | −45.7479 | 1.1779 | 1.0000 | |
| 13 | −26.8650 | 1.0000 | 1.8160 | 46.6300 |
| 14 | −8904.0687 | D14 | 1.0000 | |
| 15 | 0.0000 | 0.5000 | 1.0000 | (aperture stop S) |
| 16 | 30.7323 | 3.5000 | 1.6030 | 65.4700 |
| 17 | −107.2786 | 0.1000 | 1.0000 | |
| 18 | 48.7571 | 1.0000 | 1.8348 | 42.7200 |
| 19 | 15.4106 | 5.5000 | 1.6030 | 65.4700 |
| 20 | −217.8297 | 0.3000 | 1.0000 | |
| 21 | 49.0547 | 3.5679 | 1.6030 | 65.4700 |
| 22 | −29.6706 | 1.4591 | 1.8503 | 32.3500 |
| 23 | −160.3002 | D23 | 1.0000 | |
| 24 | −142.1433 | 1.0000 | 1.7725 | 49.6100 |
| 25 | 16.3170 | 2.9126 | 1.8503 | 32.3500 |
| 26 | 48.2164 | 6.0283 | 1.0000 | |
| *27 | −14.4254 | 1.0000 | 1.8040 | 46.5800 |
| 28 | −17.2680 | D28 | 1.0000 | |
| 29 | −1093.1368 | 4.7467 | 1.5186 | 69.8900 |
| 30 | −22.8468 | 0.1000 | 1.0000 | |
| 31 | 42.0285 | 6.9126 | 1.5174 | 52.3200 |
| 32 | −19.2157 | 1.0000 | 1.8348 | 42.7200 |
| 33 | −34.6022 | 1.5145 | 1.0000 | |
| *34 | −23.6619 | 1.0000 | 1.8160 | 46.6200 |
| 35 | −311.6038 | BF | 1.0000 | |

[Aspherical Data]

Sixth surface

κ = 4.8810E+00, A4 = 1.3626E−06, A6 = −3.8149E−09,
A8 = −1.7705E−11, A10 = 1.1444E−13, A12 = 0.0000E+00

Twenty seventh surface

κ = 7.7650E−01, A4 = 3.1469E−06, A6 = 2.0215E−09,
A8 = 0.0000E+00, A10 = 0.0000E+00, A12 = 0.0000E+00

TABLE 4-continued

Thirty fourth surface

κ = 1.0000E+00, A4 = −2.9251E−06, A6 = 3.3679E−08,
A8 = −1.3515E−11, A10 = 7.4135E−15, A12 = 0.0000E+00

[Variable Distance Data]

| | Wide-angle end State | Intermediate focal length state | Telephoto end state |
|---|---|---|---|
| D5 | 2.025 | 37.999 | 65.478 |
| D14 | 29.610 | 13.247 | 1.208 |
| D23 | 2.732 | 7.325 | 8.459 |
| D28 | 7.026 | 2.433 | 1.300 |

[Lens Group Data]

| Group number | First surface of group | Focal length of group |
|---|---|---|
| G1 | 1 | 111.40 |
| G2 | 6 | −17.34 |
| G3 | 15 | 26.70 |
| G4 | 24 | −37.72 |
| G5 | 29 | 61.85 |

[Conditional Expression Correspondence Value]

Conditional Expression (7) (−f4)/ft = 0.13
Conditional Expression (8) f5/(−f4) = 1.64
Conditional Expression (9) (−f2)/(−f4) = 0.46
Conditional Expression (10) f1/(−f4) = 2.95
Conditional Expression (11) f5/ft = 0.21
Conditional Expression (12) (Bft − Bfw)/f3 = 1.43

As shown in the data table in Table 4, the zoom lens according to Example 4 satisfies all the conditional Expressions (7) to (12).

Figure 11A:
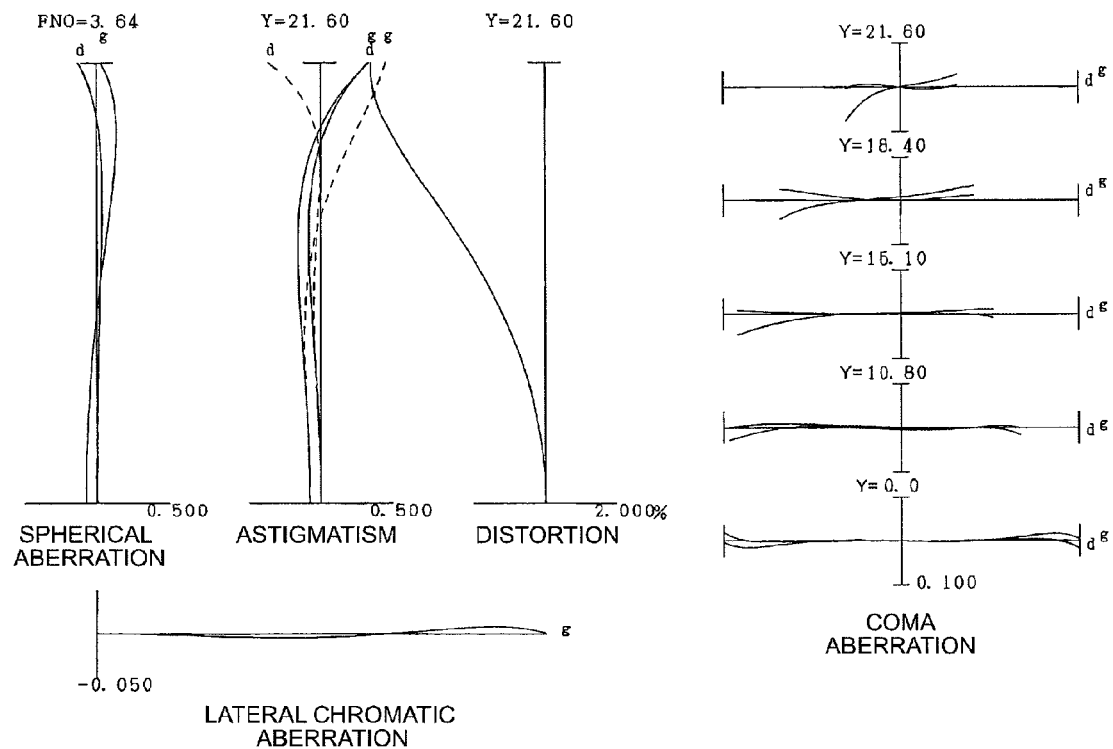
FIGS. 11A and 11B are graphs showing various aberrations of the zoom lens according to Example 4 upon focusing on infinity in the wide-angle end state, and graphs showing meridional lateral aberrations after a 0.58° rotation blur is corrected.
Figure 11B:
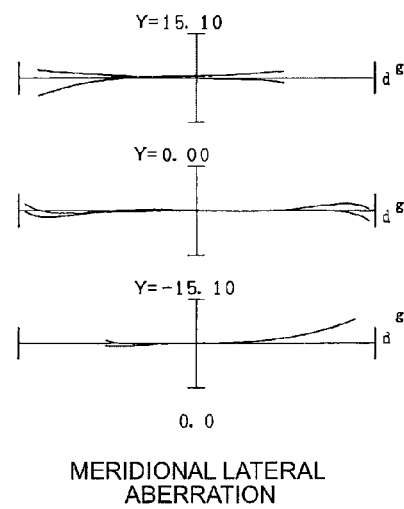
Figure 12:
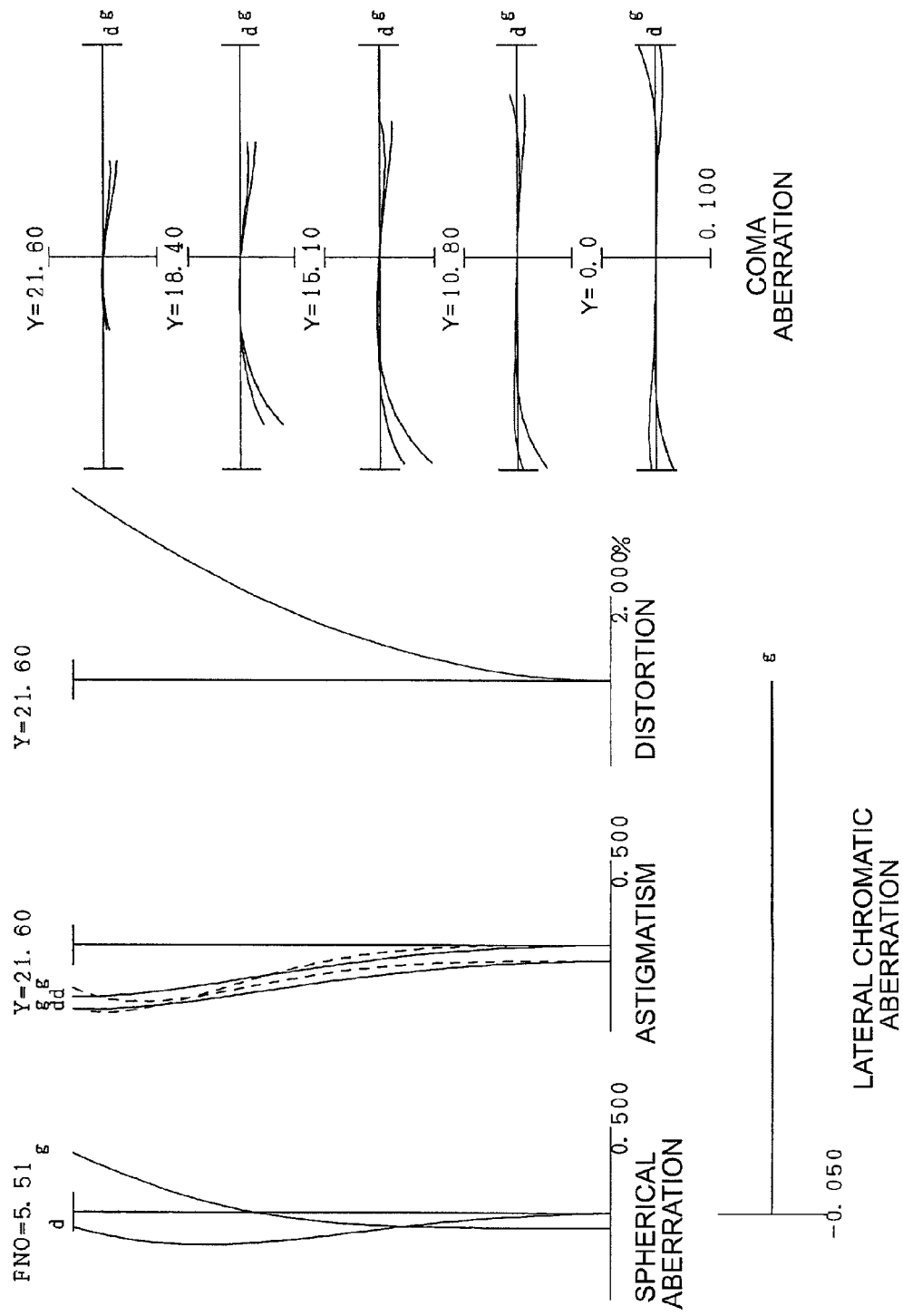
FIG. 12 are graphs showing various aberrations of the zoom lens according to Example 4 upon focusing on infinity in the intermediate focal length state.
Figure 13A:
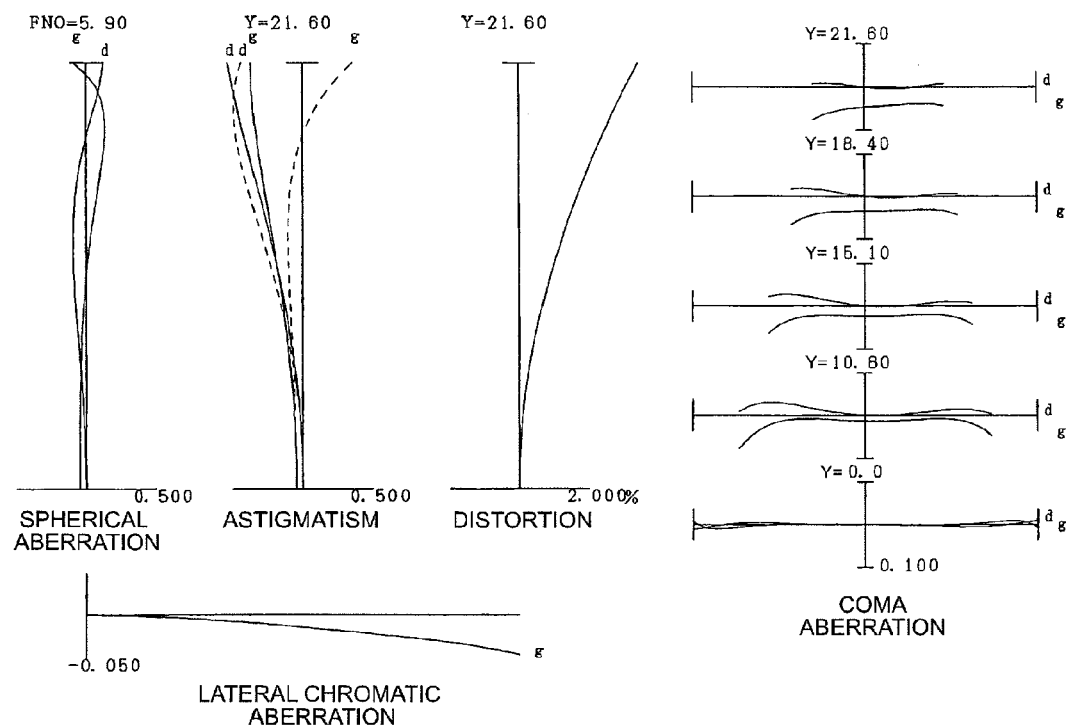
FIGS. 13A and 13B are graphs showing various aberrations of the zoom lens according to Example 4 upon focusing on infinity in the telephoto end state, and graphs showing meridional lateral aberrations after a 0.18° rotation blur is corrected.
Figure 13B:
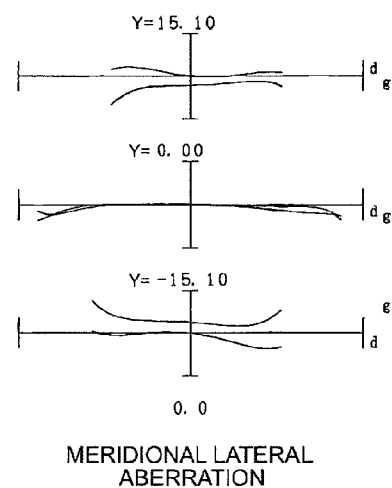

FIG. 11A and FIG. 11B are graphs showing various aberrations of the zoom lens according to Example 4 upon focusing on infinity in the wide-angle end state, and graphs showing meridional lateral aberrations upon correcting a 0.58° rotation blur. FIG. 12 are graphs showing various aberrations of the zoom lens according to Example 4 upon focusing on infinity in the intermediate focal length state. FIG. 13A and FIG. 13B are graphs showing various aberrations of the zoom lens according to Example 4 upon focusing on infinity in the telephoto end state, and graphs showing meridional lateral aberrations upon correcting a 0.18° rotation blur.

In each graph showing aberration, FNO is an F number, and Y is an image height (unit: mm). In the graphs showing spherical aberration, a value of the F number corresponding to the maximum aperture is shown, in the graphs showing astigmatism and graphs showing distortion, a maximum value of the image height is shown respectively, and in graphs showing coma aberration, a value of each image height is shown. d indicates various aberrations at d-line (wavelength: 587.6 nm), and g indicates various aberrations at g-line (wavelength: 435.8 nm), and no indication indicates various aberrations at d-line. In graphs showing astigmatism, the solid line indicates the sagittal image surface, and the broken line indicates the meridional image surface. The description on the graphs showing aberrations is the same for other examples.

As each graph showing aberrations clarifies, the zoom lens according to Example 4 has an excellent image forming performance that corrects various aberrations well in each focal length state, from the wide-angle end state to the telephoto end state.

Example 5

Example 5 will now be described with reference to FIG. 14 to FIG. 17 and Table 5. FIG. 14 is a diagram depicting a configuration and zoom locus of a lens according to Example 5. As shown in FIG. 14, the zoom lens according to Example 5 has, in order from the object, a first lens group G1 having positive refractive power, a second lens group G2 having negative refractive power, a third lens group G3 having positive refractive power, a fourth lens group G4 having negative refractive power, and a fifth lens group G5 having positive refractive power.

The first lens group G1 has, in order from the object, a cemented lens of a negative meniscus lens L11 having a convex surface facing the object and a biconvex positive lens L12, and a positive meniscus lens L13 having a convex surface facing the object.

The second lens group G2 has, in order from the object, a negative meniscus lens L21 having a convex surface facing the object, a biconcave negative lens L22, a biconvex positive lens L23, and a negative meniscus lens L24 having a concave surface facing the object. The negative meniscus lens L21 disposed closest to the object in the second lens group G2 is an aspherical lens of which glass lens surface facing the object (sixth surface counted from the object in FIG. 14) is aspherical.

The third lens group G3 has, in order from the object, a biconvex positive lens L31, a cemented lens of a biconvex positive lens L32 and a negative meniscus lens L33 having a concave surface facing the object, and a cemented lens of a negative meniscus lens L34 having a convex surface facing the object and a biconvex positive lens L35.

The fourth lens group G4 has, in order from the object, a 4A lens group GA which is a cemented lens of a biconcave negative lens L41 and a positive meniscus lens L42 having a convex surface facing the object, and a 4B lens group GB which is a negative meniscus lens L43 having a concave surface facing the object. The negative meniscus lens L43 disposed closest to the image in the fourth lens group G4 is an aspherical lens of which glass lens surface facing the object (twenty sixth surface counted from the object in FIG. 14) is aspherical.

The fifth lens group G5 has, in order from the object, a biconvex positive lens L51, a cemented lens of a biconvex positive lens L52 and a negative meniscus lens L53 having a concave surface facing the object, and a negative meniscus lens L54 having a concave surface facing the object. The negative meniscus lens L54 disposed closest to the image in the fifth lens group G5 is an aspherical lens of which glass lens surface facing the object (thirty third surface counted from the object in FIG. 14) is aspherical.

In the zoom lens according to this example which has the above configuration, upon zooming from a wide-angle end state to a telephoto end state, the distance between each lens group changes, so that the distance between the first lens group G1 and the second lens group G2 increases, the distance between the second lens group G2 and the third lens group G3 decreases, the distance between the third lens group G3 and the fourth lens group G4 increases, and the distance between the fourth lens group G4 and the fifth lens group G5 decreases. At this time, the third lens group G3 and the fifth lens group G5 move together.

An aperture stop S is disposed between the second lens group G2 and the third lens group G3, and moves together with the third lens group G3 upon zooming from the wide-angle end state to the telephoto end state.

In the zoom lens according to this example, focusing from long distance to close distance is performed by moving the second lens group G2 in a direction toward the object.

Hand motion blur correction (vibration-isolation) is performed by moving the cemented lens of the 4A lens group GA so as to have components orthogonal to the optical axis.

In Example 5, in order to correct angle θ of rotation blur in a lens of which focal length of the zoom lens is f and the ratio of the image moving amount on the image forming surface with respect to the moving amount of the moving lens group during blur correction, that is vibration-isolation coefficient, is K, the moving lens group for blur correction is moved for (f·tan θ)/K, so as to have components orthogonal to the optical axis. In the wide-angle end state in Example 5, the vibration-isolation coefficient is 0.98 and the focal length is 28.80 (mm), so the moving amount of the fourth lens group G4 for correcting a 0.58° rotation blur is 0.30 (mm). In the telephoto end state in Example 5, the vibration-isolation coefficient is 1.70 and the focal length is 292.00 (mm), so the moving amount of the fourth lens group G4 for correcting a 0.18° rotation blur is 0.57 (mm).

Table 5 shows each data value of the zoom lens according to Example 5. The surface numbers 1 to 34 in Table 5 correspond to the surfaces 1 to 34 in FIG. 14.

TABLE 5

| [General Data] | | | |
|---|---|---|---|
| f | 28.8 | 100.0 | 291.9 |
| Fno | 3.6 | 5.4 | 5.9 |
| 2ω | 76.3 | 23.4 | 8.2 |
| Y | 21.6 | 21.6 | 21.6 |
| TL | 164.6 | 210.8 | 237.6 |
| BF | 38.668 | 65.898 | 78.377 |

| [Lens Data] | | | | |
|---|---|---|---|---|
| Surface number | r | d | nd | νd |
| 1 | 124.2669 | 1.000 | 1.85026 | 32.35 |
| 2 | 65.6300 | 10.060 | 1.49782 | 82.56 |
| 3 | −11797.766 | 0.100 | 1.00000 | |
| 4 | 69.1189 | 6.568 | 1.59319 | 67.87 |
| 5 | 585.6642 | D5 | 1.00000 | |
| *6 | 112.8410 | 1.000 | 1.76684 | 46.82 |
| 7 | 17.9479 | 7.242 | 1.00000 | |
| 8 | −46.5542 | 1.000 | 1.81600 | 46.63 |
| 9 | 66.1042 | 0.100 | 1.00000 | |
| 10 | 34.8030 | 4.801 | 1.84666 | 23.77 |
| 11 | −39.9905 | 1.014 | 1.00000 | |
| 12 | −27.6099 | 1.000 | 1.83481 | 42.72 |
| 13 | 1177.0768 | D13 | 1.00000 | |
| 14 | 0.0000 | 0.500 | 1.00000 | (aperture stop S) |
| 15 | 45.9090 | 3.500 | 1.75500 | 52.29 |
| 16 | −58.7912 | 0.100 | 1.00000 | |
| 17 | 35.0034 | 4.500 | 1.49782 | 82.56 |
| 18 | −35.3849 | 1.000 | 1.79504 | 28.69 |
| 19 | 65.2580 | 0.100 | 1.00000 | |
| 20 | 28.8329 | 1.871 | 1.81600 | 46.63 |
| 21 | 15.4357 | 6.462 | 1.51742 | 52.32 |
| 22 | −87.3182 | D22 | 1.00000 | |
| 23 | −117.6399 | 1.000 | 1.77250 | 49.61 |
| 24 | 16.7518 | 3.000 | 1.85026 | 32.35 |
| 25 | 51.4655 | 4.628 | 1.00000 | |
| *26 | −24.4461 | 1.200 | 1.71300 | 53.89 |
| 27 | −58.2076 | D27 | 1.00000 | |
| 28 | 73.1770 | 5.500 | 1.60311 | 60.68 |
| 29 | −24.7896 | 0.166 | 1.00000 | |
| 30 | 91.8843 | 6.791 | 1.51823 | 58.89 |
| 31 | −18.6935 | 1.000 | 1.81600 | 46.63 |
| 32 | −48.9134 | 1.917 | 1.00000 | |
| *33 | −24.2966 | 1.000 | 1.82080 | 42.71 |
| 34 | −56.3780 | BF | 1.00000 | |

TABLE 5-continued

[Aspherical Data]

Sixth surface

κ = −1.0000E+00, A4 = 1.2946E−06, A6 = 6.9345E−09,
A8 = −7.3236E−11, A10 = 2.8299E−13, A12 = −2.9971E−16

Twenty sixth surface

κ = 0.1763E+00, A4 = −1.5504E−06, A6 = 1.8584E−08,
A8 = 0.0000E+00, A10 = 0.0000E+00, A12 = 0.0000E+00

Thirty third surface

κ = 1.0000E+00, A4 = −4.8013E−06, A6 = −2.8757E−09,
A8 = 8.0066E−11, A10 = −2.4817E−13, A12 = 0.0000E+00

[Variable Distance Data]

|     | Wide-angle end State | Intermediate focal length state | Telephoto end state |
| --- | --- | --- | --- |
| D5  | 2.226  | 38.148 | 64.584 |
| D13 | 31.000 | 14.096 | 1.917  |
| D22 | 1.523  | 5.269  | 6.049  |
| D27 | 6.332  | 2.586  | 1.806  |

[Lens Group Data]

| Group number | First surface of group | Focal length of group |
| --- | --- | --- |
| G1 | 1  | 110.62  |
| G2 | 6  | −17.76  |
| G3 | 14 | 26.64   |
| G4 | 23 | −27.33  |
| G5 | 28 | 41.87   |

[Conditional Expression Correspondence Value]

Conditional Expression (7) (−f4)/ft = 0.09
Conditional Expression (8) f5/(−f4) = 1.53
Conditional Expression (9) (−f2)/(−f4) = 0.65
Conditional Expression (10) f1/(−f4) = 4.05
Conditional Expression (11) f5/ft = 0.14
Conditional Expression (12) (Bft − Bfw)/f3 = 1.49

As shown in the data table in Table 5, the zoom lens according to Example 5 satisfies all the conditional Expressions (7) to (12).

Figure 15A:
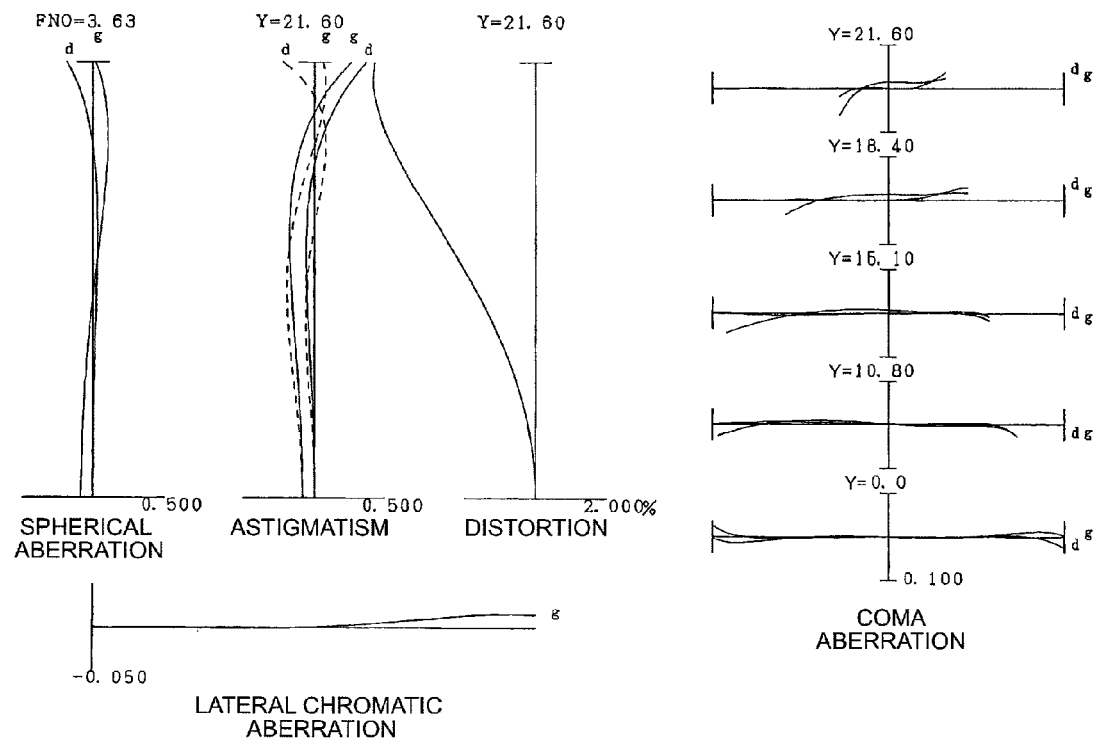
FIGS. 15A and 15B are graphs showing various aberrations of the zoom lens according to Example 5 upon focusing on infinity in the wide-angle end state, and graphs showing meridional lateral aberrations after a 0.58° rotation blur is corrected.
Figure 15B:
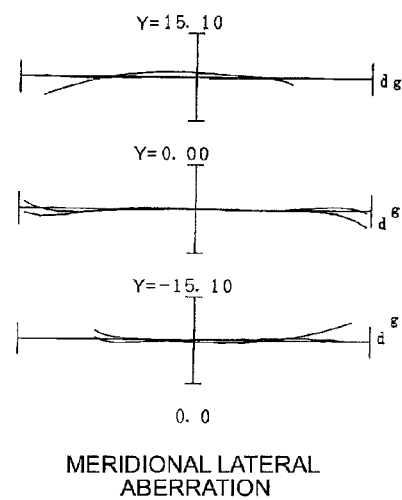
Figure 17A:
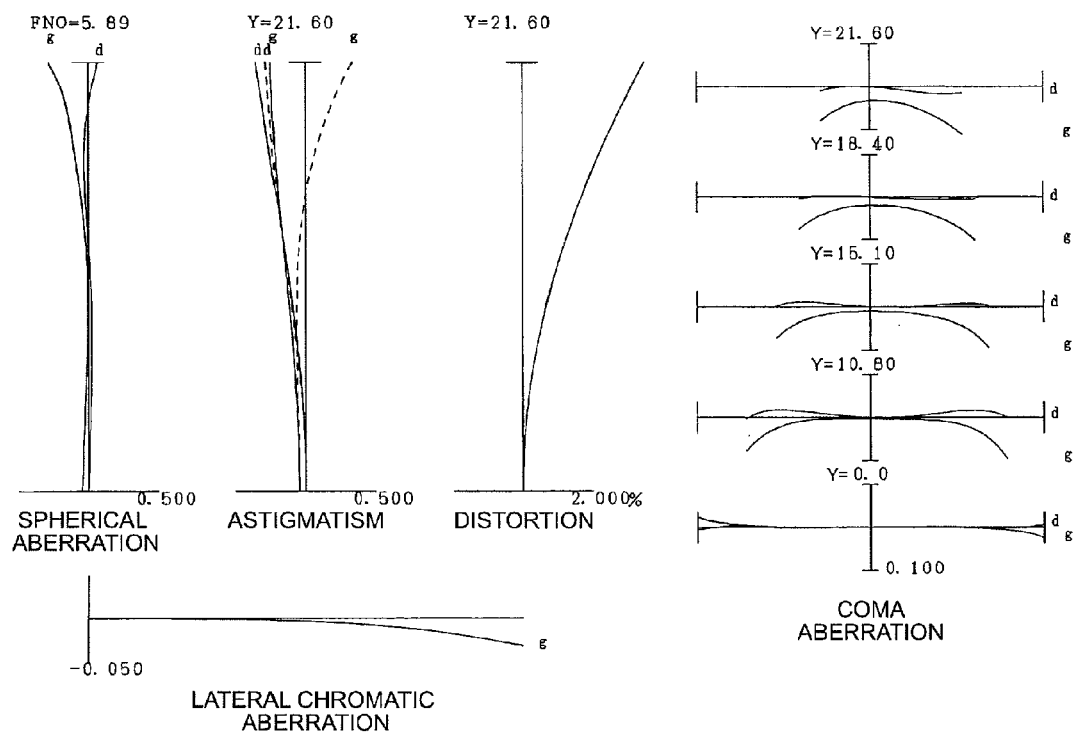
FIGS. 17A and 17B are graphs showing various aberrations of the zoom lens according to Example 5 upon focusing on infinity in the telephoto end state, and graphs showing meridional lateral aberrations after a 0.18° rotation blur is corrected.
Figure 17B:
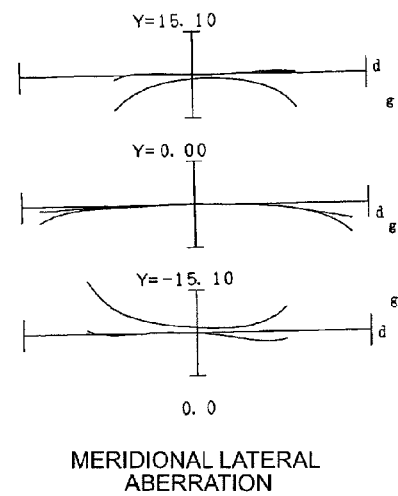

FIG. 15A and FIG. 15B are graphs showing various aberrations of the zoom lens according to Example 5 upon focusing on infinity in the wide-angle end state, and graphs showing meridional lateral aberrations upon correcting a 0.58° rotation blur. FIG. 16 are graphs showing various aberrations of the zoom lens according to Example 5 upon focusing on infinity in the intermediate focal length state. FIG. 17A and FIG. 17B are graphs showing various aberrations of the zoom lens according to Example 5 upon focusing on infinity in the telephoto end state, and graphs showing meridional lateral aberrations upon correcting a 0.18° rotation blur.

As each graph showing aberrations clarifies, the zoom lens according to Example 5 has an excellent image forming performance that corrects various aberrations well in each focal length state, from the wide-angle end state to the telephoto end state.

Example 6

Figure 18:
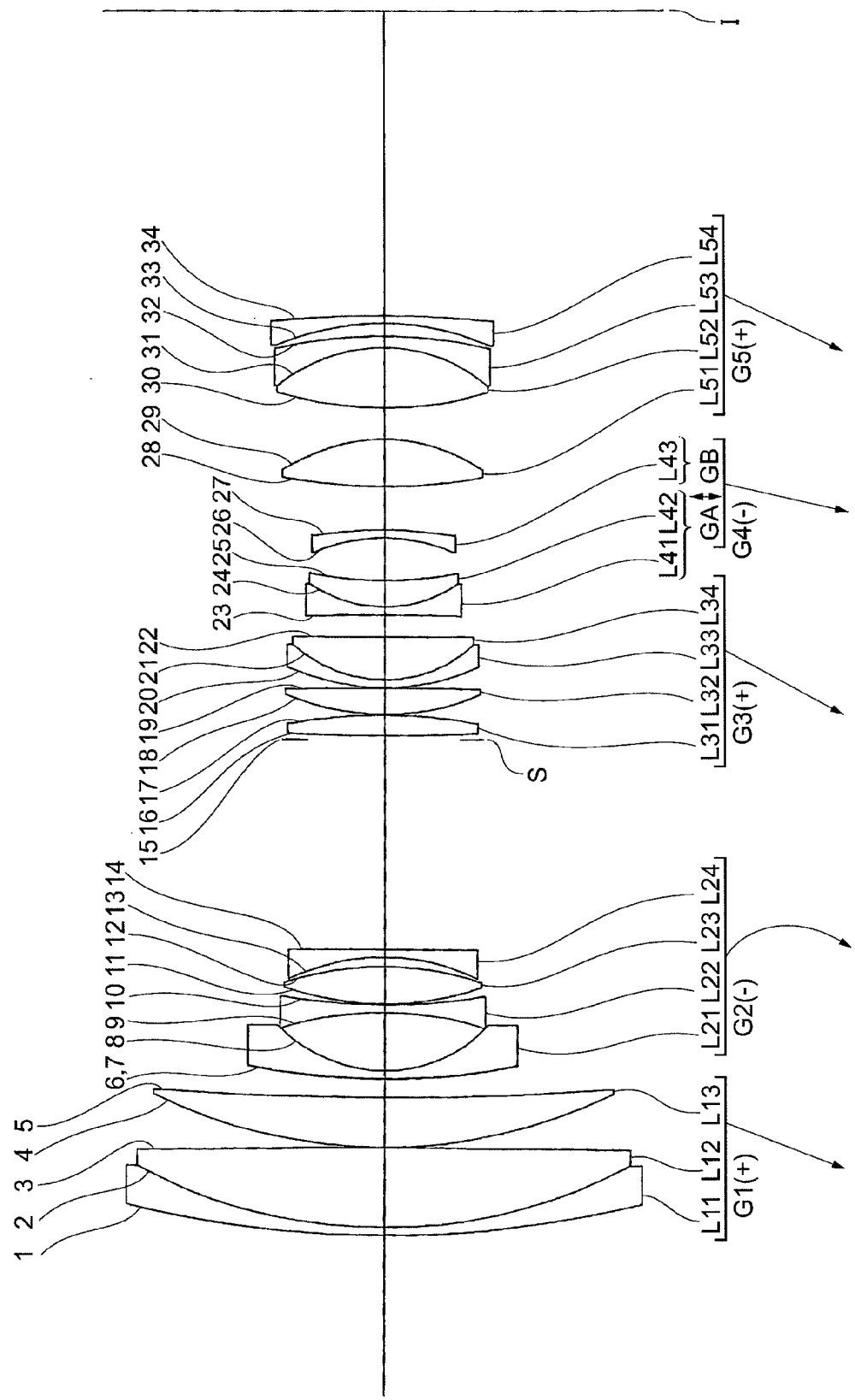
FIG. 18 is a diagram depicting a configuration and zoom locus of a zoom lens system according to Example 6.

Example 6 will now be described with reference to FIG. 18 to FIG. 21 and Table 6. FIG. 18 is a diagram depicting a configuration and zoom locus of a lens according to Example 6. As shown in FIG. 18, the zoom lens according to Example 6 has, in order from the object, a first lens group G1 having positive refractive power, a second lens group G2 having negative refractive power, a third lens group G3 having positive refractive power, a fourth lens group G4 having negative refractive power, and a fifth lens group G5 having positive refractive power.

The first lens group G1 has, in order from the object, a cemented lens of a negative meniscus lens L11 having a convex surface facing the object and a biconvex positive lens L12, and a positive meniscus lens L13 having a convex surface facing the object.

The second lens group G2 has, in order from the object, a negative meniscus lens L21 having a convex surface facing the object, a biconcave negative lens L22, a biconvex positive lens L23, and a negative meniscus lens L24 having a concave surface facing the object. The negative meniscus lens L21 disposed closest to the object in the second lens group G2 is an aspherical lens of which glass lens surface facing the object (sixth surface counted from the object in FIG. 18) is aspherical.

The third lens group G3 has, in order from the object, a biconvex positive lens L31, a biconvex positive lens L32, a cemented lens of a negative meniscus lens L33 having a convex surface facing the object and a positive meniscus lens L34 having a convex surface facing the object.

The fourth lens group G4 has, in order from the object, a 4A lens group GA which is a cemented lens of a biconcave negative lens L41 and a positive meniscus lens L42 having a convex surface facing the object, and a 4B lens group GB which is a negative meniscus lens L43 having a concave surface facing the object. The negative meniscus lens L43 constituting the 4B lens group GB is an aspherical lens of which glass lens surface facing the object (twenty seventh surface counted from the object in FIG. 18) is aspherical.

The fifth lens group G5 has, in order from the object, a biconvex positive lens L51, a cemented lens of a biconvex positive lens L52 and a negative meniscus lens L53 having a concave surface facing the object, and a negative meniscus lens L54 having a concave surface facing the object. The biconvex positive lens L54 disposed closest to the image in the fifth lens group G5 is an aspherical lens of which glass lens surface facing the object (thirty fourth surface counted from the object in FIG. 18) is aspherical.

In the zoom lens according to this example which has the above configuration, upon zooming from a wide-angle end state to a telephoto end state, the distance between each lens group changes, so that the distance between the first lens group G1 and the second lens group G2 increases, the distance between the second lens group G2 and the third lens group G3 decreases, the distance between the third lens group G3 and the fourth lens group G4 increases, and the distance between the fourth lens group G4 and the fifth lens group G5 decreases.

An aperture stop S is disposed between the second lens group G2 and the third lens group G3, and moves together with the third lens group G3 upon zooming from the wide-angle end state to the telephoto end state.

In the zoom lens according to this example, focusing from long distance to close distance is performed by moving the second lens group G2 in a direction toward the object.

Hand motion blur correction (vibration-isolation) is performed by moving the 4A lens group GA so as to have components orthogonal to the optical axis.

In Example 6, in order to correct angle θ of rotation blur in a lens of which focal length of the zoom lens is f and the ratio of the image moving amount on the image forming surface with respect to the moving amount of the moving lens group during blur correction, that is vibration-isolation coefficient, is K, the moving lens group for blur correction is moved for (f·tan θ)/K, so as to have components orthogonal to the optical axis. In the wide-angle end state in Example 6, the vibration-isolation coefficient is 1.06 and the focal length is 28.80 (mm), so the moving amount of the fourth lens group G4 for correcting a 0.58° rotation blur is 0.27 (mm). In the telephoto end state in Example 6, the vibration-isolation coefficient is 1.70 and the focal length is 291.80 (mm), so the moving amount of the fourth lens group G4 for correcting a 0.18° rotation blur is 0.48 (mm).

Table 6 shows each data value of the zoom lens according to Example 6. The surface numbers 1 to 34 in Table 6 correspond to the surfaces 1 to 34 in FIG. 18.

TABLE 6

[General Data]

| | | | |
|---|---|---|---|
| f | 28.8 | 97.8 | 291.8 |
| Fno | 3.6 | 5.4 | 5.9 |
| 2ω | 76.3 | 24.0 | 8.2 |
| Y | 21.6 | 21.6 | 21.6 |
| TL | 155.259 | 200.892 | 230.440 |
| Bf | 38.296 | 61.715 | 79.010 |

[Lens Data]

| Surface number | r | d | nd | νd |
|---|---|---|---|---|
| 1 | 131.9600 | 1.000 | 1.85026 | 32.35 |
| 2 | 64.7763 | 10.026 | 1.49782 | 82.52 |
| 3 | −1939.8917 | 0.100 | 1.00000 | |
| 4 | 64.6003 | 6.329 | 1.61800 | 63.38 |
| 5 | 410.2657 | D5 | 1.00000 | |
| *6 | 89.4836 | 0.100 | 1.55389 | 38.09 |
| 7 | 89.4836 | 1.000 | 1.81600 | 46.63 |
| 8 | 17.9244 | 7.340 | 1.00000 | |
| 9 | −42.0840 | 1.000 | 1.81600 | 46.63 |
| 10 | 73.2932 | 0.100 | 1.00000 | |
| 11 | 36.7795 | 4.691 | 1.84666 | 23.78 |
| 12 | −39.1344 | 1.214 | 1.00000 | |
| 13 | −26.1074 | 1.000 | 1.81600 | 46.63 |
| 14 | −3773.9951 | D14 | 1.00000 | |
| 15 | 0.0000 | 0.500 | 1.00000 | (aperture stop S) |
| 16 | 224.1127 | 2.598 | 1.69680 | 55.52 |
| 17 | −66.2510 | 0.100 | 1.00000 | |
| 18 | 30.7404 | 3.300 | 1.49782 | 82.56 |
| 19 | −2017.6973 | 0.100 | 1.00000 | |
| 20 | 27.5622 | 1.000 | 1.84666 | 23.78 |
| 21 | 16.0865 | 5.531 | 1.51680 | 64.12 |
| 22 | 1640.3102 | D22 | 1.00000 | |
| 23 | −254.1339 | 1.000 | 1.81600 | 46.63 |
| 24 | 15.9374 | 3.355 | 1.85026 | 32.35 |
| 25 | 45.3566 | 5.500 | 1.00000 | |
| 26 | −20.8777 | 1.000 | 1.81600 | 46.63 |
| *27 | −53.9758 | D27 | 1.00000 | |
| 28 | 67.5729 | 6.000 | 1.51860 | 69.89 |
| 29 | −20.5166 | 4.000 | 1.00000 | |
| 30 | 47.4864 | 7.500 | 1.51742 | 52.32 |
| 31 | −20.4408 | 1.500 | 1.81600 | 46.63 |
| 32 | −56.8501 | 1.619 | 1.00000 | |
| 33 | −33.4116 | 1.000 | 1.81600 | 46.63 |
| *34 | −130.4172 | Bf | 1.00000 | |

[Aspherical Data]

Sixth surface

κ = 8.332, A4 = 1.1402E−06, A6 = 5.3964E−10, A8 = −2.3261E−11, A10 = 1.0349E−13, A12 = 0.0000E+00

Twenty seventh surface

κ = −3.0393, A4 = 4.0455E−06, A6 = −5.4765E−09, A8 = 2.7129E−11, A10 = 0.0000E+00, A12 = 0.0000E+00

Thirty fourth surface

κ = 0.181, A4 = −1.3072E−06, A6 = 5.5840E−09, A8 = −8.7610E−11, A10 = 2.5603E−13, A12 = 0.0000E+00

TABLE 6-continued

[Variable Distance Data]

| | Wide-angle end State | Intermediate focal length state | Telephoto end state |
|---|---|---|---|
| D5 | 2.325 | 38.632 | 62.363 |
| D14 | 26.770 | 12.676 | 1.198 |
| D22 | 2.836 | 6.232 | 7.367 |
| D27 | 5.530 | 2.134 | 1.000 |

[Lens Group Data]

| Group number | First surface of group | Focal length of group |
|---|---|---|
| G1 | 1 | 107.36 |
| G2 | 6 | −16.98 |
| G3 | 16 | 25.15 |
| G4 | 23 | −21.73 |
| G5 | 28 | 32.44 |

[Conditional Expression Correspondence Value]

Conditional Expression (7) (−f4)/ft = 0.07
Conditional Expression (8) f5/(−f4) = 1.49
Conditional Expression (9) (−f2)/(−f4) = 0.78
Conditional Expression (10) f1/(−f4) = 4.94
Conditional Expression (11) f5/ft = 0.11
Conditional Expression (12) (Bft − Bfw)/f3 = 1.62

As shown in the data table in Table 6, the zoom lens according to Example 6 satisfies all the conditional Expressions (7) to (12).

Figure 19A:
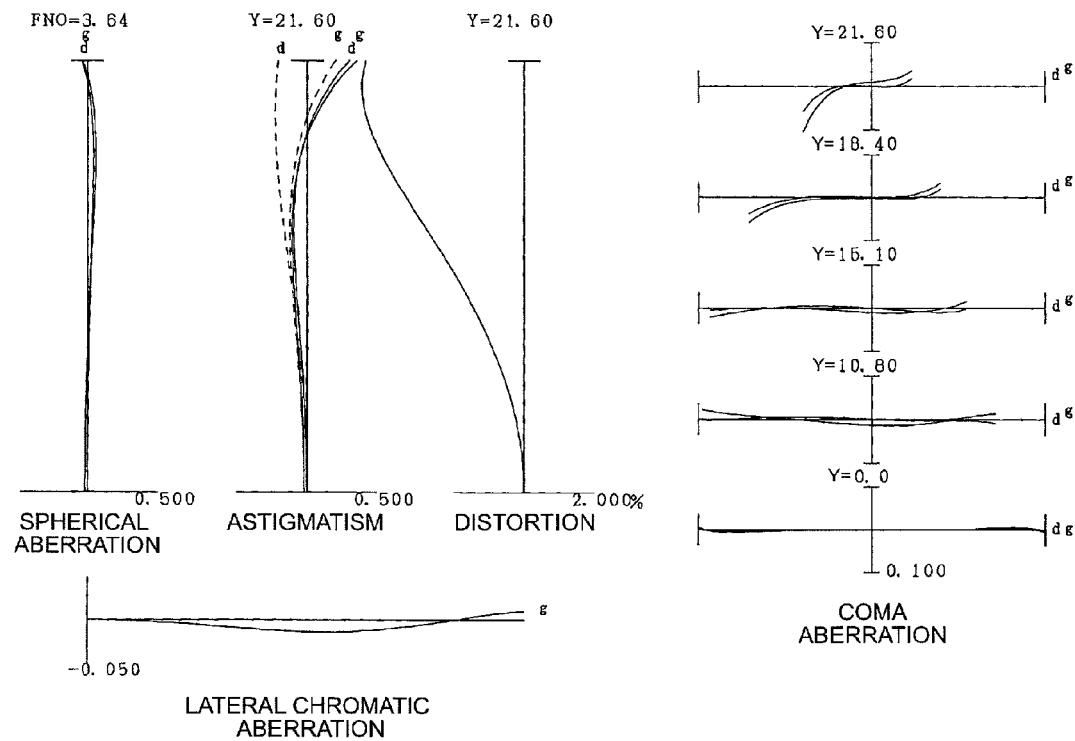
FIGS. 19A and 19B are graphs showing various aberrations of the zoom lens according to Example 6 upon focusing on infinity in the wide-angle end state, and graphs showing meridional lateral aberrations after a 0.58° rotation blur is corrected.
Figure 19B:
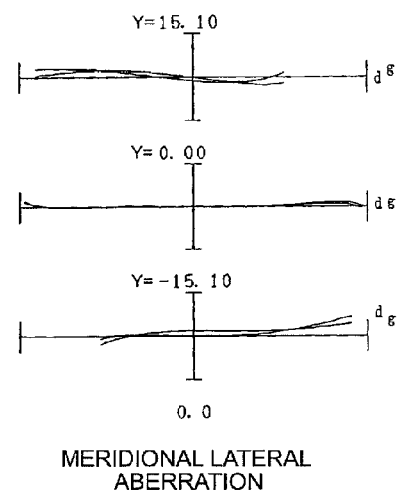
Figure 20:
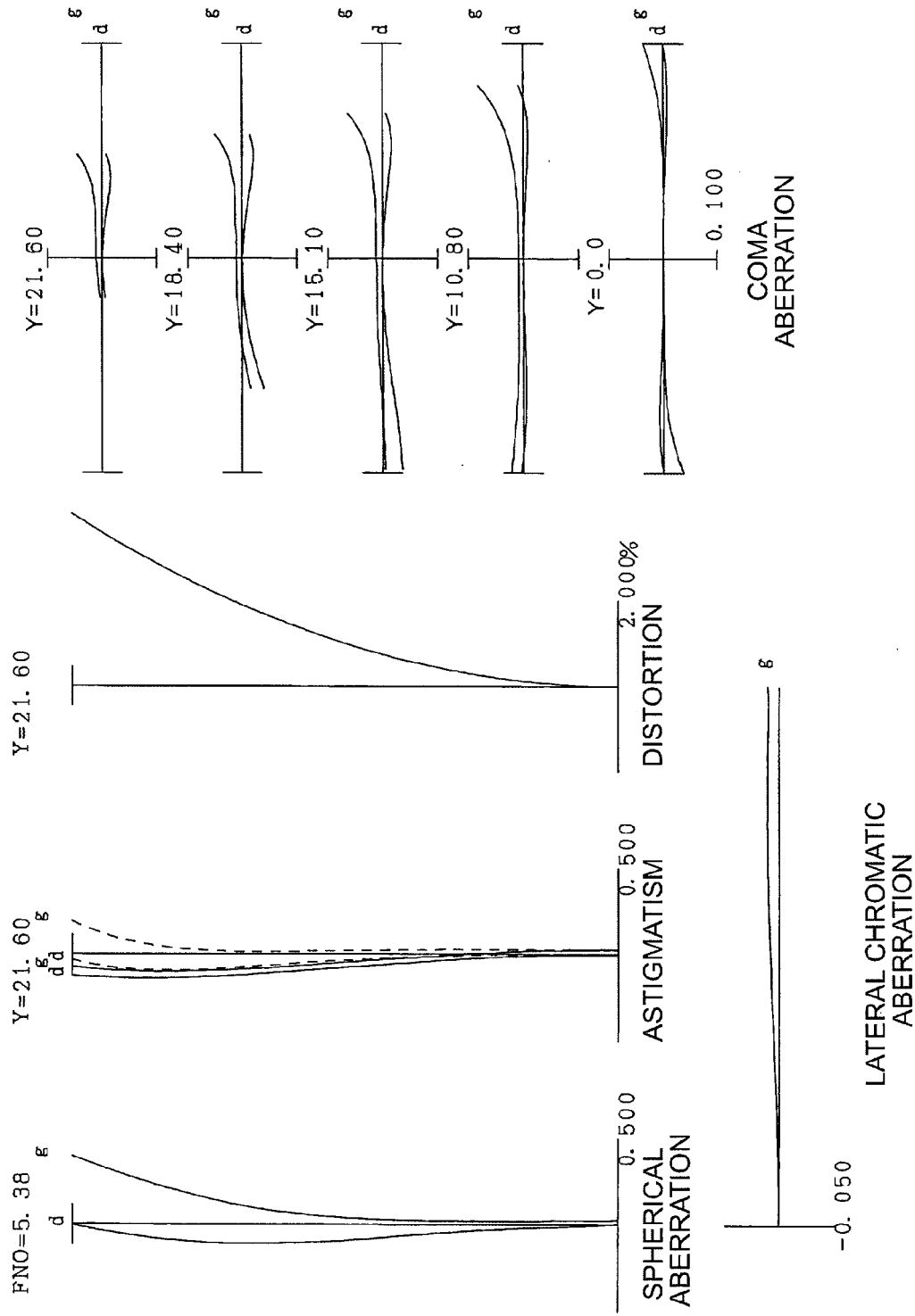
FIG. 20 are graphs showing various aberrations of the zoom lens according to Example 6 upon focusing on infinity in the intermediate focal length state.
Figure 21A:
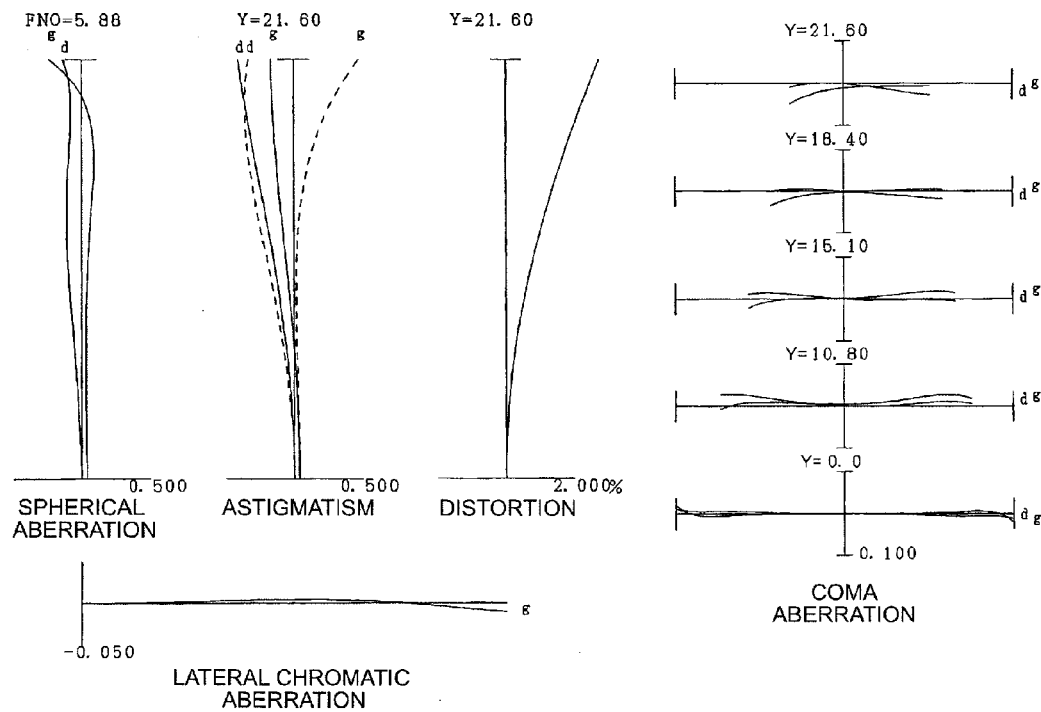
FIGS. 21A and 21B are graphs showing various aberrations of the zoom lens according to Example 6 upon focusing on infinity in the telephoto end state, and graphs showing meridional lateral aberrations after a 0.18° rotation blur is corrected.
Figure 21B:
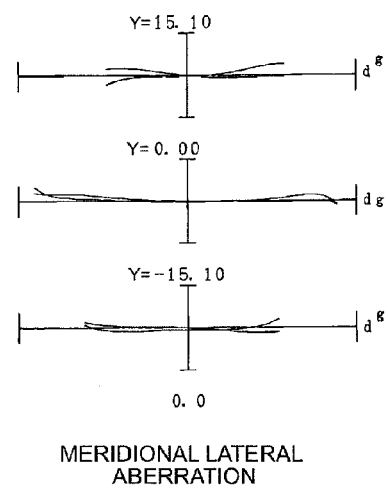

FIG. 19A and FIG. 19B are graphs showing various aberrations of the zoom lens according to Example 6 upon focusing on infinity in the wide-angle end state, and graphs showing meridional lateral aberrations upon correcting a 0.58° rotation blur. FIG. 20 are graphs showing various aberrations of the zoom lens according to Example 6 upon focusing on infinity in the intermediate focal length state. FIG. 21A and FIG. 21B are graphs showing various aberrations of the zoom lens according to Example 6 upon focusing on infinity in the telephoto end state, and graphs showing meridional lateral aberrations upon correcting a 0.18° rotation blur.

As each graph showing aberrations clarifies, the zoom lens according to Example 6 has an excellent image forming performance that corrects various aberrations well in each focal length state, from the wide-angle end state to the telephoto end state.

In the above embodiment, the following content can be adopted within a range where the optical performance is not diminished.

In the above examples, a zoom lens comprised of five lens groups was shown, but the present invention can also be applied to a configuration having a different number of lens groups, such as six or seven lens groups. A configuration where a lens or a lens group is added to the side closest to the object, or a configuration where a lens or a lens group is added to the side closest to the image, may be used. A lens group refers to a portion having at least one lens, separated by an air space which changes upon zooming.

A single or plurality of lens group(s) or a partial lens group may be designed to be a focusing lens group, which performs focusing from an object at infinity to an object at close distance by moving in the optical axis direction. The focusing lens group can be applied to auto focus, and is also suitable for driving a motor for auto focusing (e.g. driving using an ultrasonic motor). It is particularly preferable that at least a part of the second lens group G2 is designed to be the focusing lens group.

A lens group or a partial lens group may be designed to be a vibration-isolating lens group, which corrects image blurs generated by hand motion by moving the lens group or a partial lens group so as to have components orthogonal to the optical axis, or rotary moving (oscillating) the lens group or the partial lens group in an in-plane direction including the optical axis. For the movement, rotary movement (oscillation) around a certain point on the optical axis as a center of rotation may be used. It is particularly preferable that at least a part of the third lens group G3 or the fourth lens group G4 is designed to be the vibration-isolating lens group.

The lens surface may be formed to be a spherical surface or plane, or an aspherical surface. If the lens surface is a spherical surface or plane, then lens processing, assembly and adjustment are easy, and deterioration of optical performance, due to an error in processing, assembly and adjustment, can be prevented. Even if the image plane is shifted, the drawing performance is not affected very much, which is desirable. If the lens surface is an aspherical surface, the aspherical surface can be any aspherical surface, out of an aspherical surface generated by grinding, a glass molded aspherical surface generated by forming glass in an aspherical shape using a die, and a composite aspherical surface generated by forming a resin on the surface of the glass to be an aspherical shape. The lens surface may be a diffraction surface, and the lens may be a refractive index distributed lens (GRIN lens) or plastic lens.

It is preferable that the aperture stop S is disposed near the third lens group G3 or the fourth lens group G4, but the role of the aperture stop may be substituted by the frame of the lens, without disposing a separate element as the aperture stop. It is particularly preferable that the aperture stop S is disposed at the object side of the third lens group G3.

Each lens surface may be coated by an anti-reflection film which has high transmittance in a wide wavelength region, in order to decrease flares and ghosts, and implement a high optical performance with high contrast.

The zoom ratio of the zoom lens (zooming optical system) of the present embodiment is ×5 to ×18, and more preferably ×8 to ×12.

In the zoom lens (zooming optical system) of the present embodiment, it is preferable that the first lens group G1 has two positive lenses and one negative lens. In the first lens group G1, it is preferable that lenses are disposed, in order from the object, to be in the sequence of negative, positive and positive.

In the zoom lens (zooming optical system) of the present embodiment, it is preferable that the second lens group G2 has one positive lens and three negative lens. In the second lens group G2, it is preferable that the lens components are disposed, in order from the object, to be in the sequence of negative, negative, positive and negative, with air distance there between.

In the zoom lens (zooming optical system) of the present embodiment, it is preferable that the third lens group G3 has three positive lenses and one negative lens. In the third lens group G3, it is preferable that the lens components are disposed, in order from the object, to be in the sequence of positive, positive and positive, with air distance there between.

In the zoom lens (zooming optical system) of the present embodiment, it is preferable that the fourth lens group G4 has one positive lens and two negative lenses. In the fourth lens group G4, it is preferable that the lens components are disposed, in order from the object, to be in the sequence of negative and negative, with air distance there between.

In the zoom lens (zooming optical system) of the present embodiment, it is preferable that the fifth lens group G5 has two positive lenses and one negative lens. In the fifth lens group G5, it is preferable that the lens components are disposed, in order from the object, to be in the sequence of positive, positive and negative, with air distance there between.

Example 7

Example 7 will now be described with reference to FIG. 22 to FIG. 25 and Table 7. FIG. 22 is a diagram depicting a configuration and zoom locus of a lens according to Example 7. As shown in FIG. 22, the zoom lens according to Example 7 has, in order from the object, a first lens group G1 having positive refractive power, a second lens group G2 having negative refractive power, a third lens group G3 having positive refractive power, a fourth lens group G4 having negative refractive power, and a fifth lens group G5 having positive refractive power.

The first lens group G1 has, in order from the object, a cemented lens of a negative meniscus lens L11 having a convex surface facing the object and a biconvex positive lens L12, and a positive meniscus lens L13 having a convex surface facing the object.

The second lens group G2 has, in order from the object, a negative meniscus lens L21 having a convex surface facing the object, a biconcave negative lens L22, a biconvex positive lens L23, and a negative meniscus lens L24 having a concave surface facing the object. The negative meniscus lens L21 disposed closest to the object in the second lens group G2 is an aspherical lens of which glass lens surface facing the object (sixth surface counted from the object in FIG. 22) is aspherical.

The third lens group G3 has, in order from the object, a biconvex positive lens L31, a cemented lens of a biconvex positive lens L32 and a biconcave negative lens L33, and a cemented lens of a negative meniscus lens L34 having a convex surface facing the object and a biconvex positive lens L35.

The fourth lens group G4 has, in order from the object, a 4A lens group GA which is a cemented lens of a biconcave negative lens L41 and a positive meniscus lens L42 having a convex surface facing the object, and a 4B lens group GB which is a negative meniscus lens L43 having a concave surface facing the object. The negative meniscus lens L43 in the 4B lens group GB is an aspherical lens of which glass lens surface facing the object (twenty seventh surface counted from the object in FIG. 22) is aspherical.

The fifth lens group G5 has, in order from the object, a biconvex positive lens L51, a cemented lens of a biconvex positive lens L52 and a negative meniscus lens L53 having a concave surface facing the object, and a negative meniscus lens L54 having a concave surface facing the object. The negative meniscus lens L54 disposed closest to the image in the fifth lens group G5 is an aspherical lens of which glass lens surface facing the object (thirty fourth surface counted from the object in FIG. 22) is aspherical.

In the zoom lens according to this example which has the above configuration, upon zooming from a wide-angle end state to a telephoto end state, the distance between each lens group changes, so that the distance between the first lens group G1 and the second lens group G2 increases, the distance between the second lens group G2 and the third lens group G3 decreases, the distance between the third lens group G3 and the fourth lens group G4 increases, and the distance between the fourth lens group G4 and the fifth lens group G5 decreases.

An aperture stop S is disposed between the second lens group G2 and the third lens group G3, and moves together with the third lens group G3 upon zooming from the wide-angle end state to the telephoto end state.

In the zoom lens according to this example, focusing from long distance to close distance is performed by moving the second lens group G2 in a direction toward the object.

Hand motion blur correction (vibration-isolation) is performed by moving the cemented lens of the 4A lens group GA so as to have components orthogonal to the optical axis.

In Example 7, in order to correct angle θ of rotation blur in a lens of which focal length of the zoom lens is f and the ratio of the image moving amount on the image forming surface with respect to the moving amount of the moving lens group during blur correction, that is vibration-isolation coefficient, is K, the moving lens group for blur correction is moved for (f·tan θ)/K, so as to have components orthogonal to the optical axis. In the wide-angle end state in Example 7, the vibration-isolation coefficient is 0.89 and the focal length is 28.8 (mm), so the moving amount of the fourth lens group G4 for correcting a 0.58° rotation blur is 0.33 (mm). In the telephoto end state in Example 7, the vibration-isolation coefficient is 1.50 and the focal length is 292.0 (mm), so the moving amount of the fourth lens group G4 for correcting a 0.18° rotation blur is 0.62 (mm).

Table 7 shows each data value of the zoom lens according to Example 7. The surface numbers 1 to 35 in Table 7 correspond to the surfaces 1 to 35 in FIG. 22.

TABLE 7

[General Data]

| | | | |
|---|---|---|---|
| f | 28.8 | 95.2 | 292.0 |
| Fno | 3.6 | 5.5 | 6.0 |
| 2ω | 76.6 | 24.5 | 8.2 |
| Y | 21.6 | 21.6 | 21.6 |
| TL | 156.032 | 198.835 | 229.227 |
| Bf | 38.462 | 61.654 | 76.605 |

[Lens Data]

| Surface number | r | d | nd | vd |
|---|---|---|---|---|
| 1 | 138.8204 | 1.000 | 1.85026 | 32.35 |
| 2 | 69.6255 | 9.900 | 1.49782 | 82.52 |
| 3 | −1121.4726 | 0.100 | 1.00000 | |
| 4 | 66.5234 | 6.500 | 1.60300 | 65.47 |
| 5 | 364.2280 | D5 | 1.00000 | |
| *6 | 77.5565 | 0.101 | 1.55389 | 38.09 |
| 7 | 69.1985 | 1.003 | 1.80400 | 46.58 |
| 8 | 17.7505 | 7.303 | 1.00000 | |
| 9 | −45.2772 | 1.000 | 1.81600 | 46.63 |
| 10 | 64.3914 | 0.149 | 1.00000 | |
| 11 | 34.6940 | 4.700 | 1.84666 | 23.77 |
| 12 | −46.1405 | 1.178 | 1.00000 | |
| 13 | −27.3129 | 1.000 | 1.81600 | 46.63 |
| 14 | −2388.7913 | D14 | 1.00000 | |
| 15 | 0.0000 | 0.500 | 1.00000 | (aperture stop S) |
| 16 | 240.3547 | 2.700 | 1.61800 | 63.38 |
| 17 | −48.3097 | 0.100 | 1.00000 | |
| 18 | 32.2344 | 4.000 | 1.60300 | 65.47 |
| 19 | −65.8684 | 1.000 | 1.85026 | 32.35 |
| 20 | 163.3971 | 0.300 | 1.00000 | |
| 21 | 28.9156 | 1.500 | 1.85026 | 32.35 |
| 22 | 16.0863 | 5.700 | 1.51680 | 64.12 |
| 23 | −90.6196 | D23 | 1.00000 | |
| 24 | −353.6058 | 1.000 | 1.77250 | 49.61 |
| 25 | 13.7394 | 2.967 | 1.80100 | 34.96 |
| 26 | 49.7586 | 5.375 | 1.00000 | |

TABLE 7-continued

| | | | | |
|---|---|---|---|---|
| *27 | −18.4961 | 1.000 | 1.72916 | 54.66 |
| 28 | −30.5221 | D28 | 1.00000 | |
| 29 | 258.3375 | 5.299 | 1.51680 | 64.12 |
| 30 | −21.7751 | 0.100 | 1.00000 | |
| 31 | 71.6589 | 6.791 | 1.51823 | 58.89 |
| 32 | −19.3953 | 1.000 | 1.81600 | 46.63 |
| 33 | −37.1560 | 1.917 | 1.00000 | |
| *34 | −22.1994 | 1.000 | 1.79668 | 45.34 |
| 35 | −69.8232 | Bf | 1.00000 | |

[Aspherical Data]

Sixth surface

κ = 4.881, A4 = 5.5213E−07, A6 = −3.4799E−09, A8 = −1.0831E−11, A10 = 8.3083E−14, A12 = 0.0000E+00

Twenty seventh surface

κ = 0.6133, A4 = 3.3743E−06, A6 = 1.0271E−08, A8 = 0.0000E+00, A10 = 0.0000E+00, A12 = 0.0000E+00

Thirty fourth surface

κ = 0.8088, A4 = −6.7721E−06, A6 = 1.4720E−08, A8 = −2.0115E−11, A10 = 0.0000E+00, A12 = 0.0000E+00

[Variable Distance Data]

| | Wide-angle end State | Intermediate focal length state | Telephoto end state |
|---|---|---|---|
| D5 | 2.025 | 37.999 | 65.479 |
| D14 | 29.610 | 13.247 | 1.208 |
| D23 | 2.683 | 7.326 | 8.459 |
| D28 | 7.070 | 2.427 | 1.293 |

[Lens Group Data]

| Group number | First surface of group | Focal length of group |
|---|---|---|
| G1 | 1 | 112.11 |
| G2 | 6 | −17.38 |
| G3 | 16 | 25.99 |
| G4 | 24 | −30.94 |
| G5 | 29 | 51.56 |

[Conditional Expression Correspondence Value]

Conditional Expression (13) f1/(−f4) = 3.62
Conditional Expression (14) (−f4)/ft = 0.11
Conditional Expression (15) (−f2)/(−f4) = 0.56
Conditional Expression (16) (Bft − Bfw)/f3 = 1.47
Conditional Expression (17) f5/ft = 0.18
Conditional Expression (18) f1/f3 = 4.31

As shown in the data table in Table 7, the zoom lens according to Example 7 satisfies all the conditional Expressions (13) to (18).

Figure 23A:
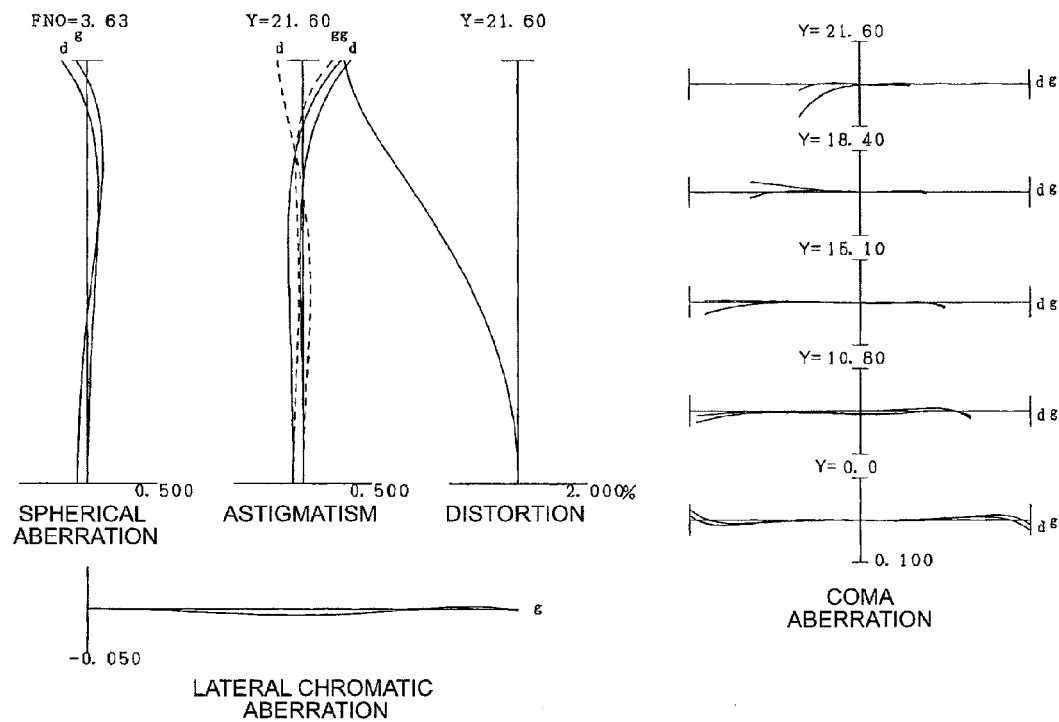
FIGS. 23A and 23B are graphs showing various aberrations of the zoom lens according to Example 7 upon focusing on infinity in the wide-angle end state, and graphs showing meridional lateral aberrations after a 0.58° rotation blur is corrected.
Figure 23B:
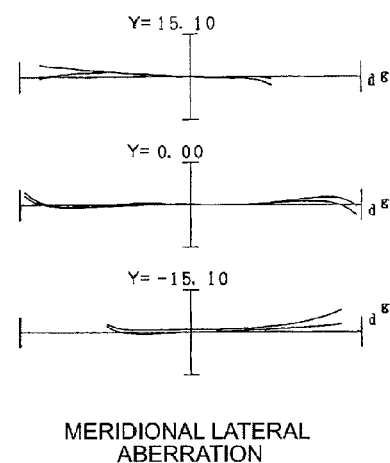
Figure 25A:
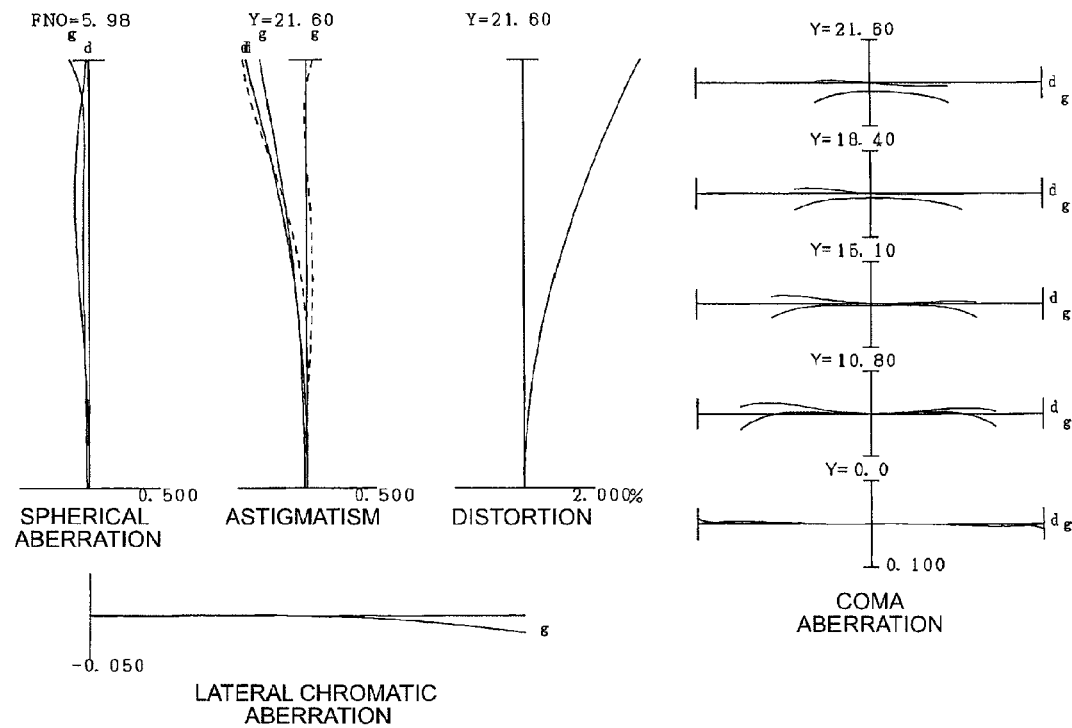
FIGS. 25A and 25B are graphs showing various aberrations of the zoom lens according to Example 7 upon focusing on infinity in the telephoto end state, and graphs showing meridional lateral aberrations after a 0.18° rotation blur is corrected.
Figure 25B:
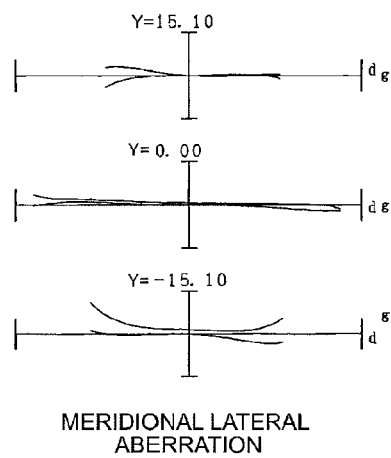

FIG. 23A and FIG. 23B are graphs showing various aberrations of the zoom lens according to Example 7 upon focusing on infinity in the wide-angle end state, and graphs showing meridional lateral aberrations upon correcting a 0.58° rotation blur. FIG. 24 are graphs showing various aberrations of the zoom lens according to Example 7 upon focusing on infinity in the intermediate focal length state. FIG. 25A and FIG. 25B are graphs showing various aberrations of the zoom lens according to Example 7 upon focusing on infinity in the telephoto end state, and graphs showing meridional lateral aberrations upon correcting a 0.18° rotation blur.

In each graph showing aberration, FNO is an F number, and Y is an image height (unit: mm). In the graphs showing spherical aberration, a value of the F number corresponding to the maximum aperture is shown, in the graphs showing astigmatism and graphs showing distortion, a maximum value of the image height is shown respectively, and in graphs showing coma aberration, a value of each image height is shown. d indicates various aberrations at d-line (wavelength: 587.6 nm), and g indicates various aberrations at g-line (wavelength: 435.8 nm), and no indication indicates various aberrations at d-line. In graphs showing astigmatism, the solid line indicates the sagittal image surface, and the broken line indicates the meridional image surface. The description on the graphs showing aberrations is the same for other examples.

As each graph showing aberrations clarifies, the zoom lens according to Example 7 has an excellent image forming performance that corrects various aberrations well in each focal length state, from the wide-angle end state to the telephoto end state.

Example 8

Example 8 will now be described with reference to FIG. 26 to FIG. 29 and Table 8. FIG. 26 is a diagram depicting a configuration and zoom locus of a lens according to Example 8. As shown in FIG. 26, the zoom lens according to Example 8 has, in order from the object, a first lens group G1 having positive refractive power, a second lens group G2 having negative refractive power, a third lens group G3 having positive refractive power, a fourth lens group G4 having negative refractive power, and a fifth lens group G5 having positive refractive power.

The first lens group G1 has, in order from the object, a cemented lens of a negative meniscus lens L11 having a convex surface facing the object and a biconvex positive lens L12, and a positive meniscus lens L13 having a convex surface facing the object.

The second lens group G2 has, in order from the object, a negative meniscus lens L21 having a convex surface facing the object, a biconcave negative lens L22, a biconvex positive lens L23, and a negative meniscus lens L24 having a concave surface facing the object. The negative meniscus lens L21 disposed closest to the object in the second lens group G2 is an aspherical lens of which glass lens surface facing the object (sixth surface counted from the object in FIG. 26) is aspherical.

The third lens group G3 has, in order from the object, a biconvex positive lens L31, a cemented lens of a biconvex positive lens L32 and a biconcave negative lens L33, and a cemented lens of a negative meniscus lens L34 having a convex surface facing the object and a biconvex positive lens L35.

The fourth lens group G4 has, in order from the object, a 4A lens group GA which is a cemented lens of a biconcave negative lens L41 and a positive meniscus lens L42 having a convex surface facing the object, and a 4B lens group GB which is a negative meniscus lens L43 having a concave surface facing the object. The negative meniscus lens L43 in the 4B lens group GB is an aspherical lens of which glass lens surface facing the object (twenty sixth surface counted from the object in FIG. 26) is aspherical.

The fifth lens group G5 has, in order from the object, a biconvex positive lens L51, a cemented lens of a biconvex positive lens L52 and a negative meniscus lens L53 having a concave surface facing the object, and a negative meniscus lens L54 having a concave surface facing the object. The negative meniscus lens L54 disposed closest to the image in the fifth lens group G5 is an aspherical lens of which glass lens surface facing the object (thirty third surface counted from the object in FIG. 26) is aspherical.

In the zoom lens according to this example which has the above configuration, upon zooming from a wide-angle end state to a telephoto end state, the distance between each lens group changes, so that the distance between the first lens group G1 and the second lens group G2 increases, the distance between the second lens group G2 and the third lens group G3 decreases, the distance between the third lens group G3 and the fourth lens group G4 increases, and the distance between the fourth lens group G4 and the fifth lens group G5 decreases.

An aperture stop S is disposed between the second lens group G2 and the third lens group G3, and moves together with the third lens group G3 upon zooming from the wide-angle end state to the telephoto end state.

In the zoom lens according to this example, focusing from long distance to close distance is performed by moving the second lens group G2 in a direction toward the object.

Hand motion blur correction (vibration-isolation) is performed by moving the 4A lens group GA so as to have components orthogonal to the optical axis.

In Example 8, in order to correct angle θ of rotation blur in a lens of which focal length of the zoom lens is f and the ratio of the image moving amount on the image forming surface with respect to the moving amount of the moving lens group during blur correction, that is vibration-isolation coefficient, is K, the moving lens group for blur correction is moved for (f·tan θ)/K, so as to have components orthogonal to the optical axis. In the wide-angle end state in Example 8, the vibration-isolation coefficient is 0.98 and the focal length is 28.8 (mm), so the moving amount of the fourth lens group G4 for correcting a 0.58° rotation blur is 0.30 (mm). In the telephoto end state in Example 8, the vibration-isolation coefficient is 1.70 and the focal length is 292.0 (mm), so the moving amount of the fourth lens group G4 for correcting a 0.18° rotation blur is 0.54 (mm).

Table 8 shows each data value of the zoom lens according to Example 8. The surface numbers 1 to 34 in Table 8 correspond to the surfaces 1 to 34 in FIG. 26.

TABLE 8

[General Data]

| f | 28.8 | 100.0 | 291.9 |
|---|---|---|---|
| Fno | 3.6 | 5.4 | 5.9 |
| 2ω | 76.3 | 23.4 | 8.2 |
| Y | 21.6 | 21.6 | 21.6 |
| TL | 157.869 | 204.116 | 230.852 |
| Bf | 38.668 | 65.898 | 78.377 |

[Lens Data]

| Surface number | r | d | nd | vd |
|---|---|---|---|---|
| 1 | 124.2669 | 1.000 | 1.85026 | 32.35 |
| 2 | 65.6300 | 10.060 | 1.49782 | 82.56 |
| 3 | −11797.766 | 0.100 | 1.00000 | |
| 4 | 69.1189 | 6.568 | 1.59319 | 67.87 |
| 5 | 585.6642 | D5 | 1.00000 | |
| *6 | 112.8410 | 1.000 | 1.76684 | 46.82 |
| 7 | 17.9479 | 7.242 | 1.00000 | |
| 8 | −46.5542 | 1.000 | 1.81600 | 46.63 |
| 9 | 66.1042 | 0.100 | 1.00000 | |
| 10 | 34.8030 | 4.801 | 1.84666 | 23.77 |
| 11 | −39.9905 | 1.014 | 1.00000 | |
| 12 | −27.6099 | 1.000 | 1.83481 | 42.72 |
| 13 | 1177.0768 | D13 | 1.00000 | |
| 14 | 0.0000 | 0.500 | 1.00000 | (aperture stop S) |
| 15 | 45.9090 | 3.500 | 1.75500 | 52.29 |
| 16 | −58.7912 | 0.100 | 1.00000 | |
| 17 | 35.0034 | 4.500 | 1.49782 | 82.56 |
| 18 | −35.3849 | 1.000 | 1.79504 | 28.69 |
| 19 | 65.2580 | 0.100 | 1.00000 | |
| 20 | 28.8329 | 1.871 | 1.81600 | 46.63 |
| 21 | 15.4357 | 6.462 | 1.51742 | 52.32 |

TABLE 8-continued

| | | | | |
|---|---|---|---|---|
| 22 | −87.3182 | D22 | 1.00000 | |
| 23 | −117.6399 | 1.000 | 1.77250 | 49.61 |
| 24 | 16.7518 | 3.000 | 1.85026 | 32.35 |
| 25 | 51.4655 | 4.628 | 1.00000 | |
| *26 | −24.4461 | 1.200 | 1.71300 | 53.89 |
| 27 | −58.2076 | D27 | 1.00000 | |
| 28 | 73.1770 | 5.500 | 1.60311 | 60.68 |
| 29 | −24.7896 | 0.166 | 1.00000 | |
| 30 | 91.8843 | 6.791 | 1.51823 | 58.89 |
| 31 | −18.6935 | 1.000 | 1.81600 | 46.63 |
| 32 | −48.9134 | 1.917 | 1.00000 | |
| *33 | −24.2966 | 1.000 | 1.82080 | 42.71 |
| 34 | −56.3780 | Bf | 1.00000 | |

[Aspherical Data]

Sixth surface $\kappa = -1.000, A4 = 1.2946E-06, A6 = 6.9345E-09, A8 = -7.3236E-11,$
$A10 = 2.8299E-13, A12 = -2.9971E-16$ Twenty sixth surface $\kappa = 0.1763, A4 = -1.5504E-06, A6 = 1.8584E-08, A8 = 0.0000E+00,$
$A10 = 0.0000E+00, A12 = 0.0000E+00$ Thirty third surface $\kappa = 1.000, A4 = -4.8013E-06, A6 = -2.8757E-09, A8 = 8.0066E-11,$
$A10 = -2.4817E-13, A12 = 0.0000E+00$

[Variable Distance Data]

| | Wide-angle end State | Intermediate focal length state | Telephoto end state |
|---|---|---|---|
| D5 | 2.226 | 38.148 | 64.584 |
| D13 | 31.000 | 14.096 | 1.917 |
| D22 | 1.523 | 5.269 | 6.049 |
| D27 | 6.332 | 2.586 | 1.806 |

[Lens Group Data]

| Group number | First surface of group | Focal length of group |
|---|---|---|
| G1 | 1 | 110.62 |
| G2 | 6 | −17.76 |
| G3 | 15 | 26.64 |
| G4 | 23 | −27.33 |
| G5 | 28 | 41.87 |

[Conditional Expression Correspondence Value]

Conditional Expression (13) f1/(−f4) = 4.03
Conditional Expression (14) (−f4)/ft = 0.09
Conditional Expression (15) (−f2)/(−f4) = 0.65
Conditional Expression (16) (Bft − Bfw)/f3 = 1.49
Conditional Expression (17) f5/ft = 0.14
Conditional Expression (18) f1/f3 = 4.14

As shown in the data table in Table 8, the zoom lens according to Example 8 satisfies all the conditional Expressions (13) to (18).

Figure 27A:
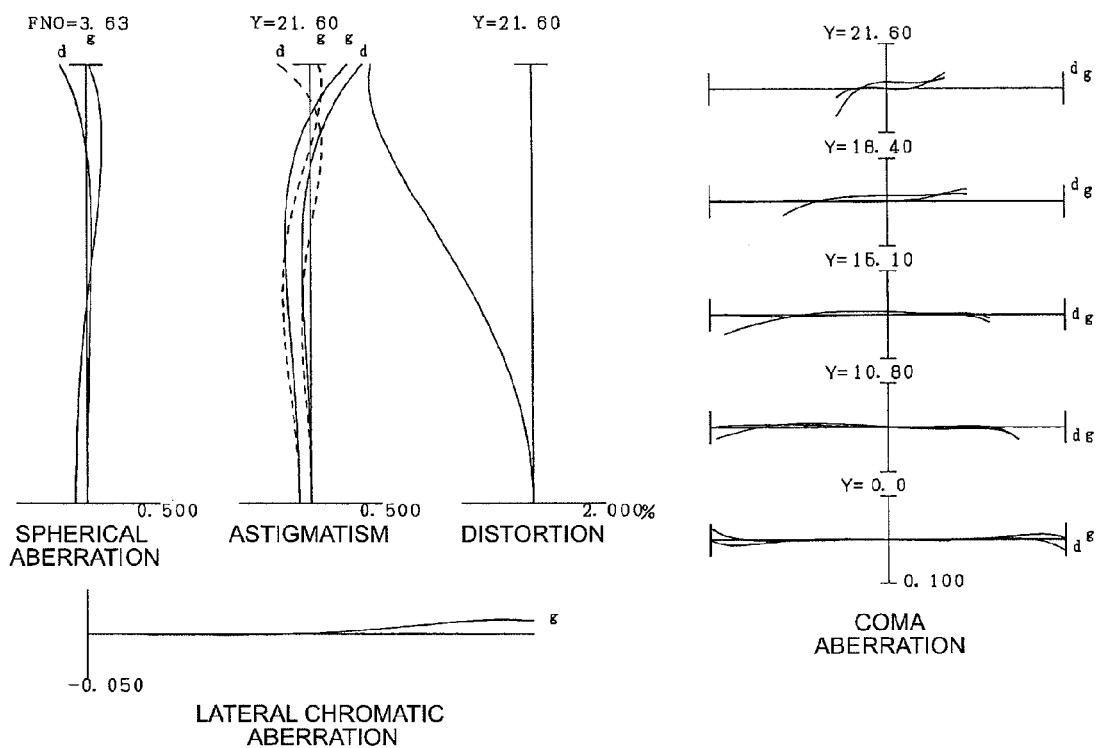
FIGS. 27A and 27B are graphs showing various aberrations of the zoom lens according to Example 8 upon focusing on infinity in the wide-angle end state, and graphs showing meridional lateral aberrations after a 0.58° rotation blur is corrected.
Figure 27B:
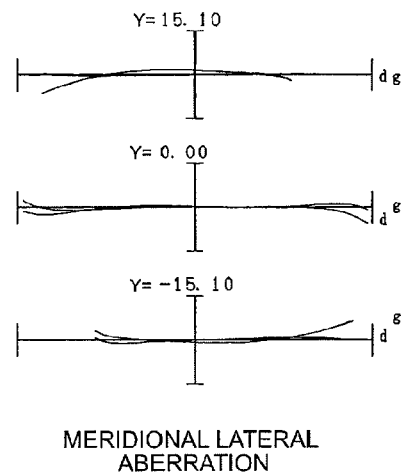
Figure 28:
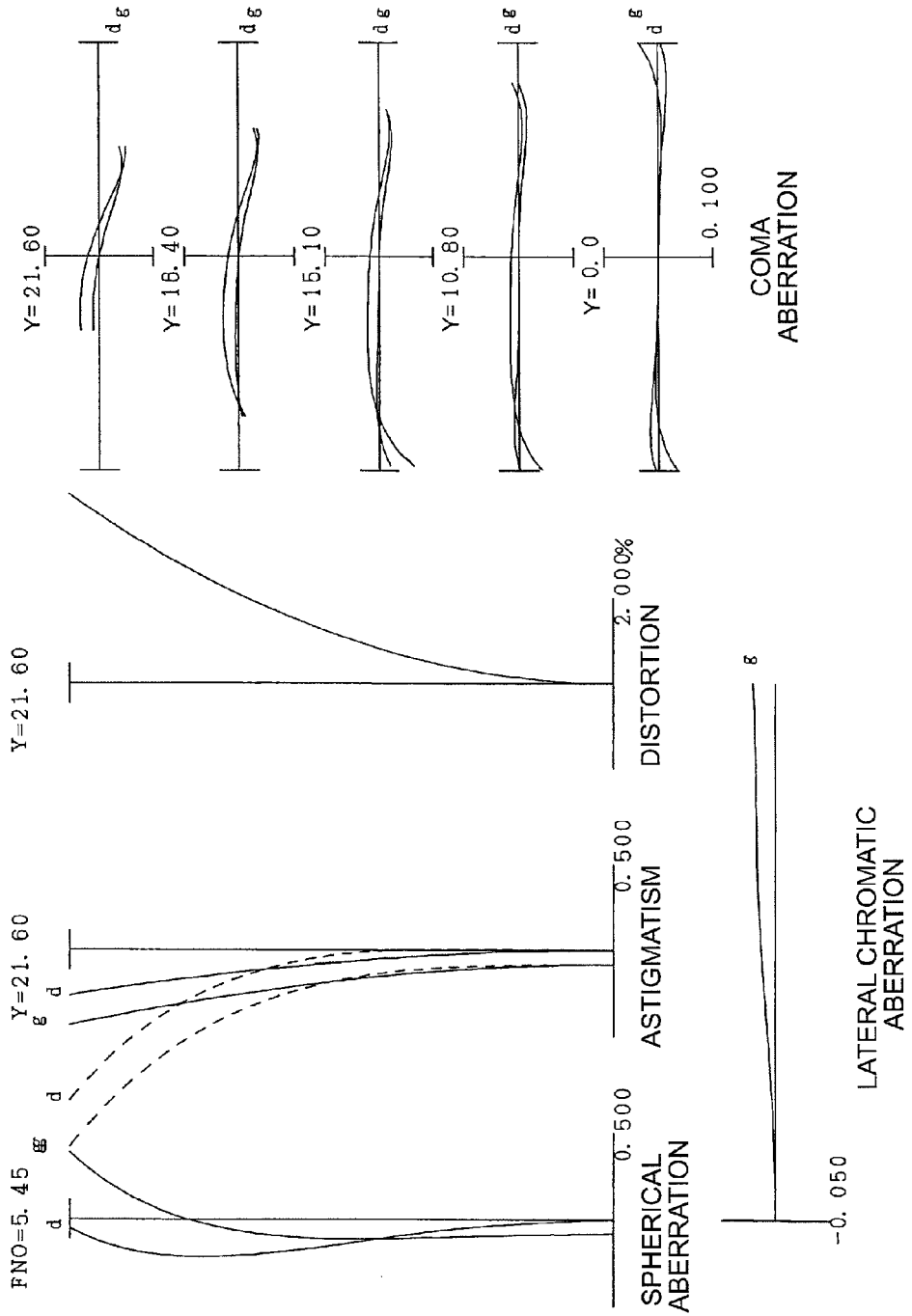
FIG. 28 are graphs showing various aberrations of the zoom lens according to Example 8 upon focusing on infinity in the intermediate focal length state.
Figure 29A:
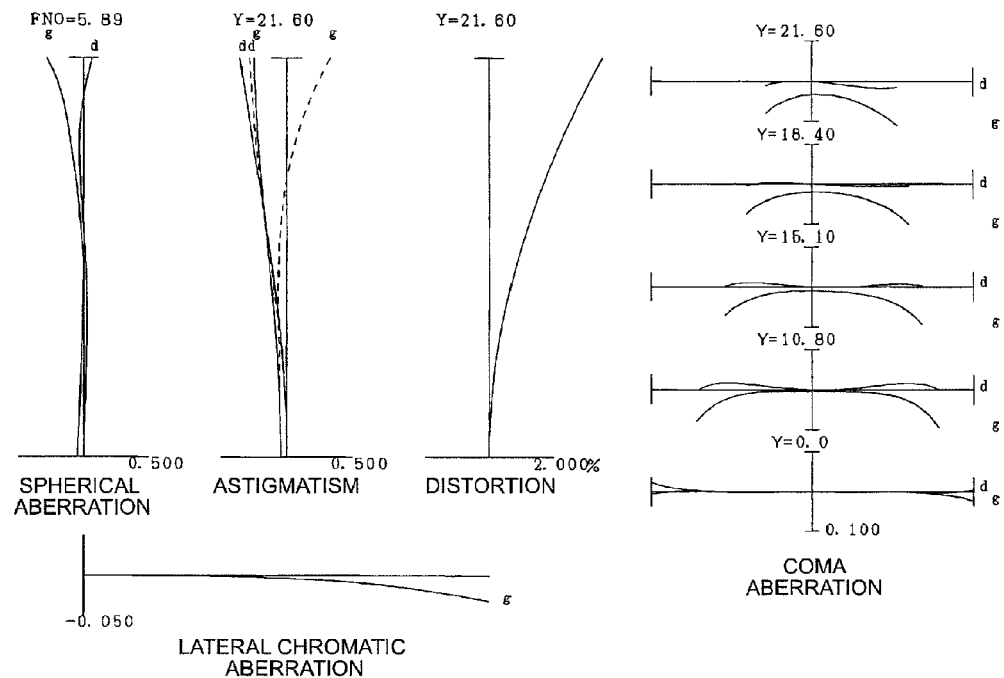
FIGS. 29A and 29B are graphs showing various aberrations of the zoom lens according to Example 8 upon focusing on infinity in the telephoto end state, and graphs showing meridional lateral aberrations after a 0.18° rotation blur is corrected.
Figure 29B:
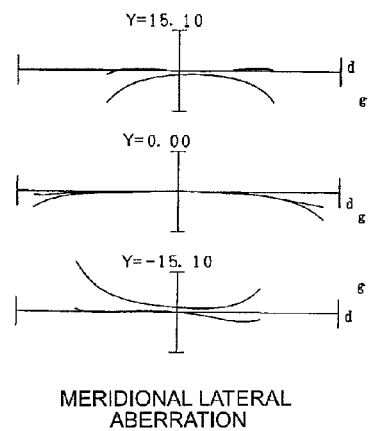

FIG. 27A and FIG. 27B are graphs showing various aberrations of the zoom lens according to Example 8 upon focusing on infinity in the wide-angle end state, and graphs showing meridional lateral aberrations upon correcting a 0.58° rotation blur. FIG. 28 are graphs showing various aberrations of the zoom lens according to Example 8 upon focusing on infinity in the intermediate focal length state. FIG. 29A and FIG. 29B are graphs showing various aberrations of the zoom lens according to Example 8 upon focusing on infinity in the telephoto end state, and graphs showing meridional lateral aberrations upon correcting a 0.18° rotation blur.

As each graph showing aberration clarifies, the zoom lens according to Example 8 has excellent image forming performance that corrects various aberrations well in each focal length state, from the wide-angle end state to the telephoto end state.

Example 9

Figure 30:
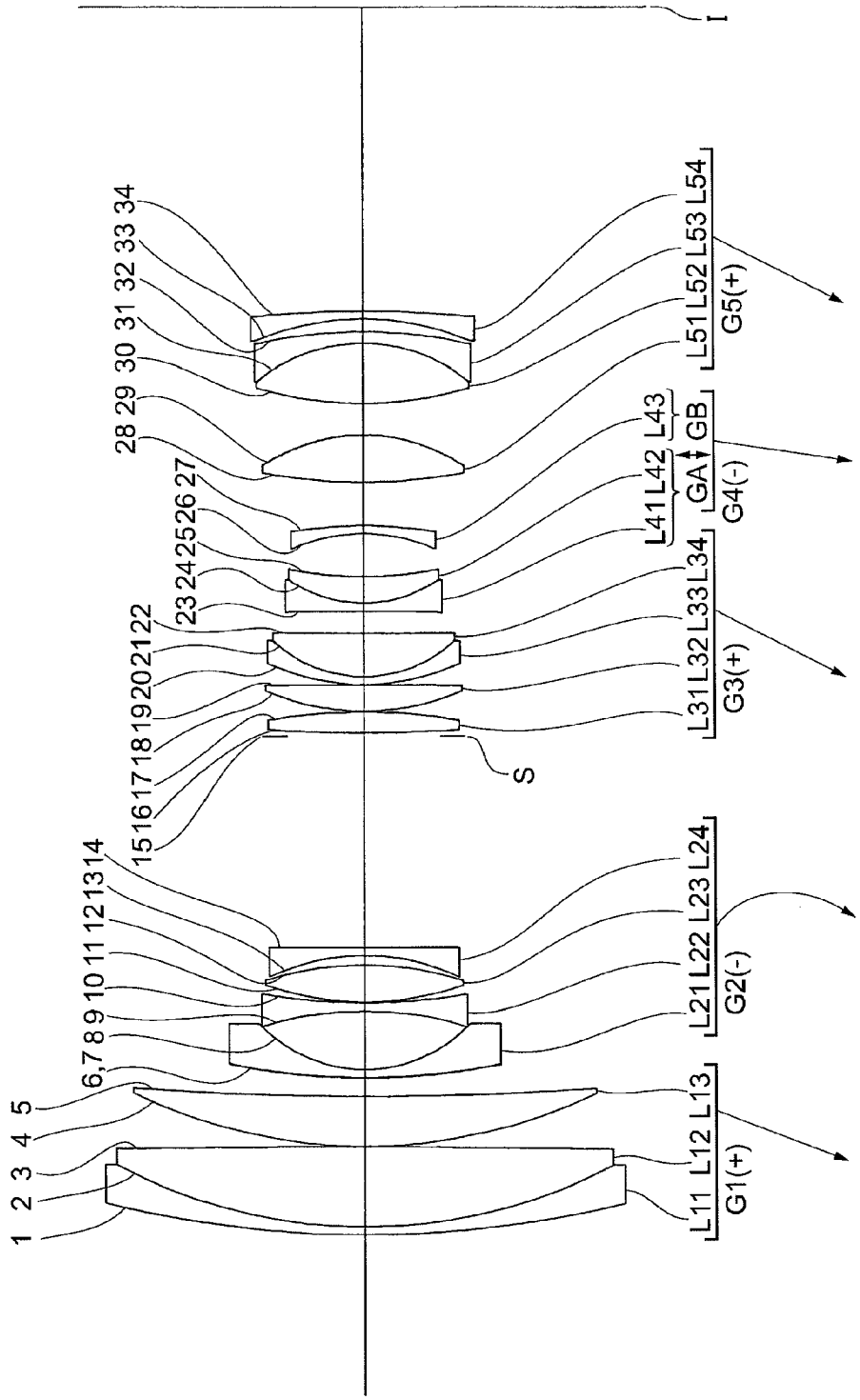
FIG. 30 is a diagram depicting a configuration and zoom locus of a zoom lens system according to Example 9.

Example 9 will now be described with reference to FIG. 30 to FIG. 33 and Table 9. FIG. 30 is a diagram depicting a configuration and zoom locus of a lens according to Example 9. As shown in FIG. 30, the zoom lens according to Example 9 has, in order from the object, a first lens group G1 having positive refractive power, a second lens group G2 having negative refractive power, a third lens group G3 having positive refractive power, a fourth lens group G4 having negative refractive power, and a fifth lens group G5 having positive refractive power.

The first lens group G1 has, in order from the object, a cemented lens of a negative meniscus lens L11 having a convex surface facing the object and a biconvex positive lens L12, and a positive meniscus lens L13 having a convex surface facing the object.

The second lens group G2 has, in order from the object, a negative meniscus lens L21 having a convex surface facing the object, a biconcave negative lens L22, a biconvex positive lens L23, and a negative meniscus lens L24 having a concave surface facing the object. The negative meniscus lens L21 disposed closest to the object in the second lens group G2 is an aspherical lens of which glass lens surface facing the object (sixth surface counted from the object in FIG. 30) is aspherical.

The third lens group G3 has, in order from the object, a biconvex positive lens L31, a biconvex positive lens L32, and a cemented lens of a negative meniscus lens L33 having a convex surface facing the object and a positive meniscus lens L34 having a convex surface facing the object.

The fourth lens group G4 has, in order from the object, a 4A lens group GA which is a cemented lens of a biconcave negative lens L41 and a positive meniscus lens L42 having a convex surface facing the object, and a 4B lens group GB which is a negative meniscus lens L43 having a concave surface facing the object. The negative meniscus lens L43 constituting the 4B lens group GB is an aspherical lens of which glass lens surface facing the image (twenty seventh surface counted from the object in FIG. 30) is aspherical.

The fifth lens group G5 has, in order from the object, a biconvex positive lens L51, a cemented lens of a biconvex positive lens L52 and a negative meniscus lens L53 having a concave surface facing the object, and a negative meniscus lens L54 having a concave surface facing the object. The negative meniscus lens L54 disposed closest to the image in the fifth lens group G5 is an aspherical lens of which glass lens surface facing the image (thirty fourth surface counted from the object in FIG. 30) is aspherical.

In the zoom lens according to this example which has the above configuration, upon zooming from a wide-angle end state to a telephoto end state, the distance between each lens group changes, so that the distance between the first lens group G1 and the second lens group G2 increases, the distance between the second lens group G2 and the third lens group G3 decreases, the distance between the third lens group G3 and the fourth lens group G4 increases, and the distance between the fourth lens group G4 and the fifth lens group G5 decreases.

An aperture stop S is disposed between the second lens group G2 and the third lens group G3, and moves together with the third lens group G3 upon zooming from the wide-angle end state to the telephoto end state.

In the zoom lens according to this example, focusing from long distance to close distance is performed by moving the second lens group G2 in a direction toward the object.

Hand motion blur correction (vibration-isolation) is performed by moving the 4A lens group GA so as to have components orthogonal to the optical axis.

In Example 9, in order to correct angle θ of rotation blur in a lens of which focal length of the zoom lens is f and the ratio of the image moving amount on the image forming surface with respect to the moving amount of the moving lens group during blur correction, that is vibration-isolation coefficient, is K, the moving lens group for blur correction is moved for (f·tan θ)/K, so as to have components orthogonal to the optical axis. In the wide-angle end state in Example 9, the vibration-isolation coefficient is 1.06 and the focal length is 28.8 (mm), so the moving amount of the fourth lens group G4 for correcting a 0.58° rotation blur is 0.27 (mm). In the telephoto end state in Example 9, the vibration-isolation coefficient is 1.70 and the focal length is 291.8 (mm), so the moving amount of the fourth lens group G4 for correcting a 0.18° rotation blur is 0.48 (mm).

Table 9 shows each data value of the zoom lens according to Example 9. The surface numbers 1 to 34 in Table 9 correspond to the surfaces 1 to 34 in FIG. 30.

TABLE 9

[General Data]

| f | 28.8 | 97.8 | 291.8 |
|---|------|------|-------|
| Fno | 3.6 | 5.4 | 5.9 |
| 2ω | 76.3 | 24.0 | 8.2 |
| Y | 21.6 | 21.6 | 21.6 |
| TL | 155.259 | 200.892 | 230.440 |
| Bf | 38.296 | 61.715 | 79.010 |

[Lens Data]

| Surface number | r | d | nd | νd |
|---|---|---|---|---|
| 1 | 131.9600 | 1.000 | 1.85026 | 32.35 |
| 2 | 64.7763 | 10.026 | 1.49782 | 82.52 |
| 3 | −1939.8917 | 0.100 | 1.00000 | |
| 4 | 64.6003 | 6.329 | 1.61800 | 63.38 |
| 5 | 410.2657 | D5 | 1.00000 | |
| *6 | 89.4836 | 0.100 | 1.55389 | 38.09 |
| 7 | 89.4836 | 1.000 | 1.81600 | 46.63 |
| 8 | 17.9244 | 7.340 | 1.00000 | |
| 9 | −42.0840 | 1.000 | 1.81600 | 46.63 |
| 10 | 73.2932 | 0.100 | 1.00000 | |
| 11 | 36.7795 | 4.691 | 1.84666 | 23.78 |
| 12 | −39.1344 | 1.214 | 1.00000 | |
| 13 | −26.1074 | 1.000 | 1.81600 | 46.63 |
| 14 | −3773.9951 | D14 | 1.00000 | |
| 15 | 0.0000 | 0.500 | 1.00000 | (aperture stop S) |
| 16 | 224.1127 | 2.598 | 1.69680 | 55.52 |
| 17 | −66.2510 | 0.100 | 1.00000 | |
| 18 | 30.7404 | 3.300 | 1.49782 | 82.56 |
| 19 | −2017.6973 | 0.100 | 1.00000 | |
| 20 | 27.5622 | 1.000 | 1.84666 | 23.78 |
| 21 | 16.0865 | 5.531 | 1.51680 | 64.12 |
| 22 | 1640.3102 | D22 | 1.00000 | |
| 23 | −254.1339 | 1.000 | 1.81600 | 46.63 |
| 24 | 15.9374 | 3.355 | 1.85026 | 32.35 |
| 25 | 45.3566 | 5.500 | 1.00000 | |
| 26 | −20.8777 | 1.000 | 1.81600 | 46.63 |
| *27 | −53.9758 | D27 | 1.00000 | |
| 28 | 67.5729 | 6.000 | 1.51860 | 69.89 |
| 29 | −20.5166 | 4.000 | 1.00000 | |
| 30 | 47.4864 | 7.500 | 1.51742 | 52.32 |
| 31 | −20.4408 | 1.500 | 1.81600 | 46.63 |
| 32 | −56.8501 | 1.619 | 1.00000 | |
| 33 | −33.4116 | 1.000 | 1.81600 | 46.63 |
| *34 | −130.4172 | Bf | 1.00000 | |

TABLE 9-continued

[Aspherical Data]

Sixth surface

κ = 8.332, A4 = 1.1402E−06, A6 = 5.3964E−10, A8 = −2.3261E−11, A10 = 1.0349E−13, A12 = 0.0000E+00

Twenty seventh surface

κ = −3.0393, A4 = 4.0455E−06, A6 = −5.4765E−09, A8 = 2.7129E−11, A10 = 0.0000E+00, A12 = 0.0000E+00

Thirty fourth surface

κ = 0.181, A4 = −1.3072E−06, A6 = 5.5840E−09, A8 = −8.7610E−11, A10 = 2.5603E−13, A12 = 0.0000E+00

[Variable Distance Data]

| | Wide-angle end State | Intermediate focal length state | Telephoto end state |
|---|---|---|---|
| D5 | 2.325 | 38.632 | 62.363 |
| D14 | 26.770 | 12.676 | 1.198 |
| D22 | 2.836 | 6.232 | 7.367 |
| D27 | 5.530 | 2.134 | 1.000 |

[Lens Group Data]

| Group number | First surface of group | Focal length of group |
|---|---|---|
| G1 | 1 | 107.36 |
| G2 | 6 | −16.98 |
| G3 | 16 | 25.15 |
| G4 | 23 | −21.73 |
| G5 | 28 | 32.44 |

[Conditional Expression Correspondence Value]

Conditional Expression (13) f1/(−f4) = 4.94
Conditional Expression (14) (−f4)/ft = 0.07
Conditional Expression (15) (−f2)/(−f4) = 0.78
Conditional Expression (16) (Bft − Bfw)/f3 = 1.62
Conditional Expression (17) f5/ft = 0.11
Conditional Expression (18) f1/f3 = 4.27

As shown in the data table in Table 9, the zoom lens according to Example 9 satisfies all the conditional Expressions (13) to (18).

Figure 31A:
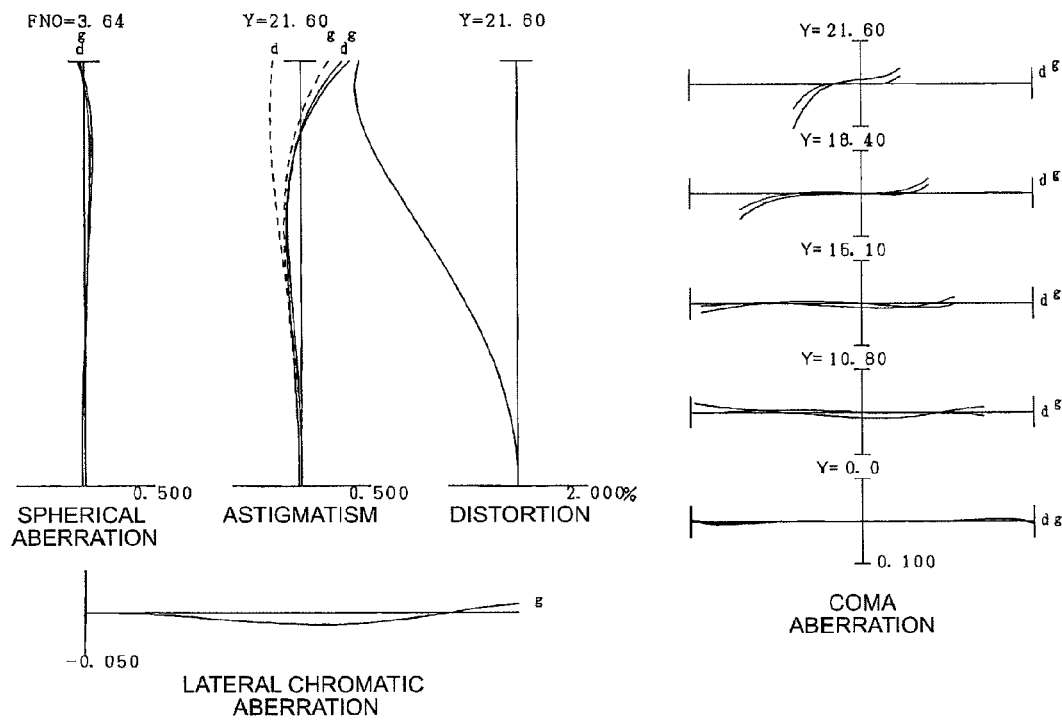
FIGS. 31A and 31B are graphs showing various aberrations of the zoom lens according to Example 9 upon focusing on infinity in the wide-angle end state, and graphs showing meridional lateral aberrations after a 0.58° rotation blur is corrected.
Figure 31B:
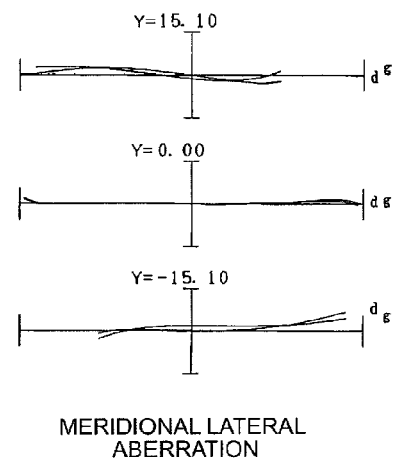
Figure 32:
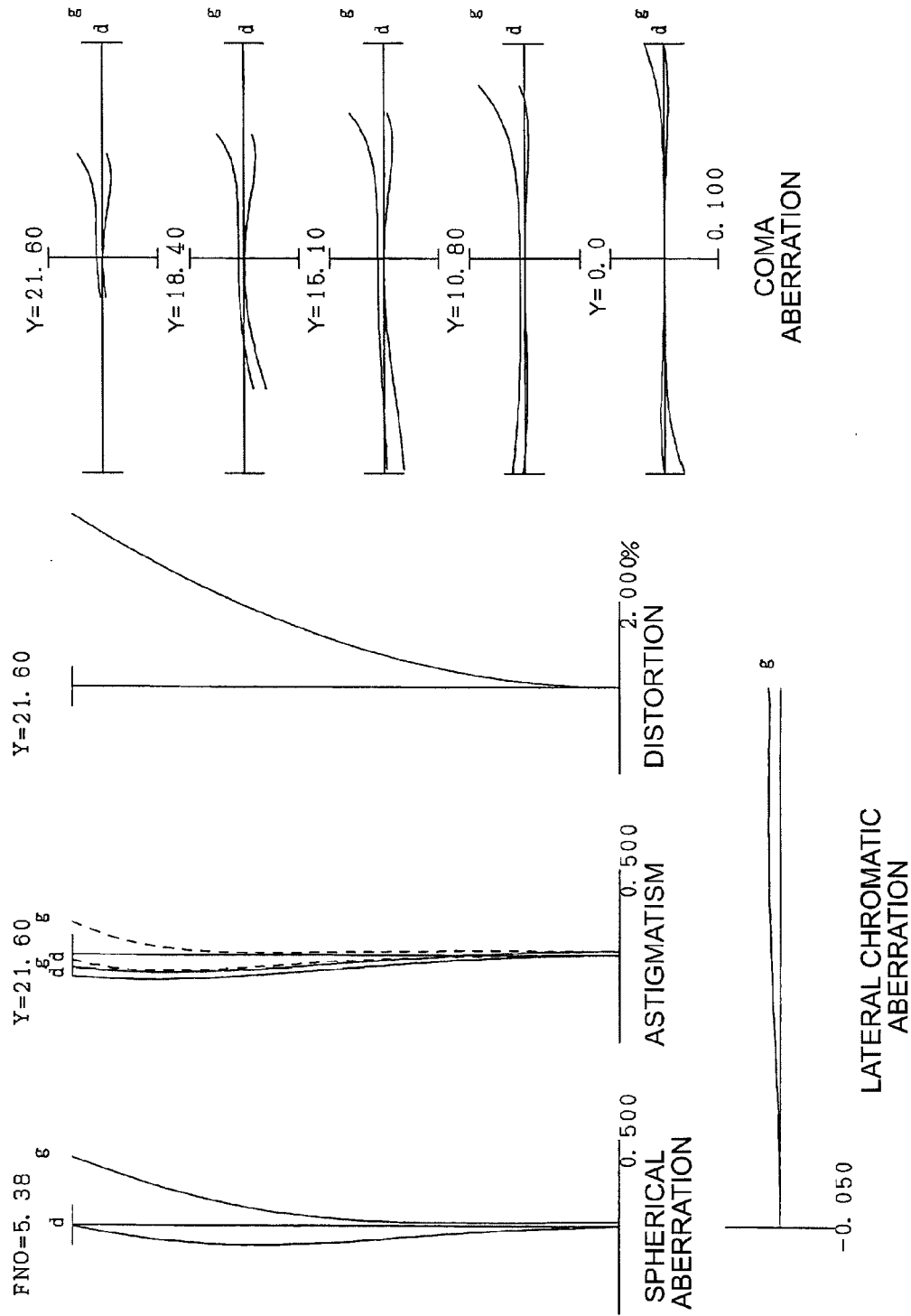
FIG. 32 are graphs showing various aberrations of the zoom lens according to Example 9 upon focusing on infinity in the intermediate focal length state.
Figure 33A:
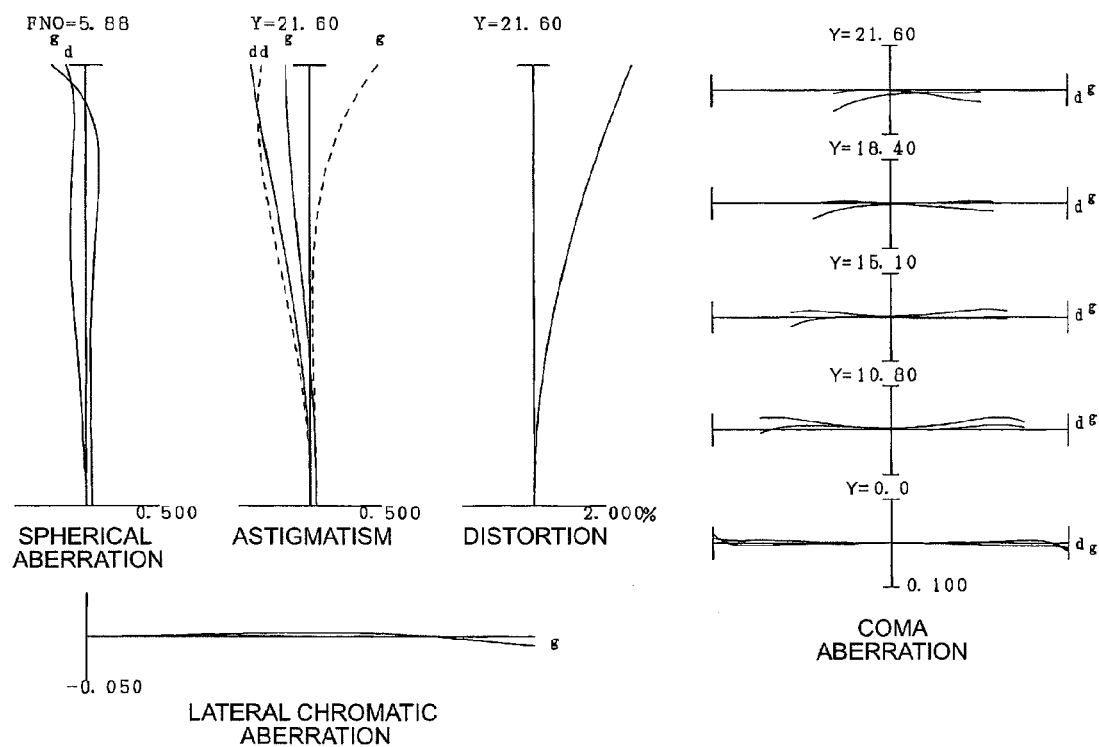
FIGS. 33A and 33B are graphs showing various aberrations of the zoom lens according to Example 9 upon focusing on infinity in the telephoto end state, and graphs showing meridional lateral aberrations after a 0.18° rotation blur is corrected.
Figure 33B:
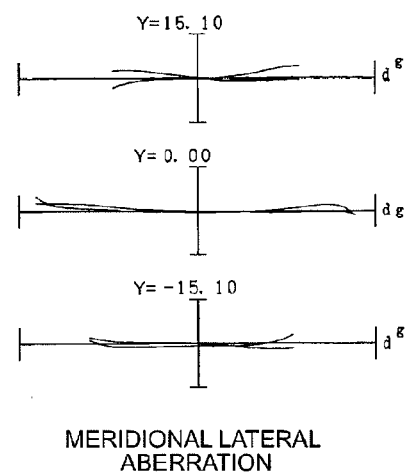

FIG. 31A and FIG. 31B are graphs showing various aberrations of the zoom lens according to Example 9 upon focusing on infinity in the wide-angle end state, and graphs showing meridional lateral aberrations upon correcting a 0.58° rotation blur. FIG. 32 are graphs showing various aberrations of the zoom lens according to Example 9 upon focusing on infinity in the intermediate focal length state. FIG. 33A and FIG. 33B are graphs showing various aberrations of the zoom lens according to Example 9 upon focusing on infinity in the telephoto end state, and graphs showing meridional lateral aberrations upon correcting a 0.18° rotation blur.

As each graph showing aberrations clarifies, the zoom lens according to Example 9 has an excellent image forming performance that corrects various aberrations well in each focal length state, from the wide-angle end state to the telephoto end state.

In the above embodiment, the following content can be adopted within a range where the optical performance is not diminished.

In the above examples, a zoom lens comprised of five lens groups was shown, but the present invention can also be applied to a configuration having a different number of lens groups, such as six or seven lens groups. A configuration where a lens or a lens group is added to the side closest to the object, or a configuration where a lens or a lens group is added to the side closest to the image, may be used. A lens group refers to a portion having at least one lens, separated by an air space which changes upon zooming.

A single or plurality of lens group(s) or a partial lens group may be designed to be a focusing lens group, which performs focusing from an object at infinity to an object at close distance by moving in the optical axis direction. The focusing lens group can be applied to auto focus, and is also suitable for driving a motor for auto focusing (e.g. driving using an ultrasonic motor). It is particularly preferable that at least a part of the second lens group G2 is designed to be the focusing lens group.

A lens group or a partial lens group may be designed to be a vibration-isolating lens group, which corrects image blurs generated by hand motion by moving the lens group or a partial lens group so as to have components orthogonal to the optical axis, or rotary moving (oscillating) the lens group or the partial lens group in an in-plane direction including the optical axis. For the movement, rotary movement (oscillation) around a certain point on the optical axis as a center of rotation may be used. It is particularly preferable that at least a part of the third lens group G3 or the fourth lens group G4 is designed to be the vibration-isolating lens group.

The lens surface may be formed to be a spherical surface or plane, or an aspherical surface. If the lens surface is a spherical surface or plane, then lens processing, assembly and adjustment are easy, and deterioration of optical performance, due to an error in processing, assembly and adjustment, can be prevented. Even if the image plane is shifted, the drawing performance is not affected very much, which is desirable. If the lens surface is an aspherical surface, the aspherical surface can be any aspherical surface, out of an aspherical surface generated by grinding, a glass molded aspherical surface generated by forming glass in an aspherical shape using a die, and a composite aspherical surface generated by forming a resin on the surface of the glass to be an aspherical shape. The lens surface may be a diffraction surface, and the lens may be a refractive index distributed lens (GRIN lens) or plastic lens.

It is preferable that the aperture stop S is disposed near the third lens group G3 or the fourth lens group G4, but the role of the aperture stop may be substituted by the frame of the lens, without disposing a separate element as the aperture stop. It is particularly preferable that the aperture stop S is disposed at the object side of the third lens group G3.

Each lens surface may be coated by an anti-reflection film which has high transmittance in a wide wavelength region, in order to decrease flares and ghosts, and implement a high optical performance with high contrast.

The zoom ratio of the zoom lens (zooming optical system) of the present embodiment is ×5 to ×18, and more preferably ×8 to ×12.

In the zoom lens (zooming optical system) of the present embodiment, it is preferable that the first lens group G1 has two positive lenses and one negative lens. In the first lens group G1, it is preferable that lenses are disposed, in order from the object, to be in the sequence of negative, positive and positive.

In the zoom lens (zooming optical system) of the present embodiment, it is preferable that the second lens group G2 has one positive lens and three negative lens. In the second lens group G2, it is preferable that the lens components are disposed, in order from the object, to be in the sequence of negative, negative, positive and negative, with air distance there between.

In the zoom lens (zooming optical system) of the present embodiment, it is preferable that the third lens group G3 has three positive lenses and one negative lens. In the third lens group G3, it is preferable that the lens components are disposed, in order from the object, to be in the sequence of positive, positive and positive, with air distance there between.

In the zoom lens (zooming optical system) of the present embodiment, it is preferable that the fourth lens group G4 has one positive lens and two negative lenses. In the fourth lens group G4, it is preferable that the lens components are disposed, in order from the object, to be in the sequence of negative and negative, with air distance there between.

In the zoom lens (zooming optical system) of the present embodiment, it is preferable that the fifth lens group G5 has two positive lenses and one negative lens. In the fifth lens group G5, it is preferable that the lens components are disposed, in order from the object, to be in the sequence of positive, positive and negative, with air distance there between.

The embodiments were described with the configuration requirements to clarify the present invention, but needless to say, the present invention is not limited to these embodiments.

EXPLANATION OF REFERENCE NUMERALS

G1 first lens group
G2 second lens group
G3 third lens group
G4 fourth lens group
G5 fifth lens group
S aperture stop
I image plane
CAM digital single lens reflex camera

What is claimed is:

1. A zoom lens comprising, in order from an object, a first lens group having positive refractive power, a second lens group having negative refractive power, a third lens group having positive refractive power, a fourth lens group having negative refractive power, and a fifth lens group having positive refractive power, at least a part of the fourth lens group being able to move so as to have components orthogonal to the optical axis, a distance between each lens group being changed upon zooming from a wide-angle end state to a telephoto end state, and the following conditional expression being satisfied:

$$0.01 < f5/ft < 0.30$$

where f5 denotes a focal length of the fifth lens group, and ft denotes a focal length of the zoom lens upon focusing on infinity in the telephoto end state.

2. The zoom lens according to claim 1, wherein the following conditional expression is satisfied:

$$0.577 < (-f2)/(-f4) < 1.200$$

where f2 denotes a focal length of the second lens group, and f4 denotes a focal length of the fourth lens group.

3. The zoom lens according to claim 1, wherein the following conditional expression is satisfied:

$$0.01 < (-f4)/ft < 0.25$$

where f4 denotes a focal length of the fourth lens group, and ft denotes a focal length of the zoom lens upon focusing on infinity in the telephoto end state.

4. The zoom lens according to claim 1, wherein the fourth lens group comprises a lens group GA having negative refractive power, and a lens group GB which is disposed to adjoin an image side of the lens group GA and has negative refractive power.

5. The zoom lens according to claim 4, wherein the lens group GB includes at least one aspherical surface.

6. The zoom lens according to claim 1, wherein the following conditional expression is satisfied:

$$0.05 < (-fA)/ft < 0.40$$

where fA denotes a focal length of the lens group which moves so as to have components orthogonal to the optical axis, and ft denotes a focal length of the zoom lens focusing on infinity in the telephoto end state.

7. The zoom lens according to claim 1, wherein the following conditional expression is satisfied:

$$1.10 < f5/(-f4) < 2.00$$

where f4 denotes a focal length of the fourth lens group, and f5 denotes a focal length of the fifth lens group.

8. The zoom lens according to claim 1, wherein the following conditional expression is satisfied:

$$0.11 < f5/fw < 3.20$$

where f5 denotes a focal length of the fifth lens group, and fw denotes a focal length of the zoom lens upon focusing on infinity in the wide-angle end state.

9. The zoom lens according to claim 1, wherein the fourth lens group has a cemented lens.

10. The zoom lens according to claim 1, wherein upon zooming from the wide-angle end state to the telephoto end state, the distance between the first lens group and the second lens group increases, the distance between the second lens group and the third lens group decreases, the distance between the third lens group and the fourth lens group increases, and the distance between the fourth lens group and the fifth lens group decreases.

11. The zoom lens according to claim 1, wherein upon zooming from the wide-angle end state to the telephoto end state, the third lens group and the fifth lens group move together.

12. The zoom lens according to claim 1, wherein the third lens group has three lens groups having positive refractive power.

13. The zoom lens according to claim 1, wherein the third lens group includes at least two cemented lenses.

14. The zoom lens according to claim 1, wherein the fifth lens group has at least two lens groups having positive refractive power, and a lens group having negative refractive power.

15. The zoom lens according to claim 1, wherein the fifth lens group includes at least one cemented lens.

16. The zoom lens according to claim 1, wherein the second lens group has at least an aspherical surface.

17. The zoom lens according to claim 1, wherein the fourth lens group has at least one aspherical surface.

18. The zoom lens according to claim 1, wherein focusing from an object at infinity to an object at close distance is performed by moving at least a part of the second lens group in the optical axis direction.

19. An optical apparatus comprising the zoom lens according to claim 1.

20. A zoom lens comprising, in order from an object, a first lens group having positive refractive power, a second lens group having negative refractive power, a third lens group having positive refractive power, a fourth lens group having negative refractive power, and a fifth lens group having positive refractive power, at least a part of the fourth lens group being able to move so as to have components orthogonal to the optical axis, a distance between each lens group being changed upon zooming from a wide-angle end state to a telephoto end state, and the following conditional expression being satisfied:

$$0.01 < (-f4)/ft < 0.20$$

where f4 denotes a focal length of the fourth lens group, and ft denotes a focal length of the zoom lens in the telephoto end state.

21. The zoom lens according to claim 20, wherein the following conditional expression is satisfied:

$$0.80 < f5/(-f4) < 3.50$$

where f5 denotes a focal length of the fifth lens group, and f4 denotes a focal length of the fourth lens group.

22. The zoom lens according to claim 20, wherein the following conditional expression is satisfied:

$$0.45 < (-f2)/(-f4) < 1.25$$

where f2 denotes a focal length of the second lens group, and f4 denotes a focal length of the fourth lens group.

23. The zoom lens according to claim 20, wherein the following conditional expression is satisfied:

$$3.45 < f1/(-f4) < 6.00$$

where f1 denotes a focal length of the first lens group, and f4 denotes a focal length of the fourth lens group.

24. The zoom lens according to claim 20, wherein the following conditional expression is satisfied:

$$0.05 < f5/ft < 0.35$$

where f5 denotes a focal length of the fifth lens group, and ft denotes a focal length of the zoom lens in the telephoto end state.

25. The zoom lens according to claim 20, wherein the following conditional expression is satisfied:

$$1.35 < (Bft-Bfw)/f3 < 1.80$$

where Bft denotes back focus in the telephoto end state, Bfw denotes back focus in the wide-angle end state, and f3 denotes a focal length of the third lens group.

26. An optical apparatus comprising the zoom lens according to claim 20.

27. A zoom lens comprising, in order from an object, a first lens group having positive refractive power, a second lens group having negative refractive power, a third lens group having positive refractive power, a fourth lens group having negative refractive power, and a fifth lens group having positive refractive power, at least a part of the fourth lens group being able to move so as to have components orthogonal to the optical axis, a distance between each lens group being changed upon zooming from a wide-angle end state to a telephoto end state, and the following conditional expression being satisfied:

$$3.45 < f1/(-f4) < 6.00$$

where f1 denotes a focal length of the first lens group, and f4 denotes a focal length of the fourth lens group.

28. The zoom lens according to claim 27, wherein the following conditional expression is satisfied:

$$3.50 < f1/f3 < 4.60$$

where f1 denotes a focal length of the first lens group, and f3 denotes a focal length of the third lens group.

29. A method of manufacturing a zoom lens having, in order from an object, a first lens group, a second lens group, a third lens group, a fourth lens group, and a fifth lens group, comprising the steps of:

disposing each lens so that the first lens group has positive refractive power, the second lens group has negative refractive power, the third lens group has positive refractive power, the fourth lens group has negative refractive power, and the fifth lens group has positive refractive power, disposing at least a part of the fourth lens group to be movable so as to have components orthogonal to the optical axis, and disposing the first group to the fifth lens group so that a distance between each lens group is changed upon zooming from a wide-angle end state to a telephoto end state, and so that the following conditional expression is satisfied:

$$0.01 < f5/ft < 0.30$$

where f5 denotes a focal length of the fifth lens group, and ft denotes a focal length of the zoom lens upon focusing on infinity in the telephoto end state.

30. The method of manufacturing the zoom lens according to claim 29, wherein
the following conditional expression is satisfied:

$$0.577 < (-f2)/(-f4) < 1.200$$

where f2 denotes a focal length of the second lens group, and f4 denotes a focal length of the fourth lens group.

31. The method of manufacturing the zoom lens according to claim 29, wherein
the following conditional expression is satisfied:

$$0.05 < (-fA)/ft < 0.40$$

where fA denotes a focal length of the lens group which moves so as to have components orthogonal to the optical axis, and ft denotes a focal length of the zoom lens focusing on infinity in the telephoto end state.

32. A method of manufacturing a zoom lens having, in order from an object, a first lens group, a second lens group, a third lens group, a fourth lens group, and a fifth lens group, comprising the steps of:

disposing each lens so that the first lens group has positive refractive power, the second lens group has negative refractive power, the third lens group has positive refractive power, the fourth lens group has negative refractive power, and the fifth lens group has positive refractive power, at least a part of the fourth lens group being movable so as to have components orthogonal to the optical axis; and disposing the first group to the fifth lens group so that a distance between each lens group is changed upon zooming from a wide-angle end state to a telephoto end state, and so that the following conditional expression is satisfied:

$$0.01 < (-f4)/ft < 0.20$$

where f4 denotes a focal length of the fourth lens group, and ft denotes a focal length of the zoom lens in the telephoto end state.

33. The method of manufacturing the zoom lens according to claim 32, wherein
the following conditional expression is satisfied:

$$0.80 < f5/(-f4) < 3.50$$

where f5 denotes a focal length of the fifth lens group, and f4 denotes a focal length of the fourth lens group.

34. The method of manufacturing the zoom lens according to claim 32, wherein
the following conditional expression is satisfied:

$$3.45 < f1/(-f4) < 6.00$$

where f1 denotes a focal length of the first lens group, and f4 denotes a focal length of the fourth lens group.

* * * * *